United States Patent [19]

Dlugos

[11] 4,308,579
[45] Dec. 29, 1981

[54] MULTIPROCESSOR PARCEL POSTAGE METERING SYSTEM HAVING SERIAL DATA BUS

[75] Inventor: Daniel F. Dlugos, Huntington, Conn.
[73] Assignee: Pitney Bowes Inc., Stamford, Conn.
[21] Appl. No.: 13,734
[22] Filed: Feb. 21, 1979
[51] Int. Cl.³ .................. G06F 3/00; G06F 15/02
[52] U.S. Cl. ..................... 364/200; 364/466; 371/70
[58] Field of Search .............. 364/200, 900, 466; 340/146.1 BA; 371/70

[56] References Cited

U.S. PATENT DOCUMENTS

| | | | |
|---|---|---|---|
| 3,453,592 | 7/1969 | Ishii et al. | 340/146.1 BA |
| 3,648,256 | 3/1972 | Paine et al. | 340/146.1 BA |
| 4,065,809 | 12/1977 | Matsumoto | 364/200 |
| 4,074,352 | 2/1978 | Cook et al. | 364/200 |
| 4,091,448 | 5/1978 | Clausing | 364/200 |
| 4,091,449 | 5/1978 | Meckstroth et al. | 364/466 |
| 4,096,572 | 6/1978 | Namimoto | 364/200 |
| 4,099,236 | 7/1978 | Goodman et al. | 364/200 |
| 4,120,029 | 10/1978 | Steiner | 364/200 |
| 4,149,238 | 4/1979 | James et al. | 364/200 |
| 4,149,242 | 4/1979 | Pirz | 364/200 |
| 4,155,117 | 5/1979 | Mitchell, Jr. et al. | 346/200 |

*Primary Examiner*—Charles E. Atkinson
*Attorney, Agent, or Firm*—Mark E. Levy; William D. Soltow, Jr.; Albert W. Scribner

[57] ABSTRACT

A multiprocessor parcel postage metering system includes a system processor to which a scale subsystem processor, a postage printing subsystem processor and a peripherals subsystem processor may be connected. The processors share a common data bus over which data is transferred serially. The system processor accepts weight and status data transmitted from the scale subsystem processor over the serial data bus. The system processor operates on this data and keyboard entry data to calculate required postage as a function of parcel origin, parcel destination, class of service and selected special fees. Printer setting data is transferred to the postage printing subsystem processor over the serial data bus. Peripheral devices, such as a document printer or a parcel identification number counter, are controlled by data sent to the peripherals subsystem processor over the serial data bus. Communications are controlled by the system processor which initiates any interprocessor data transfer by means of a control signal which is interpreted by the addressed subsystem processor as a demand for information.

14 Claims, 21 Drawing Figures

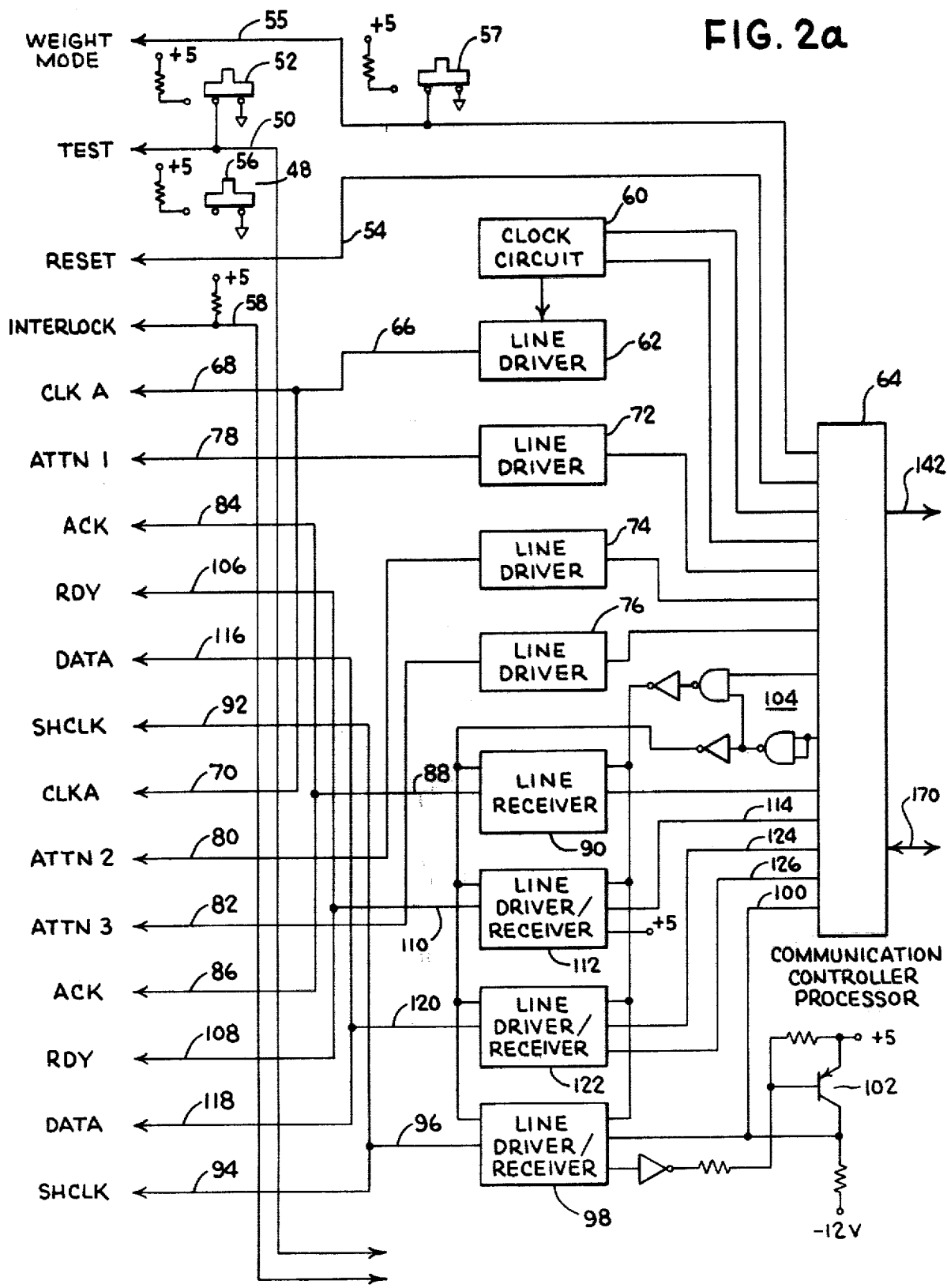

MULTIPROCESSOR PARCEL POSTAGE METERING SYSTEM HAVING SERIAL DATA BUS

This application is related to copending application entitled "SERIAL DATA BUS FOR USE WITH A MULTIPROCESSOR PARCEL POSTAGE METERING SYSTEM," Ser. No. 013,757, assigned in part to the assignee of the present invention.

BACKGROUND OF THE INVENTION

The present invention relates to postage meters and more particularly to a multiprocessor parcel postage metering system having a serial data bus for interprocessor communications.

A number of different devices and systems have been developed to help a user determine the proper postage for mailing parcels. The simplest of these devices is, of course, a scale which provides visual display of the parcel weight. The operator must translate this weight reading to a postage amount by resort to printed rate charts and special fee charts. The user then applies the postage to the parcel either in the form of stamps or in the form of an adhesive-backed tape printed with the user-calculated postage by a conventional postage meter.

This simple arrangement may be suitable for a conscientious user who mails few parcels over a given period of time. However, if the user isn't conscientious, he may misread the scale or misread the rate charts and incorrectly calculate required amount of postage. If the postage which the user calculates is insufficient, the parcel may be returned to its sender, delaying ultimate delivery. If the calculated postage is excessive, the parcel will be delivered but the user will have wasted his money. Moreover, this approach to mailing parcels is time consuming and cannot be effectively used where any significant number of parcels is to be mailed on a regular basis.

To reduce the chances of human error, it would be possible to develop a completely mechanical parcel metering system in which the displacement of a scale platform could be mechanically translated to a particular postage amount for a given class of service. The calculated postage could then be applied manually either as stamps or as a postage meter imprinted tape. The limitations of such a system are clear. The system would have to be kept simple by limiting its use to a particular class of service. The mechanical construction required to handle several classes of mail would be incredibly complex, making such a device difficult to build and difficult to maintain. Moreover, a mechanical structure could not be easily updated to reflect changes in postal rates or regulations.

Many of the above-discussed problems are overcome in a parcel postage metering system disclosed in U.S. Pat. No. 3,692,988, issued Sept. 19, 1972 and assigned to the assignee of the present invention. That system employs both electromechanical and electronic technologies to generate postage-representing signals as a function of a manually-entered class of service, a manually-entered zone and a parcel weight input to the system in the form of signals from a scale mechanism. This data is used to access a postage memory wherein postage representations are stored as a function of the input data.

The system described above is a highly effective and useful system. However, developments in solid state technology have made it possible to consider a system in which the major components of the system are controlled by individual processors. For example, the scale mechanism would be controlled by its own processor as would the device for setting the meters. Such a multiprocessor system would be considerably more versatile than known parcel postage metering systems. This system could be programmed to handle different classes of service, different special fees and changes in the postal regulations.

One problem which is created in a multiprocessor system is how to transfer data between the different processors of the system. Conventionally, multiprocessor systems have employed parallel data buses with elaborate error checking schemes to assure the integrity of the data. While the conventional data transfer arrangements may be suitable for high speed, large scale multiprocessor systems, the cost and complexity of such arrangements have rendered them impractical for use in systems such as a multiprocessor parcel postage metering system.

SUMMARY OF THE INVENTION

The present invention is a multiprocessor parcel postage metering system in which data can be transferred simply and reliably and which may include a simple error checking routine for assuring the integrity of the transferred data.

A system constructed in accordance with the present invention may be characterized as a bus control system for controlling the transfers of data between processors in a multiprocessor system wherein one of the processors is a system processor. The system processor initiates and controls all transfers, which transfers occur in alternating directions on a serial data bus by means of a control signal which is interpreted as a demand by the system processor or one processor other than the system processor for a data exchange and a serial data bus common to all of the processors for carrying the data to be exchanged between communicating processors and the system.

DESCRIPTION OF THE DRAWINGS

While the specification concludes with claims particularly pointing out and distinctly claiming that which is regarded as the present invention, further details of a preferred embodiment of the invention may be more readily ascertained from the following detailed description when read in conjunction with the accompanying drawings wherein:

DESCRIPTION OF PREFERRED EMBODIMENT OF THE INVENTION

Figure 1:
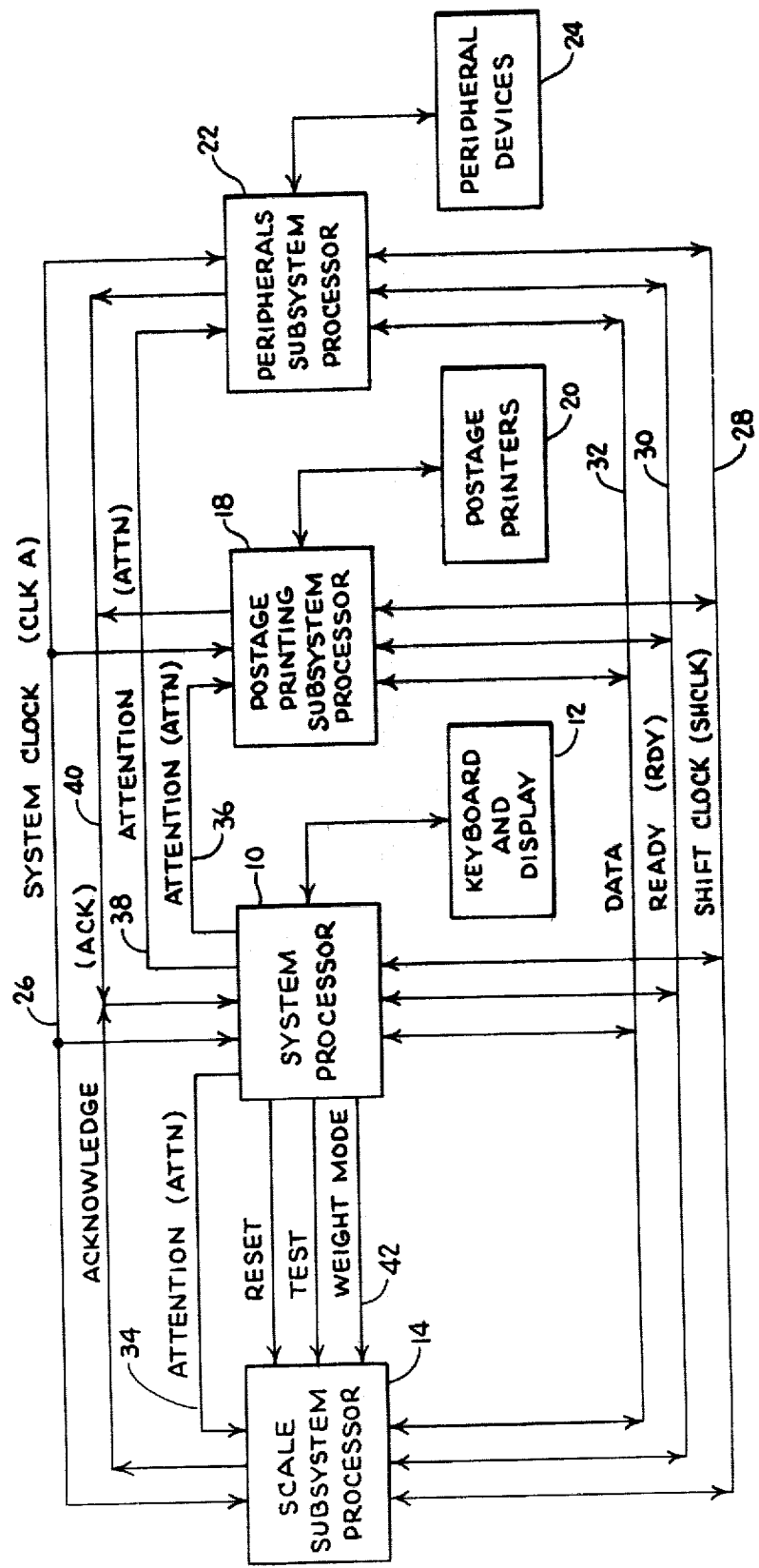
FIG. 1 is a block diagram of the major components of a multiprocessor system incorporating the present invention.

Referring to FIG. 1, the central component of the multiprocessor parcel postage metering system shown there is a system processor 10 which interfaces with a system user through an input/output subsystem 12 including a keyboard and a visual display. In the preferred embodiment of the invention the keyboard is used to enter data concerning class of service, destination zone, special fees and the like. In one embodiment of the invention, the first three digits of the zip codes for the point of origin and point of destination of a parcel may be entered through the keyboard. A zip-to-zone subroutine programmed into the system processor would convert the entered data to zone information. The display may be a seven-segment digit display indicating the weight of a parcel in metric or English units, its destination zone and the required postage. In a preferred embodiment, the system would provide visual error codes to inform the user of certain types of system errors.

The system processor 10 is adapted to receive weight-indicating signals from a scale subsystem processor 14 which provides an encoded weight signal representing a parcel weight in pounds and ounces or, in the metric system, in Kilograms and grams.

The system processor 10 is also connected to a postage printing subsystem processor 18 which sets and operates one or more postage printers 20. The connection between the postage printing subsystem processor 18 and the postage printers 20 is shown as bidirectional since the postage printers include sensors which supply signals to the subsystem processor representing the current setting of each printer.

The system processor 10 may also communicate with a peripherals subsystem processor 22 which can control and monitor a number of peripheral devices 24, including, for example, a parcel identification number counter of the type used for United Parcel Service postage transactions, a document printer which would provide a written record of the postage transactions occuring within the system, and a floppy disc unit or magnetic tape unit for providing magnetic record storage of the system transactions.

Operations within the multiprocessor system are controlled by system clock signals generated within the system processor 10 and applied to the processors 14, 18 and 22 over a common clock bus 26.

Other connections from the system processor 10 which are common to the other processors in the overall system include a shift clock (SHCLK) bus 28, a ready (RDY) bus 30 and a serial data bus 32. Each of these busses is bidirectional. That is, signals may be generated either at one of the subsystem processors 14, 18 or 22 and sent via the appropriate bus to the system processor 10 or at the system processor 10 and sent over the same bus to one of the subsystem processors. The form and function of each of the above-identified signals is described in more detail later. Generally, the SHCLK signals carried by bus 28 are used in shifting data from a transmitting processor to a receiving processor. The RDY signals on bus 30 provide a signal to the receiving processor that the transmitting processor is enabled to transmit binary data over the serial data bus 32.

Interprocessor communications are controlled by the system processor 10 which, operating under the control of a stored program, addresses any of the other processors with which data is to be exchanged by means of an attention (ATTN) signal. Individual connections from the system processor to the other processors carry these ATTN signals. Unlike the other earlier-discussed busses, each ATTN line runs between the system processor 10 and only one of the subsystem processors in the system. More specifically, ATTN line 34 connects the system processor 10 to the scale subsystem processor 14, ATTN line 36 connects system processor 10 to the postage printing subsystem processor 18 and ATTN line 38 connects the peripherals subsystem processor 22 to the system processor 10.

Each of the subsystem processors 14, 18 and 22 can respond to an ATTN signal transmitted over its dedicated attention line by returning an acknowledge (ACK) signal to the system processor over a common bus 40. The bus 40 can be shared by the subsystem processors since it can logically be assumed that only the subsystem processor which is being addressed over its dedicated attention line will be replying with an ACK signal. The form and function of each of these signals will also be described in more detail later.

The system processor 10 and the scale subsystem processor 14 are additionally connected by reset, test and weight mode connections 42 which give the system processor 10 a limited amount of control over the operation of the scale subsystem processor 14.

Figure 2B:
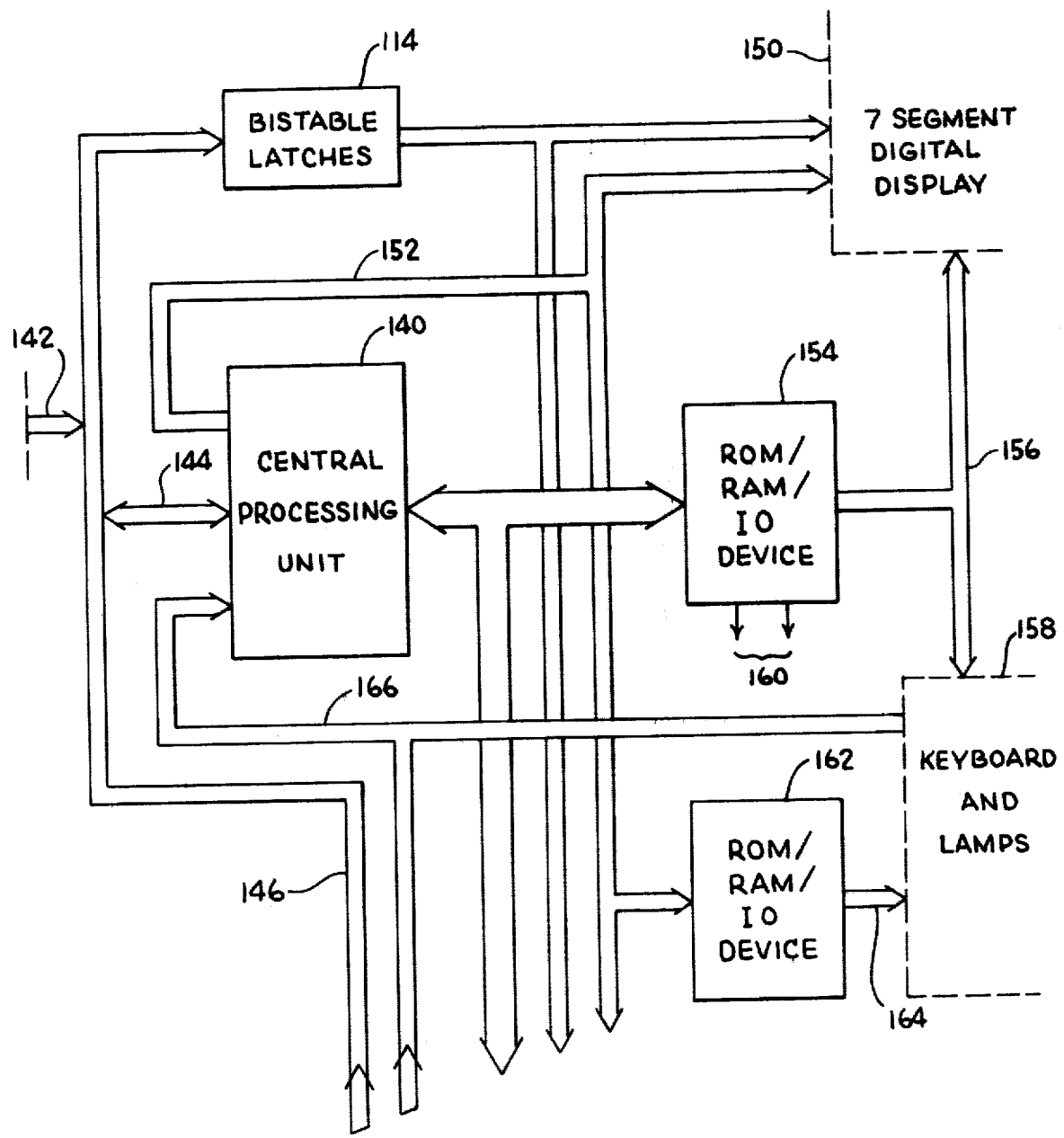
FIG. 2, comprising FIGS. 2a, 2b, and 2c taken together, is a more detailed schematic diagram of the system processor and of the system of FIG. 1.
Figure 2C:
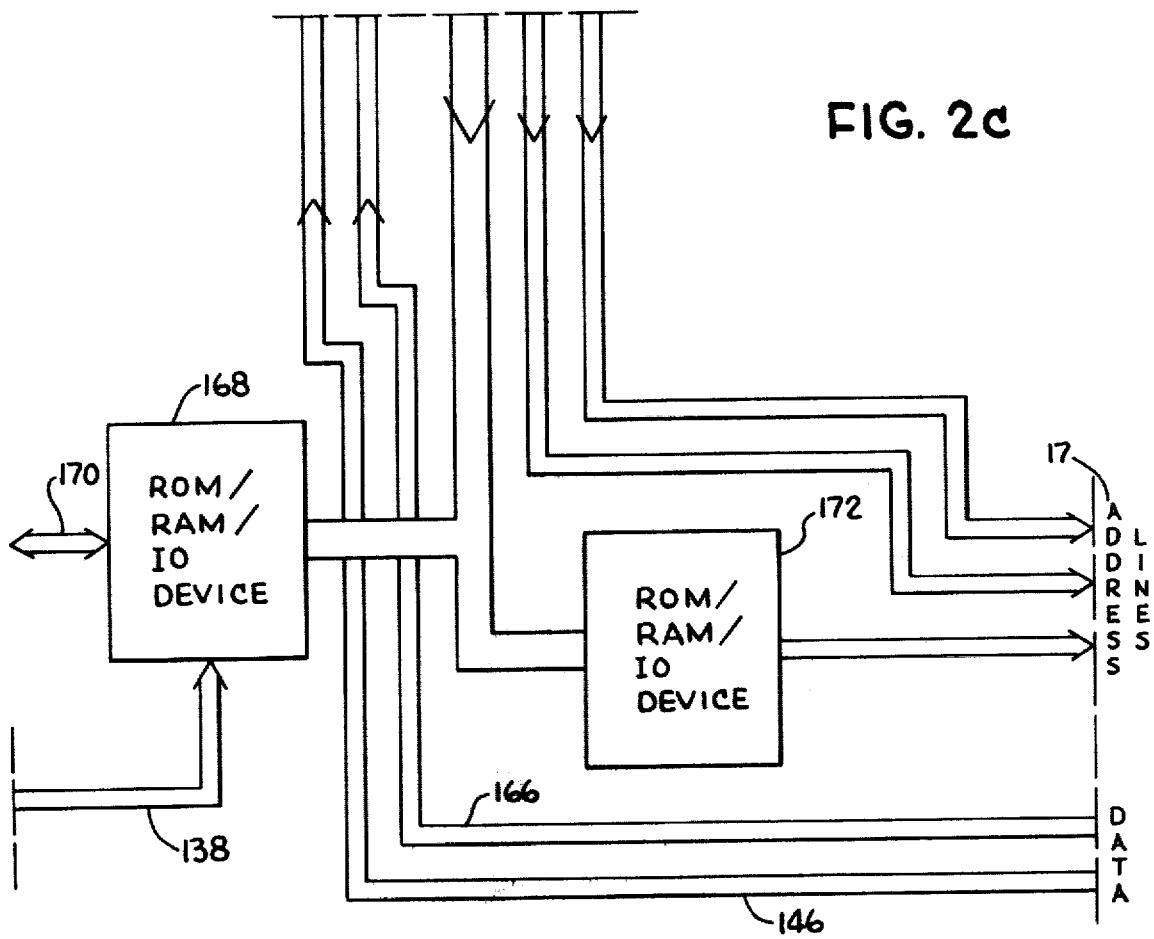

FIGS. 2a, 2b and 2c taken together provide a more detailed schematic diagram of the system processor 10. The interprocessor connections described generally with reference to FIG. 1 are shown at the left of FIG. 2a while the system input/output connections and the internal system processor connections are shown generally in FIGS. 2b and 2c.

Beginning at the upper left hand corner of FIG. 2a, the test, reset and weight mode lines 48 from the system processor to the scale subsystem processor 14 are shown in more detail. The test line 50 includes a slide switch 52 which can be manually positioned to establish either a positive 5 volt potential or a ground potential at line 50. Test line 54 and weight mode line 55 include similar slide switches 56 and 57, respectively. When the slide switch 52 is moved to the left to establish a positive 5 volt potential on test line 50, the system processor and the scale processor enter a test mode in which communication with all other processors is inhibited. In the test mode, the scale will output the five least significant weight data signals in binary coded decimal format over the serial data bus. This information will be displayed on the display associated with the system processor 10 for use by a serviceman.

The reset signal supplied over line 54 is used to signal the scale subsystem processor to reset or re-zone the scale. The weight mode signal is used to determine whether the scale output represents pounds and ounces or kilograms and grams.

An interlock terminal 58 is connected to a 5 volt source through a voltage dropping resistor. When the scale subsystem processor is in place, the terminal 54 is connected to a ground in the subsystem. If the scale subsystem is not in place, terminal 54 carries the +5 volt potential of the source. System processor 10 monitors the voltage of terminal 54 to be sure the scale is in place.

The system includes a clock circuit 60 connected to the interprocessor CLK A bus through a line driver circuit 62. The clock circuit 60 interfaces with a processor 64, dedicated primarily to controlling interprocessors communications. Line driver circuit 62 could be one stage of a tri-state line transceiver circuit such as the DS8833 integrated circuit available from National Semiconductor Corporation. Each state of this transceiver circuit can be used both as a line driver as as a line receiver in interfacing TTL circuits with MOS circuits. Each state is also capable of entering a high impedance state in which the circuit appears as an open circuit to the connected system.

As a matter of convention, a transceiver circuit (such as a line driver 62) used only to drive one of the interprocessor communication busses is referred to only as a line drive circuit. If a transceiver circuit is used only to receive signals, that circuit is described as a line receiver circuit. Where the signal flow is bidirectional, the circuit is identified as a line driver/receiver circuit.

The output 66 from the line driver circuit 62 is applied both to a CLK A bus 68 coupled to the scale subsystem processor 14 and to a CLK A bus 70 shared by the postage printing subsystem processor 18 and the peripheral subsystem processor 22.

The individual ATTN signals are provided by processor 64 through separate line drive circuits 72, 74 and 76. The dedicated line 78 to the scale processor 14. The outputs from the line driver circuits 74 and 76 are, respectively, an ATTN 2 signal supplied over line 80 to the postage printing subsystem processor 18 and an ATTN 3 signal applied on line 82 to the peripherals subsystem processor 22.

As indicated above, a single attention line is dedicated to each different subsystem processor while the ACK lines may be shared by the subsystems.

For that reason, an ACK line 84 from the scale subsystem processor 14 and ACK line 86 shared by the postage printing subsystem processor 18 and the peripherals subsystem processor 22 are combined to provide a single ACK input 88 to a line receiver circuit 90 at processor 64.

It should be noted here that while the preferred embodiment disclosed herein provides only three (3) ATTN signal output lines 78, 80 and 82 corresponding to the subsystem processors 14, 18 and 22, additional subsystem processors (not shown) may be employed, if desired, which are also controlled by the system processor 10; this may be simply accomplished using multiplexing techniques. For example, if it is desired to utilize several more subsystem processors in connection with the preferred embodiment, output lines 78, 80 and 82 of the communication controller processor 64 may be coupled with the inputs of a 3-to-8 line decoder demultiplexer such as that available by the Signetics Corporation and identified by part number 74138, thereby providing a total of eight (8) ATTN signal output lines, each of which may be coupled with respectively associated subsystem processors.

Connections for those signals which can originate either at the system processor at at one of the subsystem processors, depending on which of the processors is transmitting, are also shown. Data shifting pulses are provided over SHCLK line 92 to the scale subsystem processor 14 and SHCLK line 94 shared by the postage printing subsystem processor 18 and peripherals subsystem processor 22. Thse two lines are connected through a common line 96 to a line driver/receiver circuit 98 having a direct output connection 100 and an input connection to the processor 64 through a high impedance switching circuit 102. When processor 64 is the transmitting processor, line driver/receiver circuit 98 is conditioned by a control circuit 104 to transmit output SHCLK pulses from processor 64 to the SHCLK terminals 92 and 94. Only the processor previously addressed by a signal on one of the dedicated ATTN lines will, however, be conditioned to accept the SHCLK pulses. The line driver/receiver circuits of non-addressed processors will be in their high impedance states and will effectively block SHCLK signals to their processors.

When the processor 64 is the receiving processor, line drive/receiver circuit 98 is conditioned by circuit 104 to accept SHCLK pulses over common connection 96 from either of the SHCLK lines 92 and 94.

The connections between the processor 64 and the other processors in the system include the RDY bus 106 to the scale subsystem processor 14 and RDY bus 108 to the postage printing subsystem processor 18 and peripherals subsystem processor 22. These two RDY busses have a common connection 110 to a line driver/receiver circuit 112 having an input connection 114 to the processor 64. The output connection for the line driver/receiver circuit 112 is a 5 volt source. Whenever circuit 112 is conditioned to operate in its drive mode, this 5 volt signal is supplied over common connection 110 to the RDY busses 106 and 108.

The serial data bus by which all data is transferred from one processor to another in the system is also a shared bus. The data bus includes a first connection 116 to the scale subsystem processor 14 and another connection 118 shared by the postage printing subsystem processor 18 and the peripherals subsystem processor 22. A single lead 120 from 116 and 118 is tied to a line driver/receiver circuit 122 having an input connection 124 and an output connection 126 to the processor 64.

Figure 3:
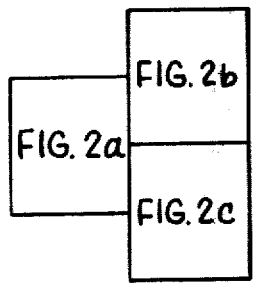
FIG. 3 illustrates the proper orientation of FIGS. 2a, 2b and 2c.

While the processor 64 is defined as part of the system processor 10, processor 64 is dedicated primarily to controlling communications with other processors in the complete system. Processor 64 serves a supporting role relative to a central processor unit 140 to which it is connected through a four line signal path 142 shown both in FIG. 2a and 2b. As indicated by FIG. 3, the overall system is laid out with FIG. 2b and 2c being located to the right of FIG. 2a. Connections common to the different figures are represented by cable connections which, if extended, would continue into similar cable connections in adjoining figures. For example, if cable 142 were extended from the right side of FIG. 2a, it would continue into the cable 142 shown to the left side of FIG. 2b. While the system has been broken down for purposes of illustration by the use of such discontinuous cable, it should be understood that cables bearing the same number in different figures are actually the same, continuing cable.

The four bit parallel output from processor 64 at cable 142 is supplied to the central processing unit 140 at input/output terminals connected to a cable 144. Postage rate data is similarly applied to the central processing unit 140 through cable 144 from a four bit lead 146 to a postal rate read only memory to be described in more detail later.

The central processing unit 140 controls a digital display 150 through a four bit parallel output to a set 148 of bistable latches and another four bit parallel output 152 applied directly to the digital display 150. In a preferred embodiment of the invention, the central processing unit 140 is also connected to a ROM/RAM/IO device 154 which, as the name indicates, contains read only memory storage locations, random access read/write storage locations and input/output ports. Device 154 may, by itself, be conventional in nature. For example, an A17 integrated circuit chip manufactured by Rockwell International Corporation provides each of the functions of device 154.

The primary output from ROM/RAM/IO device 154 is a set 156 of strobe outputs which are used to sequentially strobe or energize both the individual digits in the digital display 150 and columns of key-actuated switches in a system keyboard 158. The device 154 also includes chip select outputs 160 for permitting the central processor unit to address other ROM/RAM/IO units via unit 154.

Another of the ROM/RAM/IO devices included within system processor 10 is device 162 which provides read only and read/write storage locations and a multiple bit output 164 which can be decoded to drive indicator lamps in the keyboard and lamp circuit 158. As will be explained in more detail later, the keyboard 158 can provide data from up to forty keys through four parallel leads 166 to the central processing unit 140 to identify which keys on the keyboard are depressed.

Referring to FIG. 2c, the system processor includes a third ROM/RAM/IO device 168 to which cable 138 is connected. The device 168 also communicates directly with the processor 64 through five parallel input/output leads 170. Device 168 communicates with the central processor unit 140 and with a fourth ROM/RAM/IO device 172. Device 172 has a four bit output which, in combination with two other four bit outputs from the central processing unit 140, provided a twelve bit address for accessing read only memory 174 to retrieve postage rate information. The required postage rate data is, in one embodiment, stored on several read only memory chips. For that reason, some of the twelve bits of addressing information is necessarily used to select the chip from which postage data is to be retrieved with the remaining bits being used to select a particular storage location on that chip. Postage data retrieved from the memory 174 is presented in parallel over two four bit cables 146 and 166, also shown in FIG. 2b. All data provided over the eight data lines is input to the central processing unit 140.

Figure 4:
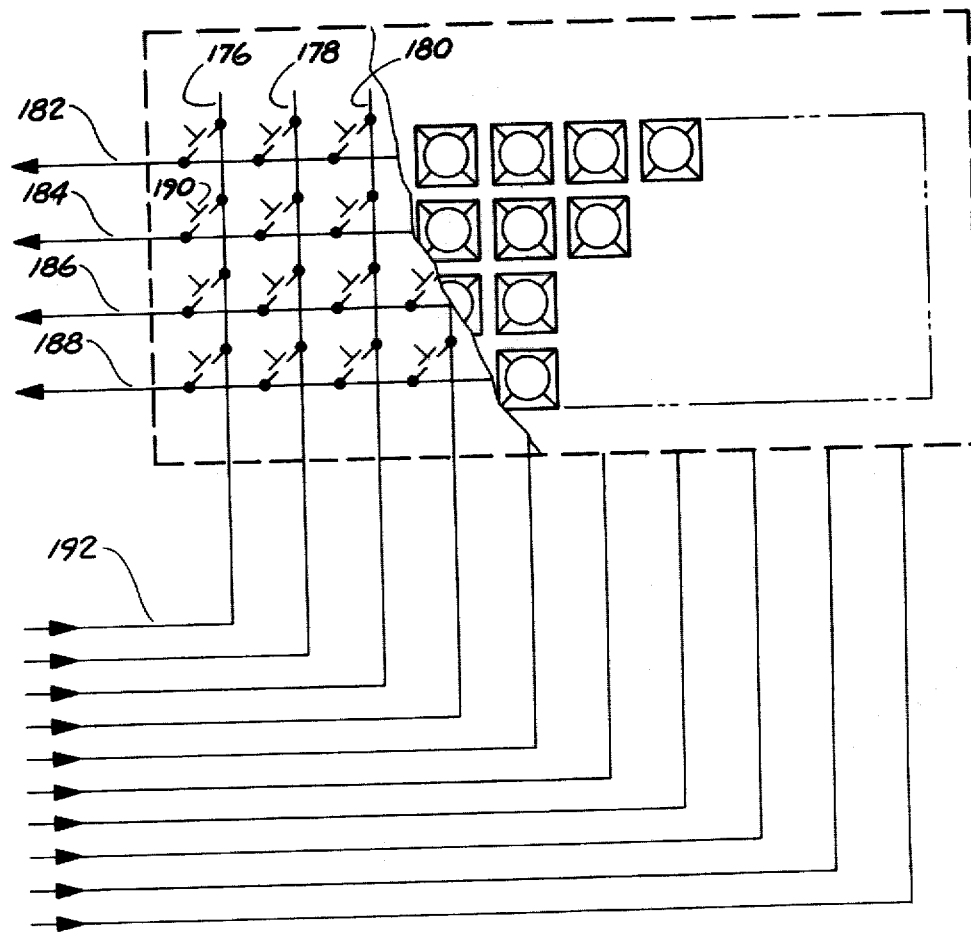
FIG. 4 is a schematic representation of the keyboard data entry subsystem.

The number of keys in the keyboard of the system may vary, depending upon the complexity of the functions which the system is expected to serve. For example, if the system is to be used only for printing postage for parcels to be mailed through the United States Postal Service, the system is less complex and fewer keys are needed than if the system is to provide postage printing for both USPS and United Parcel Service or UPS mailings. In a preferred embodiment of the system, up to 40 different key depressions can be detected by arranging the keys of the keyboard in a row and column matrix with each of the rows having a common connection to a keyboard return to the system and each of the columns having a common connection to a strobe output from the system. Such an arrangement is illustrated in FIG. 4 wherein three complete columns 176, 178 and 180 of key connections are shown. Four keyboard return lines 182, 184, 186 and 188 are also shown. Each column is connected to one of ten strobe outputs from the ROM/RAM/IO device 154. The device 154 sequentially raises these strobe outputs to provide a binary one signal which ripples across the array of strobe connections. If a switch at the junction of a particular column and a particular row is closed or depressed when the strobe line is energized, the binary one signal is transmitted on the return back to the system. Conversely, if the switch is open when the column voltage is raised to a binary one level, the return will see only an open circuit. As a specific example, if a switch 190 at the junction of column 176 and row 184 is closed when strobe line 192 is driven to a binary one level, the voltage return 184 will carry a binary one signal. If the remaining switches in column 176 are open at the time, a 0100 signal would be read by the system. The keyboard is periodically polled by the system by raising the voltage on the strobe lines in succession, permitting the keyboard to be checked for depressed keys four at a time.

As indicated earlier, it is not expected that all forty possible keyboard positions in the row and column matrix will necessarily be utilized. The simplest parcel postage metering system presently contemplated would include a ten digit (0–9) numeric keyboard for entering zone information, postage (when known) and amounts for special fees for special handling, insurance, etc. In this system, the special fees would be determined from rate charts. The numeric entry keyboard would also include a clear key for permitting a user to clear incorrect entries and a dollar add key which allows the processor to recognize that the numeric data being input is an added special fee or a postage amount rather than zone information. Such a system would also include a print key by which the operator would command the system to print the postage indicated in a dollar/number display. Keys for permitting the operator to select first/priority or third/fourth or book rate class of service would be included in this simple system.

A slightly more complex system would allow an operator to select an express class or library class of service in the U.S. Postal Service system and to specify which of a number of special fees are to be automatically added to the computed postage. Special fees would include a registered mail fee, special delivery fee, special handling fee, special rate fee, an oversize parcel fee, a return recipt fee, a certified mail fee, and parcel insurance. Such a system might also include a zip key which would condition the processor to receive entered zip code information and to convert that information to a zone number.

In still another embodiment, the user would have the added options of having the processor calculate postage for one of several UPS classes of service of four international surface on air mail. In this embodiment, the system keyboard could include a weight entry key for permitting the operator to directly enter parcel weight, bypassing the scale mechanisms.

Generally, the system described below includes all of the elements and components required for the last-described and most versatile embodiment of the parcel postage metering system. In most cases, it will be apparent which components would not be needed for the less sophisticated embodiments of the system.

Figure 5:
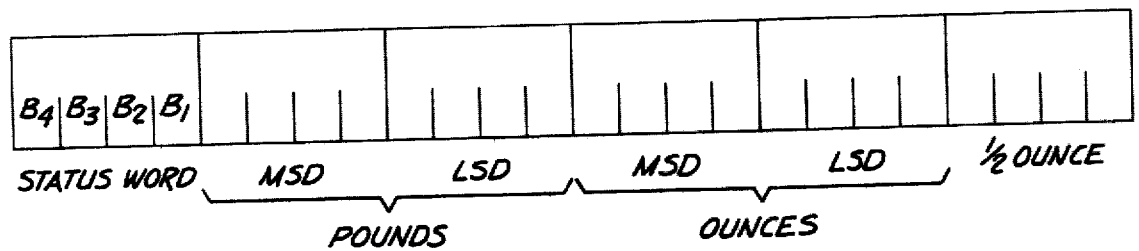
FIG. 5 shows the format of a message transmitted from a scale processor to the system processor.

The format for data transferred from the scale processor 14 to the system processor 10 is shown in FIG. 5. Scale data is transmitted over the serial data bus in a six word message comprising a status word, plus (in English units) two pound weight information words, two ounce weight information words and one word of half ounce weight information. Where the weight is expressed in metric units, two of the words would represent kilograms while the three remaining words would represent 100 gram, 10 gram and 5 gram weights, respectively. Each word in the message is four bits long. The five weight information words present information in binary coded decimal or BCD format. In a preferred embodiment, the scale is capable of resolving parcel weight to the nearest half ounce or nearest five grams. Therefore, the last information word in the message format is always either 0101 (representing a half ounce or five grams) or 0000, indicating the parcel weight is rounded to the nearest next larger weight unit.

The status word is a four bit word used to convey information about scale operation from the scale subsystem processor 14 to the system processor 10. In one embodiment of the invention, the most significant bit B4 of the status word is used to identify the type of scale from which weight information is being transmitted. Depending upon its intended use, the system may be concurrently connected to a scale having a relatively small capacity, such as 12 pounds, and to a scale having larger capacity such as 25 pounds or 70 pounds. The system destinguishes between the 12 pound scale and the other two scales since different data processing steps are required.

Bit $B_3$ is a data validation bit which must possess a predetermined binary value before the system processor will accept the weight information in the message as valid. A data validation bit is necessary in the status word since the scale processor will supply weight information to the system processor upon command without regard to whether the scale has reached an equilibrium condition. The value of bit $B_3$ indicates to the system processor whether the scale is still moving, and therefore generating invalid weight signals, or whether it has reached a steady state or equilibrium condition in which valid weight readings can be taken. Bit $B_2$ of the status word is an "overweight" bit which indicates to the system processor whether the parcel weight has exceeded the maximum weight which the scale can normally be expected to measure. This bit inhibits the system from treating an overweight package as if it weighed the maximum possible scale weight.

Bit $B_1$ of the status word is a sign bit which is used in checking scale calibration. A negative scale weight reading, preferably indicated by binary 1 in this bit position of the status word, would indicate that the scale needs to be recalibrated.

The above-described functions of the individual bits in the status word presumes the scale is operating normally. The status word can also be presented by the scale subsystem processor to indicate a malfunction in either the scale element or in the scale processor connected to that element. For example, setting the status word to 1111 might be used to indicate a weighing element malfunction while a status word of 0111 might be used to indicate a scale subsystem processor malfunction.

Figure 7:
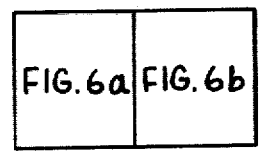
FIG. 7 illustrates the proper orientation of FIGS. 6a and 6b.
Figure 6A:
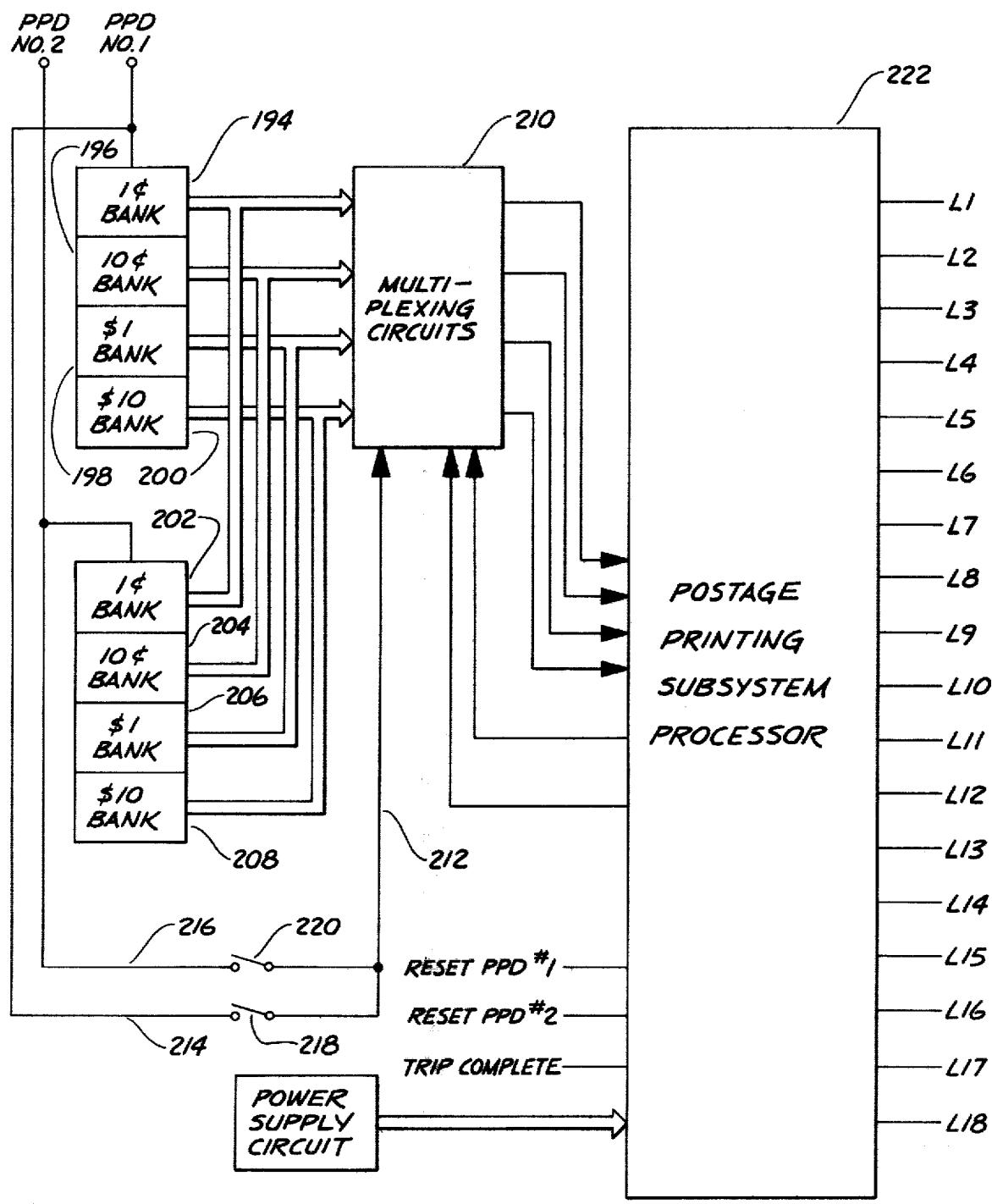
FIG. 6, consisting of FIGS. 6a and 6b taken together, is a more detailed schematic diagram of the postage printing subsystem processor with its input and output circuits.
Figure 6B:
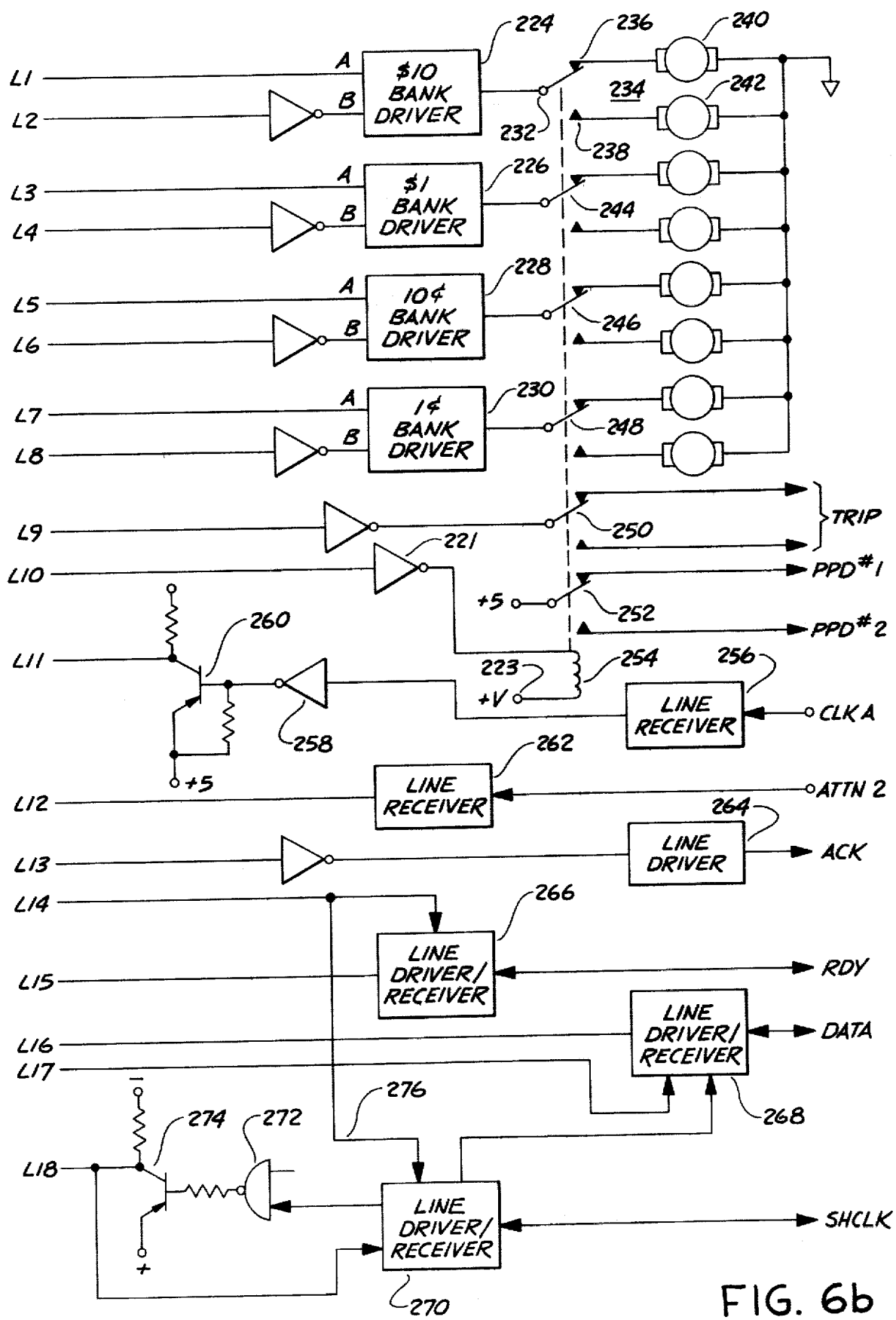

FIGS. 6a and 6b, taken together, provide further details concerning a postage printing subsystem according to a preferred embodiment of the invention. Brief reference should be made to FIG. 7 which establishes the correct orientation of FIGS. 6a and 6b relative to one another.

The postage printing subsystem processor 222 can be used to set either of two postage printing devices identified as printers PPD1 and PPD2. Only the electrical components of these postage printing devices are illustrated. Basically, each device is a four digit printer with each digit or bank being independently settable to a numerical value in the 0-9 range. Referring specifically to FIG. 6a, the current setting of each digit of the PPD1 printer is detected by sensor circuits 914, 196, 198 and 200, each of which provides a multiple bit output which may be decoded to determine the current position of the associated printing element. The current settings of the printing element in the PPD2 printer are monitored by a separate set of sensor circuits 202, 204, 206 and 208.

The sensor outputs for the corresponding digits in the two printing devices are combined at the input to a multiplexing circuit 210, which is also supplied with signals indicating whether one or both of the printing devices are actually in place. These printer-in-place signals are provided over an input 212 which branches to a lead 214 from a PPD1 power circuit and to a lead 216 from a PPD2 power circuit. Branch 214 includes a similar switch 220. If the printing device energized by the corresponding power circuit is in place, the switch in that branch is closed by means of a mechanical interlock. When the power circuit is energized, a positive voltage is established on the input 212 through the closed switch. The lack of a positive voltage on input 212 when a printing device has been nominally selected is interpreted as meaning that the printing device is not actually in place.

In a preferred embodiment, each sensor circuit input to the multiplexing circuit 210 is a three bit word. The multiplexing circuit 210 selects each three bit word in sequence, passing those signals onto the postage printing subsystem processor 222. The multiplexing circuit 210 cannot, of course, distinguish between the three bit words supplied by corresponding sensor circuits in the two set of circuits; for example sensor circuit 194 and sensor circuit 202. The processor must "remember"-which printing device is being monitored in order to know which of the two sets of sensor circuits it is actually reading. The set of non-selected sensor circuits is not energized and can not interfere with the the reading of the selected sensors.

Other inputs to the postage printing subsystem processor 222 include a RESET PPD1 input, a RESET PPD2 input and a TRIP COMPLETE input. The RESET inputs are operator-initiated inputs which will cause all printing banks of the identified printing device to be reset to zero. The TRIP COMPLETE input is an optical input which indicates to the processor that all mechanical interlocks which might otherwise inhibit a postage printing cycle have been cleared.

Other input/output connections to the postage printing subsystem processor 222 includes a set of leads L1–L18. Of these, L1–L10 provide the control signals for setting the printing devices while leads L11–L18 provide the interface to the other processors in the multiprocessor system.

Lines L1 and L2 are connected to a pair of inputs to a motor drive circuit 224 for the printing elements in the $10 bank of the postage printing devices. A motor driver circuit 226 for the $1 bank is similarly connected to lines L3 and L4 while a motor driver circuit 228 for the $0.10 banks is connected to lines L5 and L6. Finally, motor driver circuit 230 for the $0.10 banks is connected to lines L7 and L8 from the processor 222. An output from each of the motor driver circuits 224, 226, 228 and 230 is connected to one terminal of a single pole double throw (SPDT) switch which permits the motor driver circuit to be connected to either of two electrical motors. For example, the output of motor driver circuit 224 is connected to a terminal 232 of a SPDT switch 234 having contacts 236 and 238. When terminal 232 is tied electrically to the contact 236, the motor driver circuit 224 controls an electric motor 240 which can be driven in either direction to set the printing element in the $10 bank of one of the printing devices to a desired position. Conversely, when the terminal 232 is electrically connected to the contact 238, the motor driver circuit 224 controls a second motor 242 which sets the printing element in the $10 bank of the second printing device.

Each of the motor driver circuits decodes the two inputs it receives from the processor 222 to provide control signals which will cause a positive voltage, a negative voltage or no voltage at all to be applied to the SPDT switch at the circuit output. since the opposite terminal of each motor is connected to ground, the polarity of the input voltage or the lack of such a voltage determines whether the motors are being driven and, if so, in what direction. A truth table for the inputs to each of the motor driver circuits is:

| Input | | Motor Output |
|---|---|---|
| A | B | |
| 0 | 0 | Decrease Bank Setting |
| 0 | 1 | Illegal Not Used |
| 1 | 0 | No Change in Bank Setting |
| 1 | 1 | Increase Bank Setting |

A similar SPDT switch 250 connected to output L9 from processor 222 is used to provide a print-enabling TRIP signal to a selected one of the printing devices once the necessary conditions have been found to exist. Another SPDT switch 252 has its "input" connected to a five volt source and its output terminals connected to the PPD1 and PPD2 power supply terminals shown at the top left corner of FIGS. 6a.

All of the above-described SPDT switches are ganged for synchronous operation under the control of a solenoid 254 having its lower terminal connected to a positive voltage source 223 and its upper terminal connected through an inverter 221 to line L10 from postage printing device processor 222. When the solenoid 254 is de-energized by driving the output of inverter 221 to the level of the voltage from source 223, the blade of each of the switches remains in its upper position. In the upper position, drive motors for printing device PPD1 are connected to the motor driver circuits 224, 226, 228 and 230 while the five volt source is connected through switch 252 to provide power for the sensor circuits 194, 196, 198 and 200 for device PPD1. Conversely, when the solenoid 254 is energized, the SPDT switches are set to their lower positions wherein the setting motors for printing device PPD2 are connected to the motor driver circuits while the sensor circuits 202, 204, 206 and 208 are energized by the five volt source connected to switch 252.

The postage printing subsystem processor 222 interfaces with the other processors in the system through lines L11–L18. The system clock or CLK A signals are applied to line receiver circuit 256 which drives an inverter amplifier 258 at the input to a high impedance switching circuit 260. The output from the switching circuit 260 is connected to terminal L11 to provide clock pulses for synchronizing operations within the postage printing subsystem processor 222 with operations elsewhere in the system.

The attention signal ATTN2 dedicated to the postage printing subsystem processor 222 is applied to terminal L12 through a line receiver circuit 262 while the acknowledgement signal ACK provided by the processor 222 in response to the ATTN2 signal is output from terminal L13 through a line driver circuit 264.

RDY signals originating elsewhere in the system are applied to terminal L15 of the processor 222 through a line driver/receiver circuit 266 while RDY signals originating within processor 222 are output from terminal L14 to the circuit 266.

The serial data bus over which the processor 222 exchanges status information and data with the remainder of the system includes a line driver/receiver circuit 268 through which incoming data can be applied to terminal L16 of the processor 222. Data originating within the processor 222 is output from terminal L17 to the line driver/receiver circuit 268.

SHLCK pulses used in transmitting data to and from the processor 222 one bit at a time are applied through line driver/receiver circuit 270. Incoming SHLCK pulses are applied through circuit 270 and serially-connected inverter gate 272 to a high impedance switching circuit 274, the output of which is connected to terminal L18 of the processor 222. Outgoing SHLCK pulses are generated only when such pulses appear on terminal L18 while a connection 276 from terminal L14 to the line driver/receiver circuit 270 indicates that the outgoing RDY line is also high. When both conditions are satisfied, line driver/receiver circuit 270 passes data shifting pulses to the line driver/receiver circuit 268 in the DATA bus circuit to permit data to be transmitted from the processor 222 onto the serial data bus.

Figure 8:
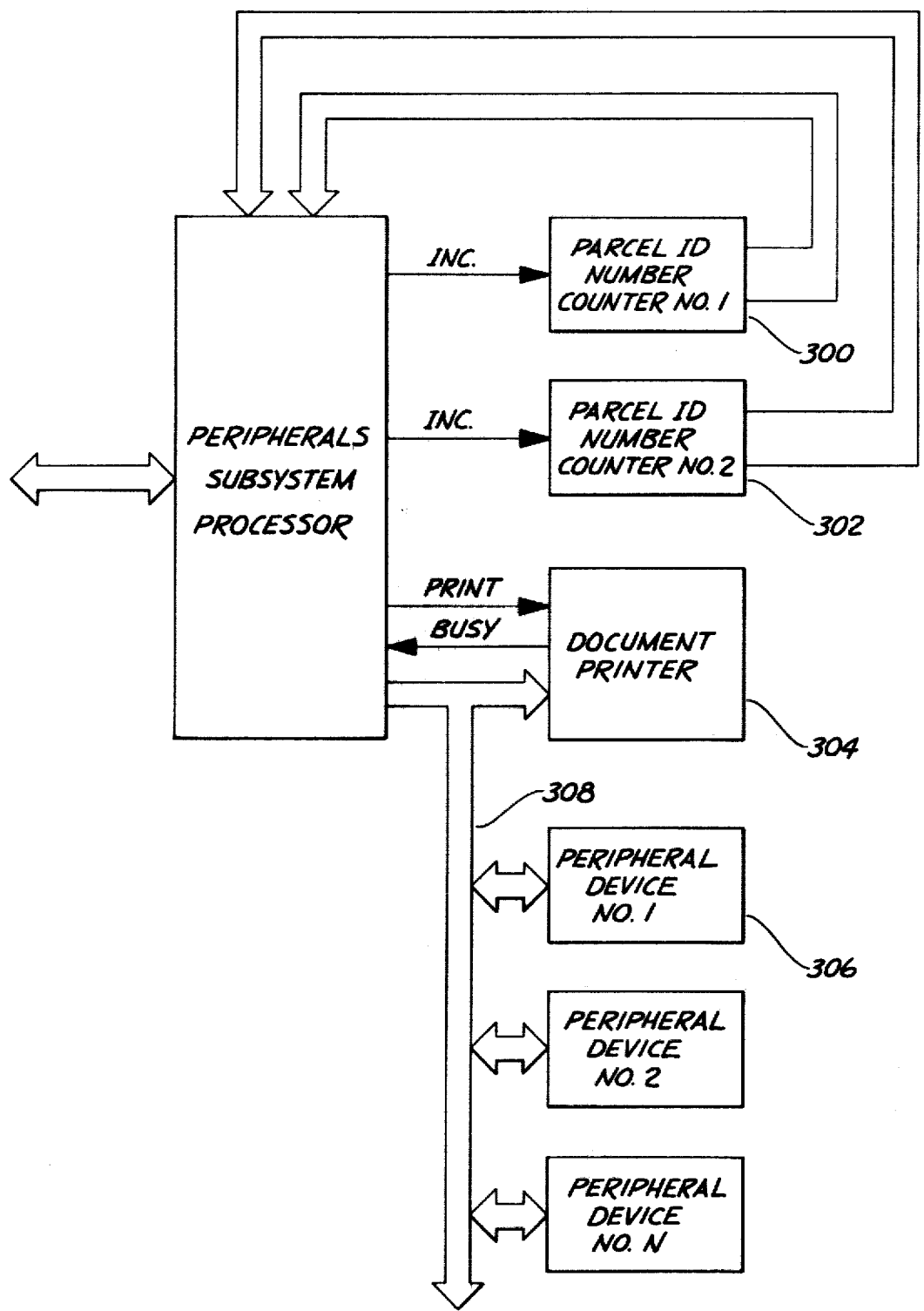
FIG. 8 is a general block diagram of the peripherals subsystem processor, showing output devices which can be controlled by the processor.

Less sophisticated embodiments of the multiprocessor parcel postage metering system might include only the hardware described with reference to the foregoing figures. A more sophisticated embodiment could include a peripheral devices subsystem of the type shown generally in FIG. 8. Such a subsystem would include a peripherals subsystem processor 298 for controlling and monitoring the operation of peripheral devices such as a first parcel identification number counter, 300, a second parcel identification number counter 302 and a document printer 304. The processor 298 might also be used to control a number of other peripheral devices, such as device 306, through a parallel data bus 308. The types of peripheral devices which may be connected to the parallel data bus 308 include journal printers for printing transaction summaries, magnetic storage devices such as floppy disc units or magnetic tape units for providing bulk magnetic storage of postage transactions, and modems for transmitting postage transaction data to remote locations.

The parcel identification number counters 300 and 302 are used only in conjunction with UPS postage transactions. The counter is incremented for each UPS register tape produced by an associated printing device. Provision is made for two such counters since the multiprocessor system may be adapted to drive two UPS printing device under special conditions rather than the more common arrangement of one UPS postage printer.

The peripherals subsystem processor 298 provides only an increment signal to the counter 300 and 302. The counter itself generates a four digit binary coded decimal number which is fed back to the processor 298 to be printed by the document printer 304 and recorded on other peripheral devices as appropriate.

Figure 10:
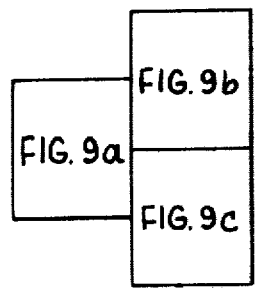
FIG. 10 shows the proper orientation of FIGS. 9a, 9b and 9c.
Figure 9A:
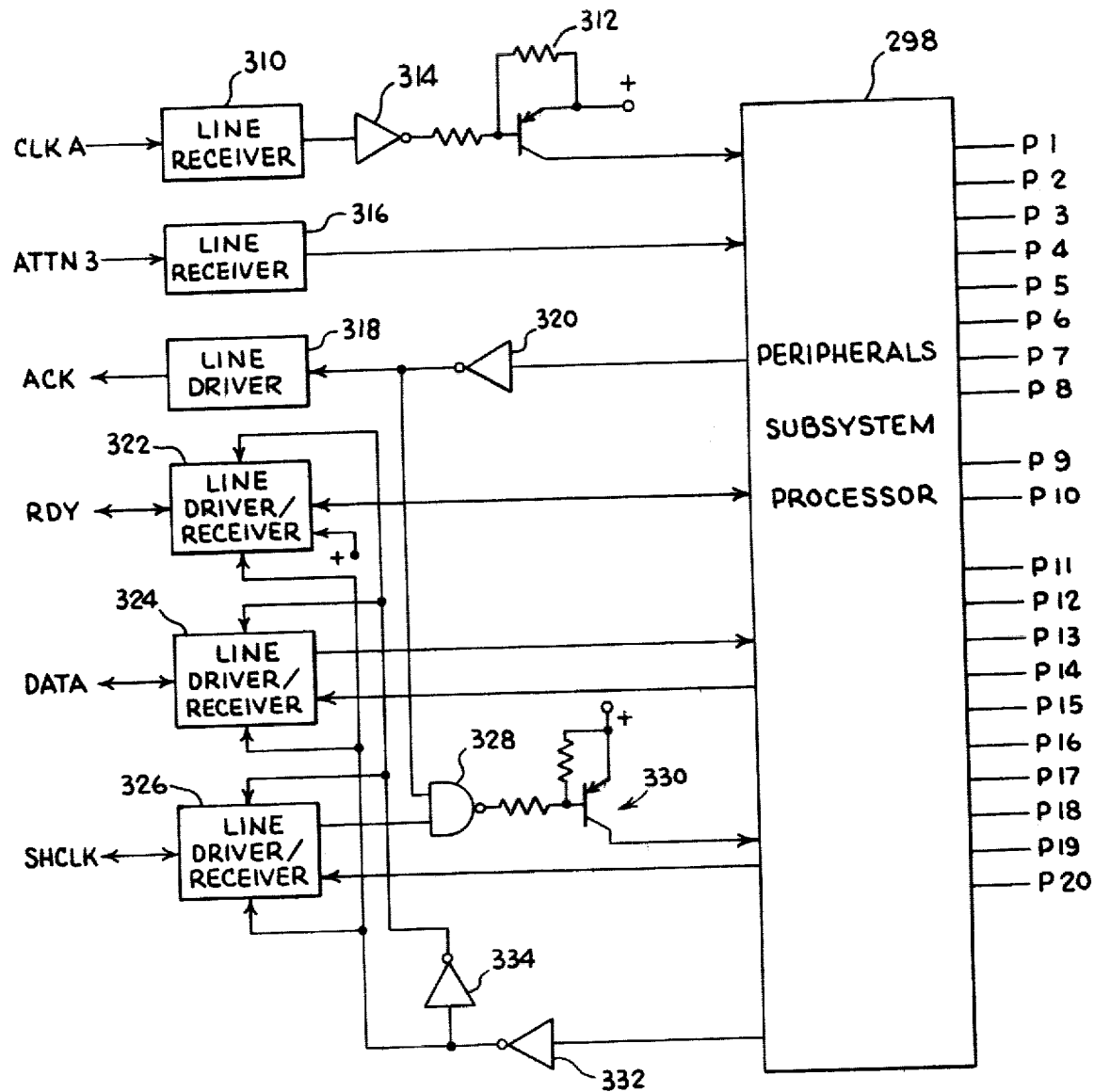
FIG. 9, consisting of FIGS. 9a, 9b and 9c taken together, is a more detailed schematic diagram of the peripherals subsystem processor and its input/output circuitry.
Figure 9B:
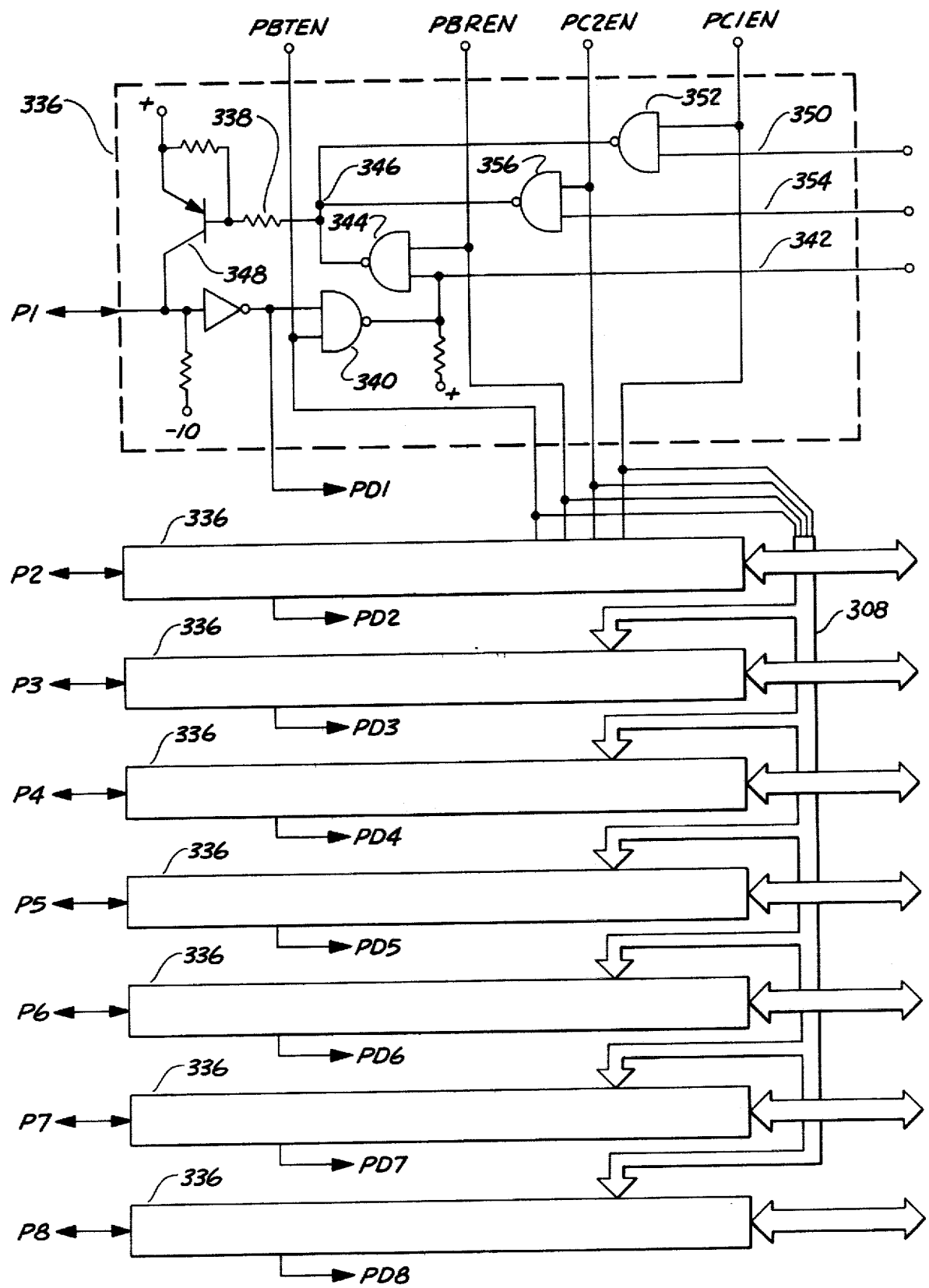
Figure 9C:
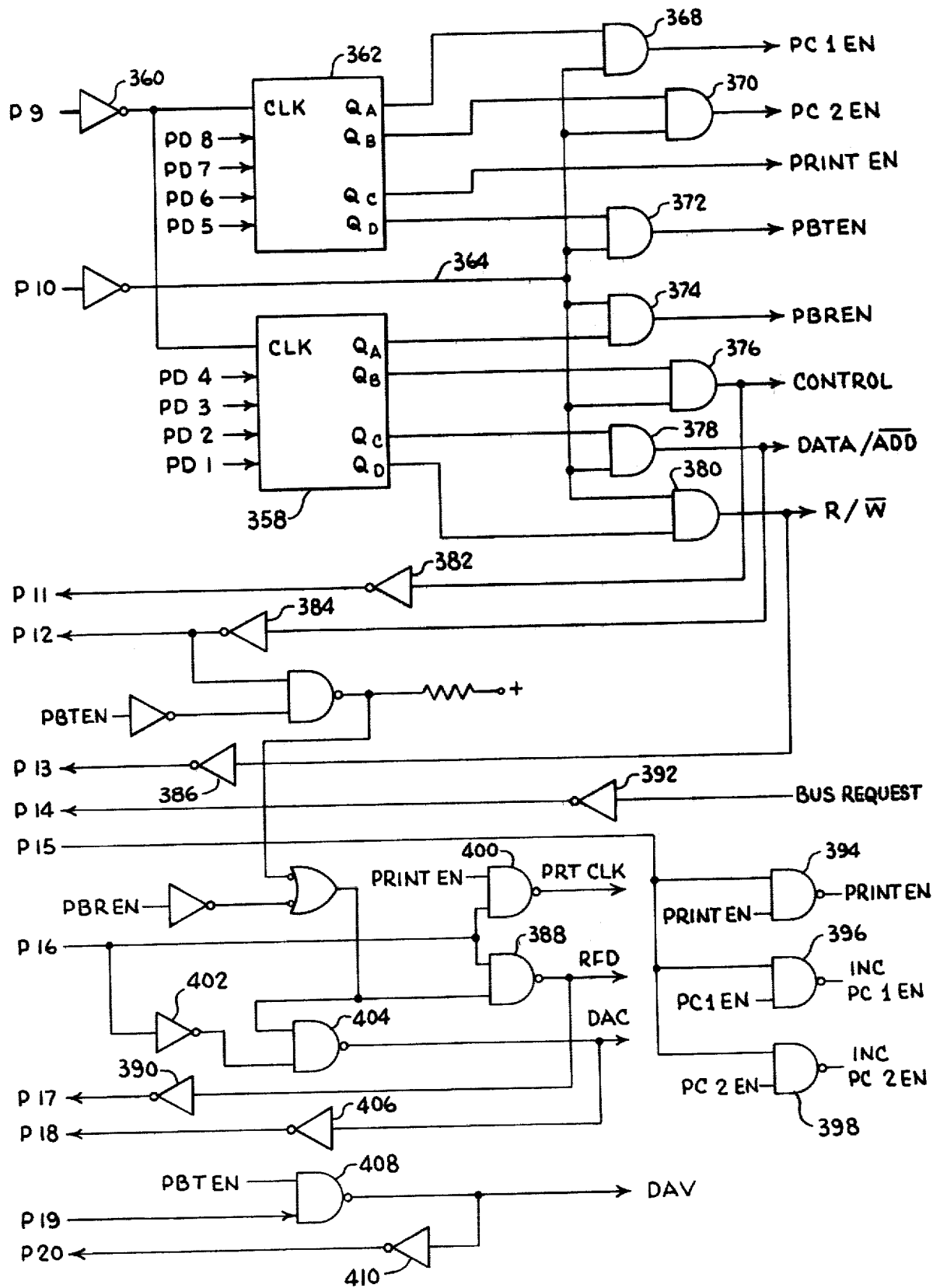

Further details concerning the peripherals subsystem processor appear in FIGS. 9a, 9b and 9c, which can be most readily comprehended when oriented relative to one another in a manner shown in FIG. 10.

Referring first to FIG. 9a, the peripherals subsystem processor 298 communicates with the other processors in the multiprocessor system through an interface identical to those previously discussed. That is, the system clock signals CLK A are applied to the processor 298 through a line receiver circuit 310 which drives a high impedance switching circuit 312 through an interposed inverter amplifier 314. The attention signal ATTN 3 for the processor 298 is applied through a line receiver circuit 316 while the acknowledgment signal ACK is output from processor 298 to the system processor through a line driver circuit 318 and an interposed inverter amplifier 320.

The ready signal RDY, which can originate in either perpheral subsystem processor 298 or in the system processor, is transmitted through a line driver/receiver circuit 322. The interface for the serial data bus is a line driver/receiver circuit 324.

Shift clock pulses SHLCK used to transfer data from processor 298 onto the serial data bus are transmitted directly from the processor 298 through a line driver/receiver circuit 326. Incoming SHCLK pulses are applied to one input of a NAND gate 328, the second input to which is provided by the output of inverter amplifier 320 in the ACK signal circuit. This connection between the ACK and SHCLK circuits prevents incoming clock pulses from being applied to the processor 298 unless the acknowledgment output from the processor is high. The output of NAND gate 328 drives a high impedance switching circuit 330 which actually applies the incoming SHCLK pulses to the processor 298.

The line driver/receiver circuits 322, 324 and 326 are conditioned to operate in either a drive or a receive mode by a control circuit which includes a first inverter amplifier 332 having its input connected to the processor 298 and output connections to each of the line driver/receiver circuits and to a second inverter amplifier 334. Outputs from the second inverter amplifier are also applied to the line driver/receiver circuits. When the output of inverter amplifier 322 is high, the circuits 322, 324 and 326 are conditioned for operation in a receive mode. When the output of amplifier 332 is high, the output of amplifier 334 is necessarily low, inhibiting operation of the circuits in a drive mode. Conversely, when the output of amplifier 332 goes low, the output of amplifier 334 is driven high to enable the circuits 332, 334 and 326 to begin operating in a drive mode.

The processor 298 interfaces with peripheral devices within the subsystem through a series of connections PL-P20. Output terminals P1-P8 form an eight-bit parellel bus which can be used to transmit or receive data from the controlled peripherals as well as to command and address the peripherals. The current mode of operation (transmit or receive) of the parallel data bus and the interpretation of signals being carried on the bus is controlled primarily by means of signals generated at the remaining (P9-P20) output terminals from the peripherals subsystem processor 298.

FIG. 9b illustrates the parallel data bus in greater detail. The input/output logic circuit 335 which controls the mode of operation for output line P1 is shown in detail. It should be understood that logic circuits identical to system 336 are also connected in line with each of the remaining output terminals P2-P8, but these circuits are shown only in block form to simplify the drawings.

The P1 output from the controller 298 is applied through an inverter ammplifier 338 to one input of a dual input NAND gate 340. The second input to NAND gate 340 is a PBTEN control input which is high whenever the parallel bus is to be used in a transmit mode and is low whenever the bus is to be operated in a receive mode. The PBTEN control input is applied to corresponding NAND gates in the logic circuits associated with the other lines P2-P8 through a connection illustrated as a cable connection 342. Cable connection 342 carries other control signals described below.

The output of the NAND gate 340 is supplied to a bus output terminal 342 which is bidirectional and carries incoming signals transmitted from peripherals connected to the parallel bus. The incoming signals received over connection 342 are applied to one input of a dual input NAND gate 344, the second input to which is a PDREN control signal which enables the parallel bus to operate in a receive mode. The PBREN control signal is low when the bus is operating in a transmit mode but goes high when the bus is operated in a receive mode. Incoming signals applied to the NAND gate 342 are output in inverted from to a common input junction 346 in circuit with the base terminal of a transistor 348 in a high impedance switching circuit. The collector of the transistor 348 is tied directly to the P1 terminal of the processor 298.

The logic circuit 336 also includes circuitry for receiving BCD data from the parcel identification number counters. More specifically, an input lead 350 is connected to one output from a first parcel identification number counter. The input 350 is applied to a dual input NAND gate 352, the second input to which is a PC1EN control signal. The PC1EN control signal is high only when the first parcel identification number counter is to be incremented or when information is being received from the counter.

Another input connection 354 is tied to the second parcel identification number counter. This input is applied to another dual input NAND gate 356, the second input to which is a PC2EN control signal. The PC2EN control signal is high only when processor 298 is incrementing or is requesting information from the second parcel identification number counter. The outputs of the NAND gates 352 and 356 are tied to the common input junction 346.

The PBTEN, PBREN, PC1EN AND PC2EN control signals are applied simultaneously to the logic circuits for each of the eight lines of the eight bit parallel bus so that all eight lines operate in the same predefined mode.

However, the eight lines are not necessarily simultaneously utilized for the same type of data. When one of the parcel identification number counters has been incremented, its output to the computer takes the form of four binary-coded-decimal words presented one four-bit word at a time over four of the parallel data lines. Each four-bit word is obtained by strobing the remaining data lines in sequence.

The output of the inverter amplifier 338 in each of the logic circuits 336 is used to generate control signals in conjunction with other outputs from terminals P9–P20 of the processor 298. Each such output is label with the prefix PD to distinguish it from the controller output from which it is derived. For example, the output of the inverter amplifier 338 for the P1 circuit is labeled PD1 output to distinguish it from the P1 output from the processor 298.

The outputs PD1–PD4 are applied to a four bit shift register 358 conditioned to operate in a parallel-in parallel-out mode. Data appearing on the inputs PD1–PD4 of the shift register 358 is transferred to the outputs $Q_a$, $Q_b$, $Q_c$ and $Q_d$ at the falling edge of a clock pulse applied to a clock input CLK. The clock input is provided through an inverter amplifier 360 connected to the P9 terminal of the processor 298. The output of inverter amplifier 360 is also connected to the clock input to a second shift register 362 similarly configured for operation in the parallel-in parallel-out mode. The data outputs PD5–PD8 provide the four bit input to the second shift register 362.

Certain outputs from the shift registers 358 and 362 are used in combination with an output on a connection 364 to generate the signals which control the eight bit parallel bus. The signal appearing on connection 364 is provided through an inverter amplifier 366 from the P10 output terminal of the processor 298. The signal on 364 is applied to one input of each of a number of dual input AND gates 368, 370, 372, 374 376, 378 and 380. AND gate 368 is used to generate the PC1EN control signal which conditions the first parcel identification number counter to receive an incrementing signal and the eight bit parallel bus to operate in a receive mode wherein the four BCD words from the newly incremented counter are fed back to the processor 298 to be printed by the document printer. AND gate 370 provides PC2EN control signal which serves the same functions with reference to the second parcel identification number counter. Output $Q_c$ of the shift register 362 is a PRINTEN control signal which enables the document printer to perform a printing operation upon receipt of a PRINT commmand. The conditions under which PRINT command are generated are described later. Output $Q_d$ of the shift register 362 provides one input to the AND gate 372, which generates the PBTEN control signal for enabling the parallel bus to operate in the transmit mode.

The parallel bus is enabled for operation in a receive mode when output $Q_a$ from shift register 358 and the signal on connection 364 are both high. Output $Q_b$ from shift register 358 provides the unique input to the AND gate 376, the output of which is a CONTROL signal. The binary value of this CONTROL signal determines whether the peripheral subsystem is to operate in a mode wherein the processor 298 performs all addressing operations or a mode wherein each of the peripherals may address other peripherals. The output of AND gate 378 is a DATE/ADD signal which indicates whether the information appearing on the eight bit parallel bus is to be interpreted by the receiving peripherals as data or addressing information. AND gate 380 has its unique input connected to the $Q_d$ output of shift register 358. The value of the signal at the output of AND gate 380 indicates whether the parallel bus is operating in a read (or receive) or a write (or transmit) mode.

The signals generated at the outputs of the AND gates 376, 378 and 380 are fed back to the terminals P11, P12 and P13 of the processor 298 through the inverter amplifiers 382, 384 and 386, respectively.

The DATA/ADD signal is logically combined with the PBTEN and PBREN signals to provide an input to a NAND gate 388, the second input to which is provided by output terminal P16 of the processor 298. The output of NAND gate 388 is an RFD or a request-for-data signal which is used when one peripheral is addressing another. The signal indicates the addressed peripheral is ready to receive data. The RFD signal is applied to terminal P17 of the controller 298 through an inverter amplifier 390.

Terminal P14 of the controller is an input terminal by which any of the peripherals may request use of the parallel bus through a BUS REQUEST signal applied to an inverter amplifier 392. The processor 298 will relinquish the parallel bus to the requesting peripheral if the bus is not in use at the time of the request.

Terminal P15 of the processor 298 provides an output signal to a set of dual input NAND gates 394, 396 and 398. The second inputs to these NAND gates are, respectively, the PRINTEN, the PC1EN and the PC2EN control signals. If the P15 output is a binary 1 signal when the PRINTEN input to NAND gate 394 is high, the output of the NAND gate will drop to provide a PRINT command to the document printer. If the P15 input and the PC1EN input to the NAND gate 396 are concurrently high, the NAND gate output drops to provide an INCREMENT signal to the first parcel identification number counter. Similarly, concurrent high P15 inputs and PC2EN inputs to the NAND gate 398 will result in an INCREMENT signal for the second parcel identification number counter.

The PRINTEN signal is also used in combination with a clock signal appearing on controller terminal P16 to generate a clocking signal PRTCLK for controlling the printing operations of the document printer. The two input signals are applied to a NAND gate 400 which produces the PRTCLK signal at its output terminal. The P16 clock signal is also applied through an inverter 402 to a dual input NAND gate 404 to provide a DAC signal which is used in the interperipheral addressing mode of operation to indicate that an addressed peripheral has accepted data from the addressing peripheral. The DAC signal is fed back to the processor 298 through an inverter amplifier 406 having its output connected to the P18 terminal. A DAV or data available-valid signal is generated by logically combining at a NAND gate 408 the PBTEN or parallel bus transmit enable signal and a control signal provided by the processor 298 at its output P19. An inverted from of this signal is fed back to terminal P20 of the processor 298 through an inverter amplifier 410.

Figure 11:
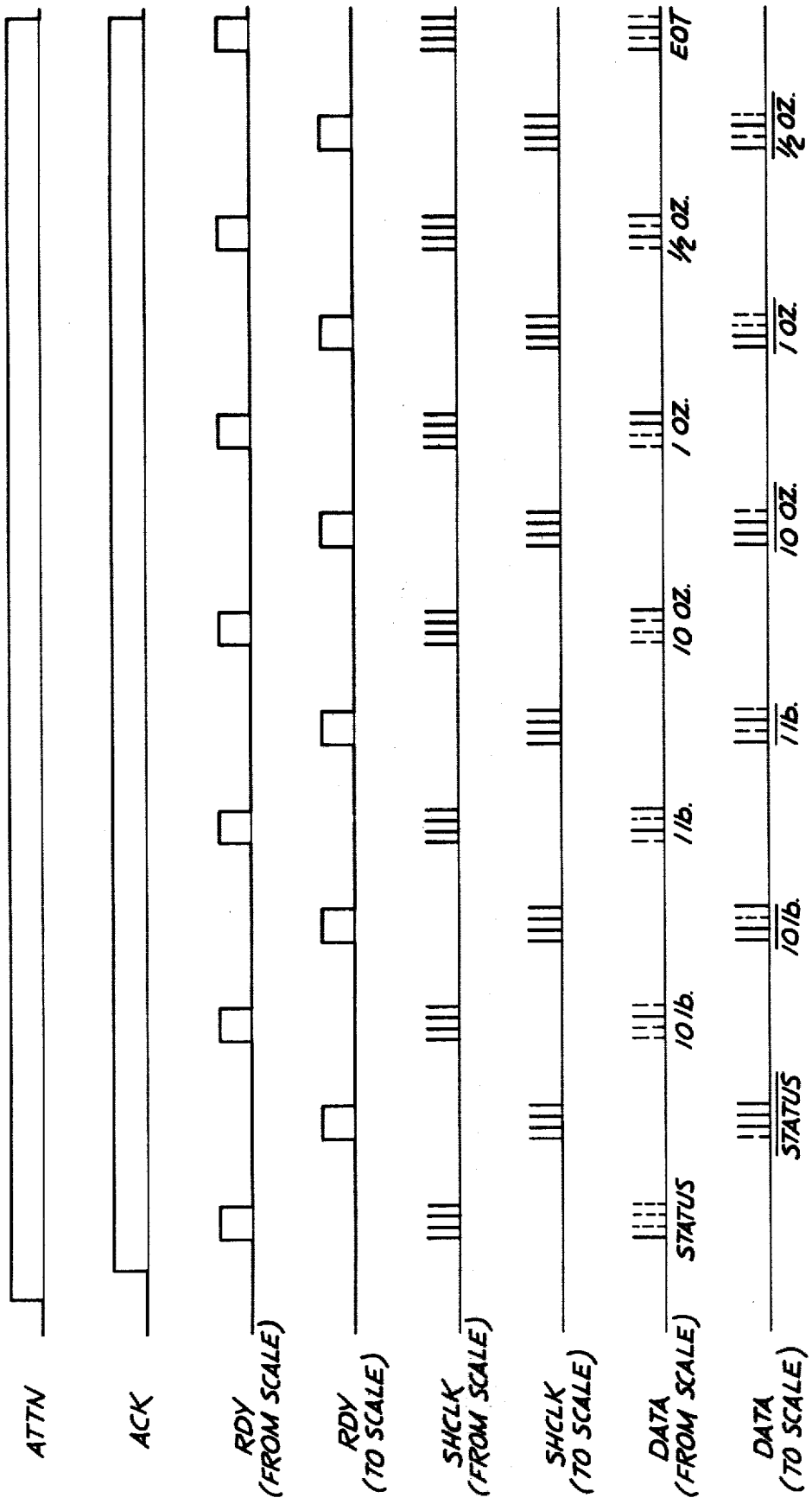
FIG. 11 shows a number of signal wave forms which would be generated during a transfer of data from a scale subsystem processor to the system processor.

A fixed message format is employed in transmitting data via the serial data bus from a given processor to another processor in the system. FIG. 11 is a chart of the signal wave forms which would exist during transmission of data from a scale processor to the system processor. The scale data is transmitted as four bit words in a message which is normally six words long. The words are transmitted one bit at a time with the most significant bit being transmitted first. Each word is verified by the receiving processor before the next word is sent.

Referring to FIG. 11, communication between the scale processor and the system processor is initiated by the system processor by raising the signal on the ATTN line to a binary one level. The scale processor senses the raised ATTN signal and responds by raising the acknowledgment or ACK signal. The scale processor then raises the signal on the RDY line and clocks the first four bit word onto the serial data bus at a rate determined by the SHCLK pulses. The first word transmitted is the status word described with reference to FIG. 5. The scale processor then drops the signal on the RDY line to a binary zero level. When the system processor detects the binary zero condition on the RDY line, it reads and stores data from a buffer register connected to the serial data bus.

The system processor complements the status word as received, and transmits the complemented form back to the scale processor by first raising the RDY line and then shifting the complemented word one bit at a time onto the serial data bus at the SHCLK pulse rate. The system processor will drop the signal on the RDY line after clocking out the four bits of the complemented word. When the scale processor senses that the RDY line has returned to a binary zero level, it reads and compares the complemented status word received from the system processor with the status word it originally transmitted.

The comparison can be accomplished by a number of techniques. A preferred technique is to add the originally transmitted status word to the word transmitted back from the system processor and to then increment the result by one. If the originally transmitted word and the re-transmitted word are complementary, the result would be a 1000 binary word.

If the status word was successfully transmitted, the scale processor raises the signal level on the RDY line to a binary 1 level and transmits the BCD word representing the largest weight increment of the parcel being weighed. For purposes of illustration, it will be assumed that scale output is in English units of measure. The first weight-representing word would, therefore, represent the parcel weight in terms of pounds. The system processor reads and stores the four bits of the received word and re-transmits the complement of that word back to the scale processor where it is compared with the originally-transmitted word.

The above-described process for transmitting data is repeated for the four bit words representing the one pound weight increment, the ten ounce weight increment, the one ounce weight increment and the one half ounce weight increment. Each transmitted four bit word is verified by retransmitting the complemented form of the word as received at the system processor and by comparing the two forms at the scale processor.

If all scale processor transmissions have been received correctly by the system processor, the scale processor transmits an end-of-transmission code (1010) following verification of the last word of the message. The scale processor then drops the signal on the ACK line to a binary zero level. In response, the systems processor drops a signal on the ATTN Line to a binary zero and maintains that level until a decision is again made to interrogate the scale processor.

Figure 12:
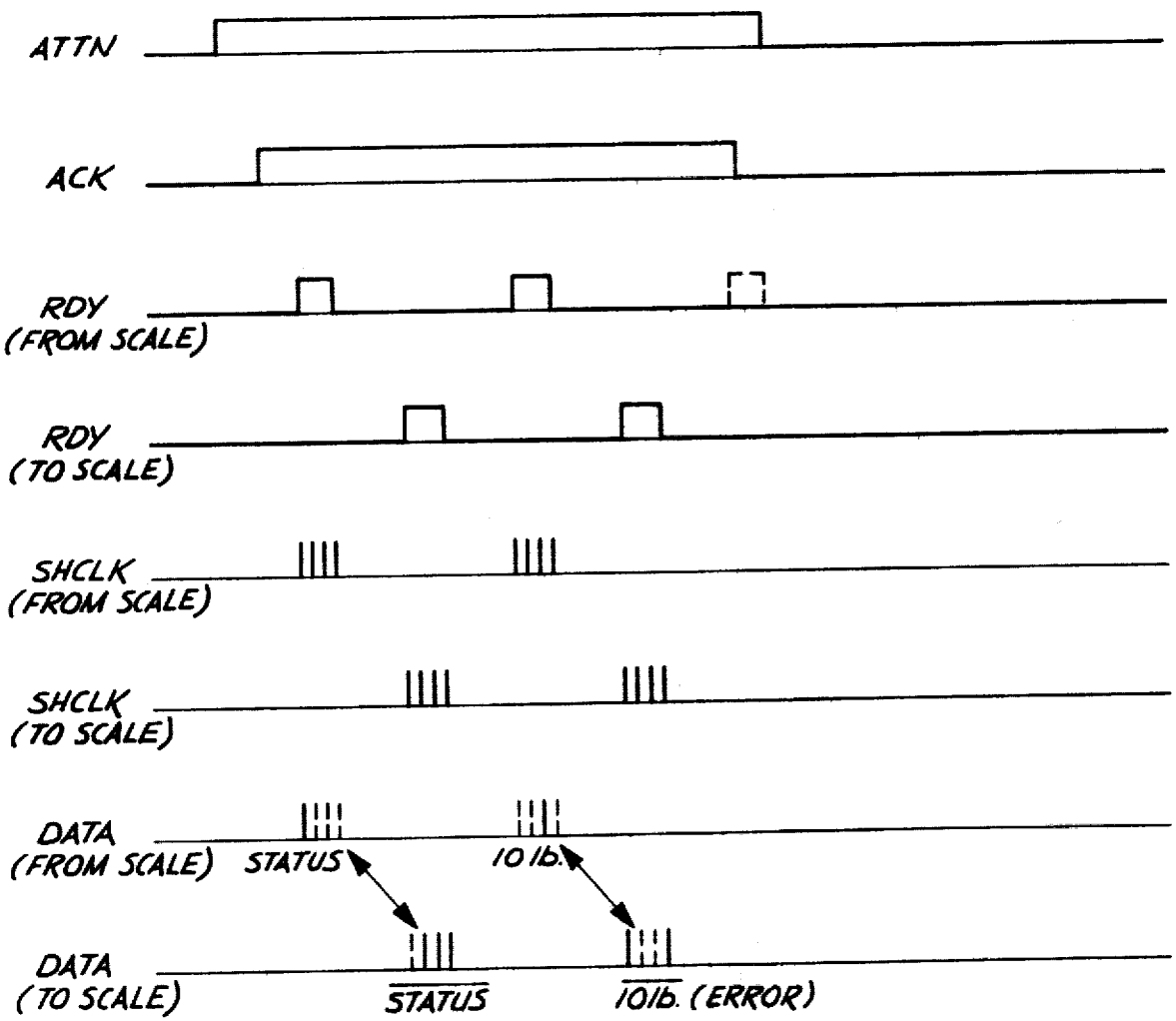
FIG. 12 shows signal wave forms which would be generated if an erroneous data transmission were to occur.

The preceding description of a data transfer from the scale processor to the system processor assumes that all data words were correctly received at the system processor. The signals which would be generated in the event of an erroneous transmission are illustrated with reference to FIG. 12. In FIG. 12, the system processor has correctly signaled the scale processor to begin a transfer by raising the ATTN line. The scale processor has properly acknowledged the ATTN signal by raising the ACK line and by generating a RDY pulse. During the RDY pulse, the status word for the scale is shifted one bit at a time onto the serial data bus. It is assumed that the system processor has correctly received a status word and has retransmitted to the scale processor the complement of the status word.

When, however, the scale processor transmits a 0010 signal to indicate that the parcel weight is at least 20 pounds but less than 30 pounds, the system processor is shown as transmitting an improper 1001 signal in return. When the scale processor reads the retransmitted signal and compares it to the originally transmitted signal, the lack of correspondence between the two signals will cause the scale processor to drop the signal on the ACK line at the time the next RDY signal would have been expected. The system processor continually monitors the ACK lines and the RDY lines. If the signal on the ACK line drops before the signal on the RDY line, the system processor interprets this sequence as signifying an error in transmission. To terminate the data transfer, the system processor will then drop the signal on the ATTN line. Dropping signals on both the ATTN line and the ACK line will always be interpreted as an end-of-data transfer.

The protocol for transmitting data from the system processor to either the postage printer subsystem processor or the peripherals subsystem processor differs slightly from the protocol employed in transferring data from the scale processor to the system processor.

Figure 13:
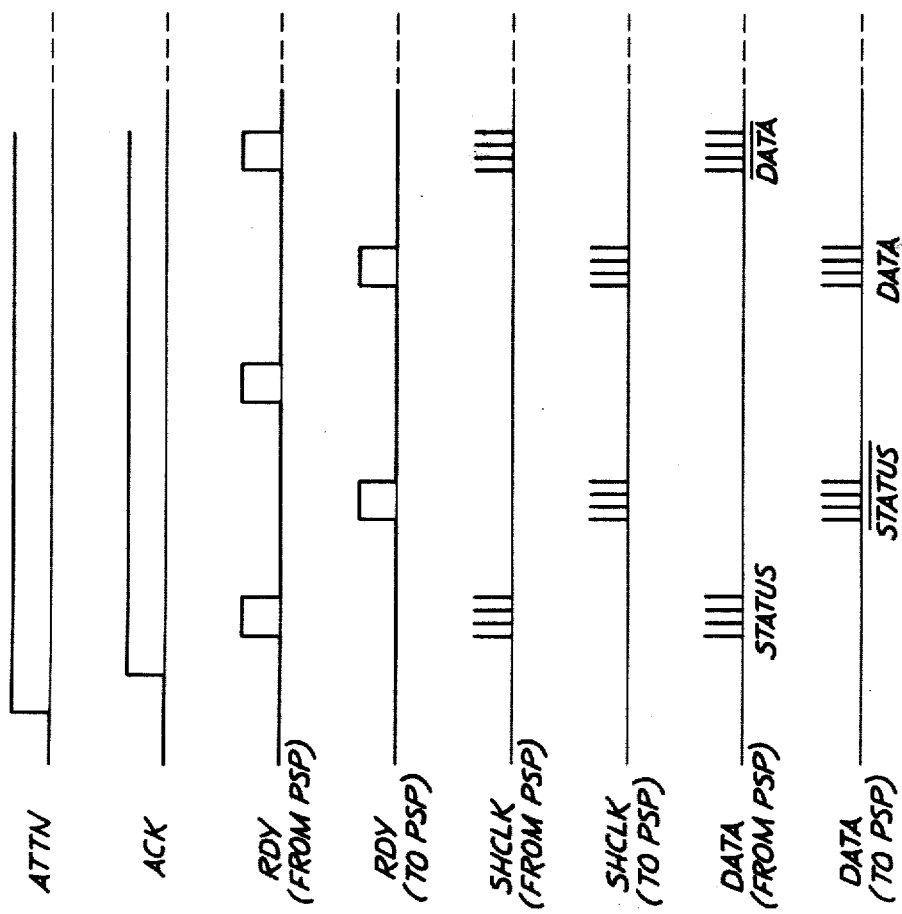
FIG. 13 shows signal wave forms which would be generated during the initial phases of an exchange of data between the system processor and the peripherals subsystem processors.

Waveforms generated in a data exchange with the peripherals subsystem processor (PSP) are shown in FIG. 13. The subsystem processor is addressed by the system processor by raising the signal on the ATTN line. A four bit status word is then transmitted to the system processor. The system processor retransmits the complement of the received status word to the subsystem processor where it is compared to the originally transmitted word. As set forth earlier, if the scale processor were involved, a successful comparison would result in the first four bit data word being shifted onto the serial data bus for transmission to the system processor. For interprocessor communications involving either the postage printer subsystem or the peripherals subsystem, the data is generally transferred in the opposite direction; i.e., from the system processor to the subsystem processor. To allow for this difference, the postage printer and peripherals processor both return a RDY pulse to the system processor to indicate receipt of the proper complement of the status word. Upon detection of the RDY pulse, the system processor clocks out the first four bit data word or four bit command to the addressed subsystem.

The roles of the system processor and the postage and printing peripherals processor are reversed relative to the roles played by the system processor and the scale processor. Where the scale processor is addressed, the system processor returns the complemented form of a received data word. Where either the postage printing subsystem processor or the peripherals subsystem processor is involved, the system processor transmits the original data word and the subsystem processor returns the complemented form.

If the entire message is sent correctly, the system processor pulses the RDY line before dropping the signal on the ATTN line to the addressed subsystem processor. The subsystem processor then drops the ACK signal to provide an acknowledgment that the data transfer is complete. If, however, the comparison performed by the system processor indicates that a transmission error has occured, the system processor drops the ATTN line to the addressed subsystem processor before the RDY line would be expected to go high. The addressed subsystem processor responds by dropping the ACK signals to the system processor. An end-of-data transfer is always considered to be indicated by the dropping of either the ATTN signal to the addressed subsystem processor or of the ACK signal provided by the processor.

From the foregoing, it can be appreciated that the present invention not only provides a highly effective and reliable means of verifying the transmission and receipt of data words during interprocessor communications, but further provides assurance that a processor which has been addressed during a data communications exchange is actively operating on the received data since the addressed processor must manipulate the data received thereby in order to return the complemental form of the data word. This feature of the invention is particularly important in systems where security of data exchange is a prime consideration, as in postage metering where errors in the exchange of monetary data result in financial loss or costly accounting errors.

Figure 14:
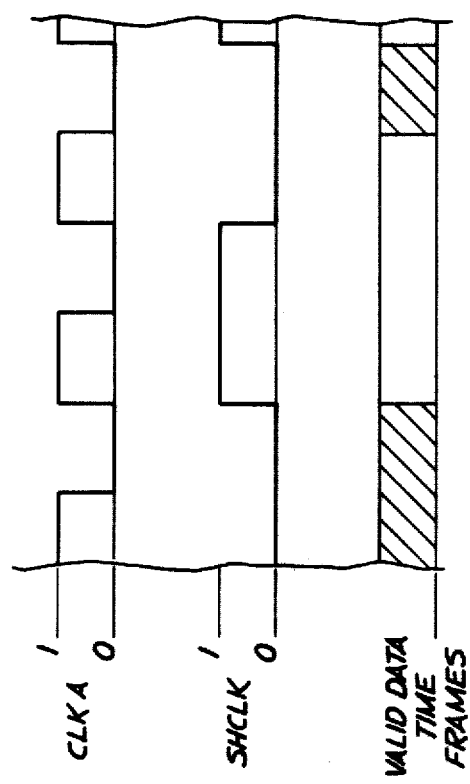
FIG. 14 shows the relationship between the system clock and the data shifting clock signals and valid data transfer frames.

Returning now to the operation of the invention, FIG. 14 illustrates the relationship between the system clock signal CLK A and the data shifting clock signal SHCLK in a preferred embodiment of the invention. The frequency of the system clock signal CLK A is twice the frequency of the SHCLK signals. The SHCLK signals go high at the leading edge of one CLK A pulse and return low at the leading edge of the following CLK A pulse. While the SHCLK pulse is synchronous relative to the system clock, the system clock can be asynchronous.

The two clock pulses taken together define a valid data time frame during which data can be transferred from one processor to another in the multiprocessor system. The valid data time frame is defined as the entire period of time during which either the CLK A pulse of the SHCLK pulse is high. Data cannot be transmitted when both clock pulses are low. The valid data time frame is shown in FIG. 14 as a clear or unshaded block. The time frames within which data may not be transmitted are shown as cross hatched intervals.

Figure 15:
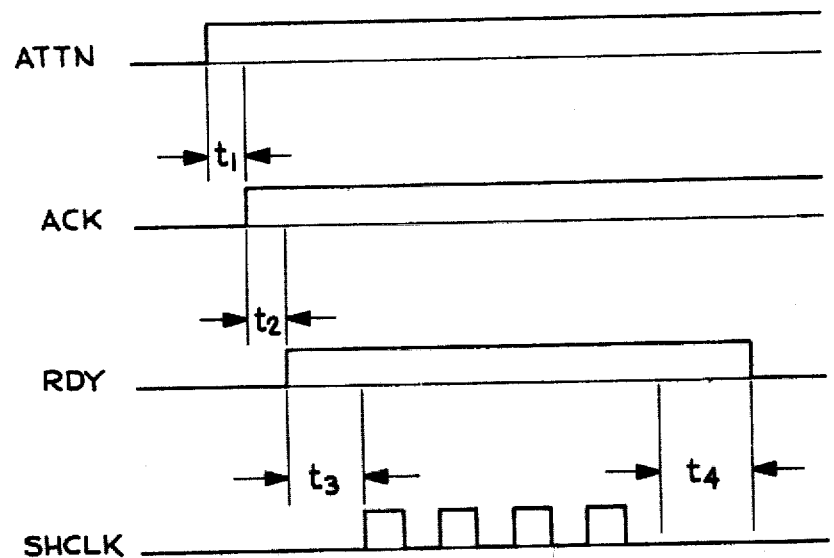
FIG. 15 is used in describing the relative timing of the different interprocessor signals.

FIG. 15 illustrates the time relationship between ATTN, ACK, RDY and SHCLK signals generated at the beginning of an interprocessor data transfer. The data transfer process is, of course, initiated when the ATTN signal to the particular subsystem processor goes high. The time lag $t_1$ between the rise of the ATTN signal and the rise of the ACK signal from the addressed subsystem processor is determined by the time required by the subsystem processor to service the ATTN signal. If the subsystem processor is occupied with subsystem operations at the time it is addressed, the time lag $t_1$ will naturally be longer than if the subsystem processor is idle. In terms of system clock or CLK A cycles, the ACK signal should rise somewhere between 4 and 350 CLK A cycles following the rise of the ATTN signal. For a preferred embodiment of the invention, the system clock frequency is on the order of 100 kilohertz. At that frequency, the time lag $t_1$ will range between approximately 40 microseconds and 3521 microseconds.

The time lag $t_2$ between the rise in the ACK signal and the rise in the RDY signal may be considerably shorter since both the signals are generated by the same processor and since that processor will already be conditioned by the ATTN signal. However, $t_2$ will be at least 4 CLK A cycles or 40 microseconds.

The time lapse between the rise in the RDY signal and the leading edge of the first SHCLK pulse or between the following edge of the RDY signal and the last complete SHCLK cycle ($t_3$ and $t_4$, respectively,) will preferably be on the order of 11 CLK A cycles or 111 microseconds.

Figure 16:
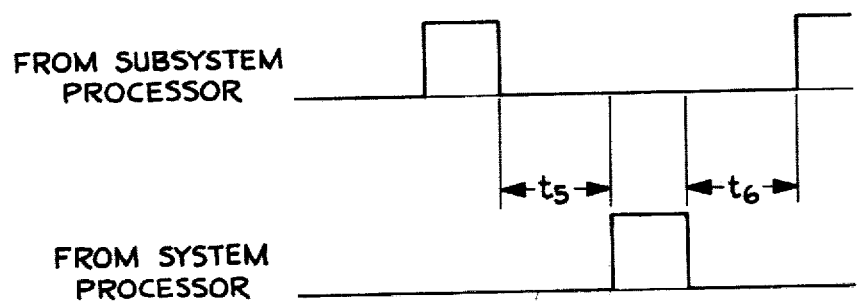
FIG. 16 is used to illustrate the relative times of occurence of RDY signals during a transfer of data.

FIG. 16 illustrates the time relationship between successive RDY signals generated in a subsystem processor and the system processor. The time interval $t_5$ between the trailing edge of a RDY pulse generated by a subsystem processor and a leading edge of a RDY pulse generated by the system processor is preferably in a range of 14 to 40 CLK A cycles or 141 to 402 microseconds. A typical time interval between the trailing edge of the system processor RDY pulse and the leading edge of the next subsystem processor RDY pulse would be 16 CLK A cycles or 161 microseconds. The actual number of CLK A cycles during the time interval $t_6$ is determined by the time required for the subsystem processor to check the complemented data received from the system processor and to fetch the next data word for transmission. Of course, if the complemented word does not correspond to the originally transmitted word, the subsystem RDY signal is not raised. Instead, the ACK signal is dropped.

Different message formats are used in transmitting data to the different processors in the multiprocessor system. The six word format used in transmitting data from the scale processor to the system processor has already been described. Preferred message formats for exchanging data with either of the other two subsystem processors in the system via the serial data bus are more complex.

In the course of a data transfer between the system processor and the postage printing subsystem processor, ten words are exchanged. When the system processor first addresses the postage printing subsystem processor by raising the ATTN line, the subsystem processor responds by raising its ACK line and by transmitting a four bit status word to the system processor. A key code consisting of two four bit words is transmitted from the system processor the subsystem processor to, among other things, select one of the two potentially available postage printers for use. The key code is followed by sixteen bits of data representing the postage value to which the printer is to be set. This data is divided into four bit words representing, in BCD format, the postage to be printed by each of the four banks of the postage printer. The postage data is followed by a SET signal embedded into a four bit word. Upon command by the system processor, the postage printing subsystem processor returns a four bit error word which indicates that either no error or an error of a certain type has occurred. The types of errors which can be reported to the system processor by means of the error word include jam conditions, setting difficulties, the nonexistence of a supposedly selected, postage printer, the transmission of four digits of postage data ($00.00) to a printer capable of printing only three digits ($0.00), the failure of the selected printer to release any print-inhibiting interlock and a lack of correspondence between the postage value selected and the postage value to which the selected printer was actually set.

Error codes transmitted to the system processor from the postage printing subsystem processor are displayed by means of a numeric code on the system display to inform a system user of the type of error noted.

The message format for transfers of data between the system processor and the peripherals subsystem processor is more complex than the above-discussed message formats. When the system processor addresses the peripherals subsystem processor by raising the signal on its ATTN line, the periherals subsystem processor responds by raising its ACK signal and by clocking out two four bit status words to the system processor. The first of these status words may either identify a specific peripheral device, including the two parcel identification number counters, for which some error condition has been detected or may indicate that no error conditions exist. The second of the four bit status words would preferably define one of six possible conditions for the peripheral identified by the first status word. The conditions are failure to generate a correct check sum during the previous eight transmissions to the peripheral, improper peripheral setting or jam conditions, a peripheral not in place or not turned on, a peripheral which lacks necessary recording media (paper, magnetic tape, etc.), a peripheral which failed to print-/record the last or next to the last transaction. The second status word may also indicate simply that the identified peripheral is operational.

Where more than one peripheral device has an error condition to be reported, the two status words will be repeated until the status of all such peripheral device has been transmitted to the system processor.

Nineteen data words, each four bits long, are transmitted over the serial data bus from the system processor to the peripherals subsystem processor. The first two of these words are control words. The first control word includes data bits which serve different functions. Certain bits identify the postage printer being set by the postage printing subsystem processor, indicate that PRINT signal has been given, and indicate that the postage to which the printer is set should be used in updating data recorded in the peripherals subsystem. The second control word can be used to establish whether the system is to operate in a letter mode, is to be cleared and whether any breakdown conditions exist. Third and fourth data words identify any special fees included in the postage value to which a postage printer had been set. The fifth through the eighth words represent the four digits of postage ($00.00) to which the printer was set in the previous transaction. The next two words identify the class of mail by which a parcel is being mailed. The eleventh through the fourteenth words represent the weight of the parcel in pounds and ounces while the fifteenth word indicates whether a half ounce parcel weight has been recorded. The next two words identify the zone of the parcel destination. The last three data words of the message are BCD representation of the first three digits or prefix of the destination zip code, if available.

The peripherals subsystem processor accepts and stores the data identified by the above-discussed format. This data is output to all peripherals connected to the peripheral subsystem processor at one time. Each peripheral must have sufficient buffer memory to accept and store all data pertaining to a postage transaction. Upon subsequent command, selected peripherals can write out the data onto their storage media.

The system has been described thus far without reference to specific processors or specific programming languages since different commercially-available processors and different programming languages compatible with the particular processors might be used.

In a preferred embodiment, the systems central processing unit 140 may be a PPS-4/1 one chip microcomputer, MM76 series. The communications controller/-processor 64 is an A76 processor chip. The scale subsystem processor and the peripheral subsystem processor are preferably MM-78 series microcomputers while the postage printer subsystem processor is preferable a MM-77 series microcomputer. All of the foregoing microcomputer products are manufactured by Rockwell International Corporation of Anaheim, Calif.

Instruction sets for programming these devices are disclosed in Product Description, MM 76 series, March 1977, Revision: 3, 2941ON41 and Product Description, MM 77 and MM 78, March 1977, Revision: 3 2941ON42, both available from Rockwell International Corp.

The program listing for transferring data between the systems processor and the various subsystem processors are reproduced in the Appendix to this specification. Reference should be made to the Product Descriptions listed above for explanations of the listing entries.

While there has been described what is considered to be a preferred embodiment of the invention, variations and modifications therein will occur to those skilled in the art when they become acquainted with the basic concepts of the invention. Therefore, it is intended that the appended claims shall be construed to include all such variations and modifications as fall within the true spirit and scope of the invention.

APPENDIX
SYSTEM PROCESSOR PROGRAM

```
BADR PADR TXT ARG STMT     SOURCE STATEMENT

1           NAME   MM76
                      2           PUNCH TAPE   LACY  (4/1)  PITNEY-BOWES SCALE PROCESSOR

5    ;******  SPOOFY ADDRESSES FOR INPUT/OUTPUT

7           $RDY    EQU   #30      ;READY
                      8           $H1     EQU   #31      ;HANDSHAKE LINE FOR 4/2 COMMUNICATIONS
                      9           $H2     EQU   #32      ;HANDSHAKE LINE FOR 4/2 COMMUNICATIONS
                     10           $H3     EQU   #33      ;HANDSHAKE LINE FOR 4/2 COMMUNICATIONS
                     11           $H4     EQU   #34      ;HANDSHAKE LINE FOR 4/2 COMMUNICATIONS
                     12           $ATR    EQU   #37      ;ATTENTION REQKFL
                     13           $ATP    EQU   #38      ;ATTENTION PERIPHERAL CONTROLLER
                     14           $ATM    EQU   #39      ;ATTENTION METER SETTING DEVICE CONTROLLER
                     15           $PULS   EQU   #37      ;(CHECKOUT) CAPTURE TTL COUNTER
                     16           $USEL   EQU   #38      ;(CHECKOUT) SELECT UPPER 8 BITS OF COUNTER
                     17           $CLFAR  EQU   #39      ;(CHECKOUT) CLEAR COUNTER
                     18           $RDYS   EQU   #1
                     19           $H1S    EQU   #1
                     20           $H2S    EQU   #1
                     21           $H3S    EQU   #1
                     22           $H4S    EQU   #1
                     23           $ZROS   EQU   #1
                     24           $ATRS   EQU   #1
                     25           $ATPS   EQU   #1
                     26           $ATMS   EQU   #1
                     27           $PULSS  EQU   #1
                     28           $USELS  EQU   #1
                     29           $CLFARS EQU   #1
                     30           $ATTS   EQU   #1       ;UNKNOWN ATTENTION LINE
                     31           $I      EQU   #1       ;ANY I/O LINE

33    ;******  EXCLUSIVE-OR OPERANDS

35           $IBUFF   EQU   #2
                     36           $ODEV    EQU   #2
                     37           $ISETU   EQU   #1
                     38           $ISTR    EQU   #1
                     39           $ACCUM   EQU   #1
                     40           $OSUB    EQU   #1
```

| ADDR | OBJ | TXT ARG | STMT | SOURCE | STATEMENT | |
|---|---|---|---|---|---|---|
| | | | 41 | IWIXED | EQU | #2 |
| | | | 42 | KERIIW | EQU | #2 |
| | | | 43 | 0:1 | EQU | #1 |
| | | | 44 | 1:2 | EQU | #3 |
| | | | 45 | 2:3 | EQU | #1 |
| | | | 46 | 3:0 | EQU | #3 |
| | | | 48 | ****** R-LOWER VALUES | | |
| | | | 50 | KER4BL | EQU | #0 |
| | | | 51 | $7ROBL | EQU | #5 |
| | | | 52 | ABL | EQU | #5 |
| | | | 53 | RBL | EQU | #6 |
| | | | 54 | BCTRBL | EQU | #8 |
| | | | 55 | SATPBL | EQU | #8 |
| | | | 56 | SATMBL | EQU | #9 |
| | | | 57 | SCLRBL | EQU | #9 |
| | | | 59 | ****** RAM LOCATIONS | | |
| | | | 61 | IW3 | EQU | #01 |
| | | | 62 | IW2 | EQU | #02 |
| | | | 63 | IW1 | EQU | #03 |
| | | | 64 | IW0 | EQU | #04 |
| | | | 65 | A | EQU | #05 | ;VALUE OF A SIGNAL IN BIT 4
| | | | 66 | B | EQU | #06 | ;VALUE OF A SIGNAL IN BIT 3
| | | | 67 | FLAGS | EQU | #07 |
| | | | 68 | CHFLG | EQU | #1 | ;"CHANGE" FLAG
| | | | 69 | REGFLG | EQU | #2 | ;REGKEL
| | | | 70 | SUBFLG | EQU | #3 | ;SUBTRACT 1 FROM WEIGHT
| | | | 71 | PASCTR | EQU | #08 |
| | | | 72 | BUX | EQU | #08 | ;STORED A--UPPER
| | | | 73 | BLX | EQU | #09 | ;STORED A--LOWER
| | | | 74 | CNT1 | EQU | #0A | ;MSD--COUNTER FOR COMMUNICATIONS
| | | | 75 | CNT0 | EQU | #0A | ;LSD--COUNTER FOR COMMUNICATIONS
| | | | 76 | 16CTR | EQU | #0B | ;COUNTER FOR WEIGHT SAMPLES
| | | | 77 | SCRACH | EQU | #0C |
| | | | 78 | BUFF | EQU | #10 | ;START OF DATA BUFFER FOR COMMUNICATIO
| | | | 79 | PIX3 | EQU | #11 |
| | | | 80 | PIX0 | EQU | #14 |

| PADR PADR TXT APG STMT | SOURCE STATEMENT | |
|---|---|---|
| A1 | OA  EQU | #15 |
| A2 | OB  EQU | #16 |
| A3 | KER4 EQU | #20 |
| A4 | KER0 EQU | #24 |
| A5 | ALSAMF EQU | #25 |
| A6 | BCTP1 EQU | #26 |
| A7 | BCTP0 EQU | #27 |
| A8 | ACTP1 EQU | #28 |
| A9 | ACTP0 EQU | #29 |

| HADR | PADR | TXT | ARG | STMT | SOURCE STATEMENT | | |
|---|---|---|---|---|---|---|---|
| | | | | 90 | ****** | ORG | #000 |
| 0000 | 0000 | 20 | 0 | 91 | ****** | PUT ALL I/O'S LOW | |
| 0001 | 0020 | 1F | 3 | 92 | Z10 | LRI | #30 |
| 0002 | 0010 | AF | 03C0 | 92 | | | |
| 0003 | 0008 | 26 | 6 | 93 | | TM | LO>$ |
| 0004 | 0004 | 1F | 3 | 94 | | LRI | #36 |
| 0005 | 0002 | 00 | | 95 | | NOP | |
| 0006 | 0021 | 10 | 1 | 96 | | SR | $ |
| | | | | 97 | ****** | WAIT FOR SACK LOW | |
| 0007 | 0030 | 04 | | 98 | | INTOL | |
| 0008 | 0018 | CF | 0007 | 99 | | T | $-1 |
| 0009 | 000C | 7F | -15 | 100 | | LAT | 15 ;!SACK HIGH |
| 000A | 0006 | 1B | | 101 | | OA | |
| | | | | 102 | A100 | FOI | * |
| 000B | 0023 | 3E | | 103 | TOCOMM | TL | COMM |
| 000C | 0011 | FF | 0040 | 103 | | | |
| 000D | 0028 | 00 | | 0 | | | |
| 000E | 0014 | 00 | | 0 | | | |
| 000F | 0004 | 00 | | 0 | | | |
| 0010 | 0025 | 00 | | 0 | | | |
| 0011 | 0032 | 00 | | 0 | | | |
| 0012 | 0019 | 00 | | 0 | | | |
| 0013 | 003C | 00 | | 0 | | | |
| 0014 | 001E | 00 | | 0 | | | |
| 0015 | 002F | 00 | | 0 | | | |
| 0016 | 0017 | 00 | | 0 | | | |
| 0017 | 000B | 00 | | 0 | | | |
| 0018 | 0005 | 00 | | 0 | | | |
| 0019 | 0022 | 00 | | 0 | | | |
| 001A | 0031 | 00 | | 0 | | | |
| 001B | 001C | 00 | | 0 | | | |
| 001C | 000E | 00 | | 0 | | | |
| 001D | 0027 | 00 | | 0 | | | |
| 001E | 0013 | 00 | | 0 | | | |
| 001F | 0009 | 00 | | 0 | | | |
| 0020 | 0024 | 00 | | 0 | | | |
| 0021 | 0012 | 00 | | 0 | | | |
| 0022 | 0029 | 00 | | 0 | | | |

| HADR | PADR | TXT | APG | STMT | SOURCE STATEMENT |
|------|------|-----|-----|------|------------------|
| 0024 | 0034 | 00 | | C | |
| 0025 | 001A | 00 | | C | |
| 0026 | 0020 | 00 | | C | |
| 0027 | 0036 | 00 | | C | |
| 0028 | 0024 | 00 | | O | |
| 0029 | 001D | 00 | | C | |
| 002A | 002E | 00 | | O | |
| 002B | 0027 | 00 | | C | |
| 002C | 001B | 00 | | C | |
| 002D | 002D | 00 | | O | |
| 002E | 0026 | 00 | | C | |
| 002F | 0023 | 00 | | C | |
| 0030 | 0019 | 00 | | C | |
| 0031 | 002C | 00 | | C | |
| 0032 | 0016 | 00 | | C | |
| 0033 | 0028 | 00 | | C | |
| 0034 | 0015 | 00 | | C | |
| 0035 | 002A | 00 | | C | |
| 0036 | 0035 | 00 | | O | |
| 0037 | 002A | 00 | | C | |
| 0038 | 0030 | 00 | | C | |
| 0039 | 003E | 00 | | O | |
| 003A | 003F | 00 | | C | |
| 003B | 001F | 00 | | C | |
| 003C | 000F | 00 | | O | |
| 003D | 0007 | 00 | | C | |
| 003E | 0003 | 00 | | O | |
| 003F | 0001 | 00 | | O | |

| BADR | PADR | TXT | ARG | STMT | SOURCE | STATEMENT | | |
|------|------|-----|-----|------|--------|-----------|---|---|
| | | | | 104 | | ORG | M040 | |
| 0041 | 0040 | 7F | 15 | 105 | COMM | EQU | * | |
| 004L | 0060 | 18 | | 106 | | LAT | 15 | |
| 0042 | 0050 | AC | 03DF | 107 | | OA | | !FIX UP THESE LINES FOR OTHER USES. |
| 0043 | 0048 | 08 | 1 | 108 | | TM | $LBH4 | !$H4 HIGH? |
| 0044 | 0046 | DE | 0046 | 109 | | SKPF | $H4S | !YES |
| 0045 | 0042 | FF | 0040 | 110 | | T | R42 | !NO |
| | | | | 111 | | T | COMM | |
| | | | | 112 | ******* | R42--RECEIVE FROM 4/2 ("ROUTINE A" IN NOTES) | | |
| | | | | 113 | ******* | COULD BE ATTN ID OF BERKEL, MSDC, OR PC; COULD BE REQUEST FOR | | |
| | | | | 114 | ******* | KERNEL; COULD BE DATA CHARACTERS FOR MSDC OR PC. | | |
| 0046 | 0061 | 81 | 03F9 | 115 | R42 | TM | ARF>BX | !ADDRESS OF BUFF TO B_X |
| 0047 | 0070 | 28 | 11 | 116 | | LB | CNT0 | !CLEAR CTR |
| 0048 | 0058 | 90 | 0305 | 117 | | TM | ZERO2 | |
| 0049 | 004C | AC | 03DF | 118 | | TM | $LBH4 | !$H4 HIGH? |
| 004A | 0046 | 08 | 1 | 119 | | SKPF | $H4S | !YES |
| 004B | 0063 | CE | 005A | 120 | | T | R4280 | |
| 004C | 0051 | 98 | 03DF | 121 | R4225 | TM | $LBH3 | !PUT $H3 LOW |
| 004D | 0068 | 14 | 1 | 122 | | RB | $H3S | |
| 004E | 0054 | 87 | 03DB | 123 | | TM | $LBATB | !NO, FINISHED OR NO MESSAGE |
| 004F | 004A | 08 | 1 | 124 | R4230 | SKPF | $AT?S | |
| 0050 | 0065 | EA | 0058 | 125 | | T | TOSTH | !THIS $ATTN HIGH, GO SEND TO THING |
| 0051 | 0072 | 54 | 0 | 126 | | XNSK | | |
| 0052 | 0079 | 35 | 10 | 127 | | SKREI | | |
| 0053 | 007C | 2A | 10 | 128 | | T | R4230 | !THIS $ATTN LINE LOW; WE'LL LOOK AT NEXT |
| 0054 | 005E | F5 | 004F | 129 | | TM | AT>BL | !NO $ATTN HIT; WE JUST GOT $ATTN ID |
| 0055 | 006F | A4 | 03FC | 130 | * | | | !AT>BL EXITS DIRECTLY TO "SEND" IF 4/2 |
| | | | | 131 | * | | | !HAS REQUESTED A KERNEL. |
| 0056 | 0057 | 30 | 2 | 132 | | TL | RTH | !GO REC STAT/DATA (BERKEL) OR STAT (MSD/-C |
| 0057 | 0048 | FF | 0080 | 132 | | | | |
| 0058 | 1045 | 3C | 3 | 133 | TOSTH | TL | STH | !GO SEND DATA-TO THING (MSD OR PC) |
| 0059 | 0062 | E6 | 00F0 | 133 | | | | |
| 005A | 0071 | A3 | 03DC | 134 | R4280 | TM | $LBH1 | !PUT $H1 LOW |
| 005B | 0078 | 14 | 1 | 135 | | RB | $H1S | |
| 005C | 005C | 98 | 03DE | 136 | | TM | $LBH3 | !PUT $H3 HIGH |
| 005D | 004E | 10 | 1 | 137 | | SR | $H3S | |
| 005E | 0067 | 81 | 03DD | 138 | R4285 | TM | $LBH2 | !WAIT FOR $H2 HIGH |
| 005F | 1053 | 08 | 1 | 139 | | SKPF | $H2S | |
| 0060 | 0049 | F5 | 0065 | 140 | | T | R4290 | !HIGH, OK |

| BADR | PADR | TXT | ARG | STMT | SOURCE STATEMENT | | | |
|------|------|-----|------|------|----|----|--------|-----|
| 0061 | 0064 | AC | 03DF | 141 | TM | | $LBH4 | ;LOW |
| 0062 | 0062 | OR | 1 | 142 | SKBF | | $H4S | ;$H4 HIGH? |
| 0063 | 0069 | DA | 005E | 143 | T | | R42R5 | ;YES, KEEP WAITING FOR $H2 HIGH |
| 0064 | 0074 | EE | 004C | 144 | T | R4290 | R4225 | ;$H4 LOW, FINISHED |
| 0065 | 005A | 7F | 15 | 145 | LAT | | 15 | ;READ 4 BITS TO AC |
| 0066 | 005D | 1A | | 146 | IAM | | | ;TEMP SAVE AC IN S |
| 0067 | 0076 | 4E | | 147 | XAS | | | ;STORED R-VALUE TO R |
| 0068 | 0078 | 1F | 03C2 | 148 | TM | | B_X>B | ;RESTORE SAVED AC |
| 0069 | 005D | 4F | | 149 | XAS | | | ;STORE THE DATA BITS |
| 006A | 006E | 58 | 0 | 150 | X | | | ;PUT $H1 HIGH |
| 006B | 0077 | A3 | 03DC | 151 | TM | | $LBH1 | |
| 006C | 005A | 10 | 1 | 152 | SR | | $H1S | |
| 006D | 006D | R1 | 03DD | 153 | TM | | $LBH2 | ;WAIT FOR $H2 LOW |
| 006E | 0066 | OR | 1 | 154 | SKBF | | $H2S | |
| 006F | 0073 | 09 | 006E | 155 | T | | *-1 | ;HIGH, KEEP WAITING |
| 0070 | 0059 | A3 | 03DC | 156 | TM | | $LBH1 | ;LOW, OK |
| 0071 | 006C | 14 | 1 | 157 | RR | | $H1S | ;PUT $H1 LOW |
| 0072 | 0054 | AF | 03CC | 158 | TM | | BUMPB | ;BUMP R_X |
| 0073 | 005B | 2A | 11 | 159 | LR | | CNT0 | ;DEBUMP CNT |
| 0074 | 0055 | 7F | 15 | 160 | LAT | | 15 | |
| 0075 | 006A | 00 | | 161 | RC | | | |
| 0076 | 0075 | A6 | 03D2 | 162 | TM | | ACXDSK | |
| 0077 | 007A | 7F | 15 | 163 | LAT | | 15 | |
| 0078 | 0070 | A6 | 03D2 | 164 | TM | | ACXDSK | |
| 0079 | 007E | F3 | 0049 | 165 | T | | R4270 | |
| 007A | 005F | 00 | | 0 | | | | |
| 007B | 005F | 00 | | 0 | | | | |
| 007C | 004F | 00 | | 0 | | | | |
| 007D | 0047 | 00 | | 0 | | | | |
| 007E | 0043 | 00 | | 0 | | | | |
| 007F | 0041 | 00 | | 0 | | | | |

| HADR | PADR | TXT | APG | STMT | SOURCE STATEMENT | | | |
|---|---|---|---|---|---|---|---|---|
| | | | | 166 | | | ORG | #080 |
| | | | | 167 | ****** | | RTH--RECEIVE STATUS AND DATA (IF HFXXFL) OR STATUS ONLY ( IF |
| | | | | 168 | ****** | | | MSD OR PC)& ENTER WITH AC HOLDING R-LOWER VALUE FOR 1ST C- |
| | | | | 169 | ****** | | | THIS IS "ROUTINE C" IN NOTES. |
| 0080 | 0080 | B7 03C3 | | 170 | RTH | TM | INTOL | !ACK HIGH? |
| 0081 | 008D | 04 | | 171 | | T | RTH | !YES, BAD |
| 0082 | 0090 | FF 00A0 | | 172 | | T | DINO | !COCK INTERRUPT FLIP-FLOP |
| 0083 | 008A | L7 | | 173 | | NOP | | |
| 0084 | 008B | 00 | | 174 | | LBI | BUFF | |
| 0085 | 008C | 20 0 | | 175 | | | | |
| 0086 | 008D | | | 175 | | | | |
| 0087 | 008E | 10 1 | | 176 | | LSA | | !COPY R-LOWER VALUE INTO S FROM AC |
| 0088 | 008F | 4C | | 177 | | L | | !ATTN ID TO AC |
| 0089 | 0090 | 50 0 | | 178 | | XAS | | !ATTN ID TO S:  R-LOWER TO AC |
| 008A | 0091 | 4E | | 179 | | LRA | | !R-LOWER TO R-LOWER |
| 008B | 0092 | 44 | | 180 | | XAS | | !ATTN ID TO AC |
| 008C | 0093 | 4E | | 181 | | LSA | | !ATTN ID TO S (AC ALSO HAS A COPY) |
| 008D | 0094 | 4C | | 182 | | XNSK | | !STORE ATTN ID! GARB TO AC |
| 008E | 0095 | 54 0 | | 183 | | XAS | | !GARB TO S; ATTN ID TO AC |
| 008F | 0096 | 4E | | 184 | | XAR | | !NEW R-LOWER TO AC; ATTN ID TO R-LOWER |
| 0090 | 0097 | 46 | | 185 | | FOR | BUFF:S | !(LRL PROPER ATTN LINE) |
| 0091 | 0098 | 1F 2 | | 186 | | NOP | | |
| 0092 | 0099 | 00 | | 187 | | SR | SATPS | !PUT PROPER ATTN LINE HIGH |
| 0093 | 009B | 10 1 | | 188 | | TM | 42INT? | !IS 4/2 INTERRUPTING US? |
| 0094 | 009C | B7 03C3 | | 189 | | DINO | | !NO, ACK HIGH? |
| 0095 | 009E | 07 | | 190 | RTH20 | T | *-2 | !NO, MAYBE IN A LITTLE WHILE |
| 0096 | 009F | C3 0093 | | 191 | | INT1H | | !IS SRDY HIGH? |
| 0097 | 00A0 | 05 | | 192 | | T | RTH30 | !NO, SEE IF 4/2 IS INTERRUPTING |
| 0098 | 00A1 | DD 0099 | | 193 | RTH30 | T | RTH40 | !YES, GO WAIT FOR SRDY LOW |
| 0099 | 00A2 | F6 00A0 | | 194 | | LRI | SH2 | |
| 009A | 00A3 | 22 2 | | 195 | | NOP | | |
| 009B | 00A4 | 1F 3 | | 196 | | SKRF | SH2S | !IS SRDY HIGH YET? |
| 009C | 00A6 | 00 | | 197 | | T | RTH1P | !YES |
| 009D | 00A7 | 0A 1 | | 198 | | INT1H | | !NO, IS SRDY HIGH YET? |
| 009E | 00A8 | C0 00A | | 199 | | T | RTH90 | !NO, SEE IF THING WANTS TO QUIT EARLY |
| 009F | 00AA | 05 | | 200 | RTH40 | TM | 42INT? | !IS 4/2 IS INTERRUPTING |
| 00A0 | 00AB | E9 00B2 | | 201 | | INT1H | | !NO, IS SRDY LOW YET? |
| 00A1 | 00AD | B7 03C3 | | 202 | | T | *+2 | !YES, CONTINUE |
| 00A2 | 00AF | CB 00A4 | | 203 | | T | *-3 | !NO, NOT YET |
| 00A3 | 00B1 | F6 00A0 | | | | | | |

| IADR | PADR | TXT | ARG | STMT | SOURCE STATEMENT | | | |
|---|---|---|---|---|---|---|---|---|
| 1044 | 0084 | 1E | 2 | 204 | | EOR | $:BUFF | ;SET UP R-UPPER |
| 1045 | 0085 | 46 | | 205 | | XAR | | ;SET UP R-LOWER |
| 1046 | 008D | 4F | | 206 | | XAS | | ;DATA TO AC |
| 1047 | 008B | 4C | | 207 | | LSA | | ;SAVE DATA IN S |
| 1048 | 008C | 54 | 0 | 208 | | XNSK | | ;STORE DATA, BUMP R |
| 1049 | 008D | E4 | 00AC | 209 | | T | RTHR0 | ;NOT DONE |
| 104A | 008E | 3C | 3 | 210 | TOS42 | T | S42 | ;GO SEND STATUS/DATA OR STATUS TO 4/2 |
| 104B | 008F | FF | 00C0 | 210 | | | | |
| 104C | 0088 | 4F | | 211 | RTHR0 | XAC | | ;DATA TO AC |
| 104D | 008D | 45 | | 212 | | COM | | ;COMPLEMENT IT, TO SEND BACK FOR VERIF |
| 104E | 008A | 4E | | 213 | | XAS | | ;INVERTED DATA TO S |
| 104F | 008B | 46 | | 214 | | XAR | | ;SAVE R-LOWER VALUE IN AC |
| 1040 | 009C | 96 | 03E3 | 215 | | TM | SENDC | ;SEND INVERTED CHARACTER BACK |
| 1041 | 009C | E4 | 0096 | 216 | | T | RTH20 | ;GO DO NEXT |
| 10H2 | 0096 | 0C | | 218 | RTH90 | INTOL | | |
| 10H3 | 0098 | E8 | 0096 | 219 | | T | RTH20 | ;IF $ACK IS LOW, THE OTHER GUY QUIT EARLY |
| 10H4 | 0095 | 2F | 14 | 220 | | LRL | BUFF+14 | ;$ACK STILL HIGH |
| 10H5 | 009A | 1D | 1 | 220 | | | | ;OTHER GUY QUIT EARLY |
| 10H6 | 0095 | 70 | 0 | 221 | | LAT | 0 | |
| 10H7 | 008A | 5C | 0 | 222 | | XDSK | | ;WE'LL SEND 4/2 ALL 0'S |
| 1098 | 0080 | CA | 0086 | 223 | | T | *-2 | |
| 10H9 | 008D | D1 | 00AA | 224 | | T | TOS42 | ;(ALWAYS A COMMUN ERROR) |
| 10HA | 008E | 3F | 0 | 225 | RTH1P | TL | ZIO | |
| 10HB | 008F | FF | 0000 | 225 | | | | ;GO RESET I/O'S AND START OVER |
| 10HC | 00AF | 00 | | 0 | | | | |
| 10HD | 00A7 | 00 | | 0 | | | | |
| 10HE | 00A1 | 00 | | 0 | | | | |
| 10HF | 00A1 | 00 | | 0 | | | | |

| BADR | PADR | TXT | ARG | STMT | SOURCE | STATEMENT | | |
|---|---|---|---|---|---|---|---|---|
| | | | | 226 | | ORG | #0C0 | |
| | | | | 227 | ****** | S42--SEND STATUS/DATA (IF BERKEL) OR STATUS (IF MSD OR CC) | | |
| | | | | 228 | ****** | | TO 4/2. ("ROUTINE B" IN NOTES) | |
| 00C0 | 00C0 | A4 | 03EC | 229 | S42 | TM | AT>BL | ;DESIRED R-LOWER TO AC |
| | | | | 230 | S42X | EQU | * | ;ENTER HERE FOR POST-MORTEM MESSAGE |
| 00C1 | 00F0 | A7 | 03DR | 231 | | TM | $LRATR | ;YES |
| 00C2 | 00D0 | 14 | 1 | 232 | | RR | $ATRS | ;PUT BERKEL ATTENTION LINE LOW (IF WAS H) |
| 00C3 | 00C8 | A3 | 03DC | 233 | S4240 | TM | $LRH1 | |
| 00C4 | 00C4 | 10 | 1 | 234 | | SR | $H1S | ;PUT $H1 HIGH |
| 00C5 | 00C2 | AC | 03DF | 235 | | TM | $LBH4 | ;WAIT FOR $H4 LOW |
| 00C6 | 03E0 | 0R | 1 | 236 | | SKRF | $H4S | |
| 00C7 | 03E0 | 0E | 00C6 | 237 | | T | *-1 | |
| 00C8 | 00C8 | B1 | 03DD | 238 | | TM | $LBH2 | ;WAIT FOR $H2 HIGH |
| 00C9 | 00CC | 0B | 1 | 239 | | SKRF | $H2S | |
| 00CA | 00C6 | FF | 00CC | 240 | | T | *+2 | ;$H2 IS HIGH |
| 00CB | 00E3 | E3 | 00C9 | 241 | | T | *-2 | ;$H2 IS STILL LOW, KEEP WAITING |
| 00CC | 00C1 | 44 | | 242 | S4260 | LRA | | ;R-LOWER TO R-LOWER |
| 00CD | 00FA | 1F | 2 | 243 | | EOR | $!BUFF | ;ADDRESS REGISTER WITH BUFFER |
| 00CE | 00D4 | 4C | | 244 | | LSA | | ;B-LOWER TO S |
| 00CF | 00D7 | 0R | 1 | 245 | | L | | ;B-LOWER TO S |
| 00D0 | 00D9 | DD | 00D9 | 246 | | OA | | ;AC HOLDS CHARACTER TO BE SENT |
| 00D1 | 00CA | E8 | 00D6 | 247 | | LBL | | ;OUTPUT 4 BITS OF DATA |
| 00D2 | 00F2 | 7F | 15 | 248 | | | $H3 | ;PUT $H3 HIGH |
| 00D3 | 00F9 | 1F | 3 | 249 | | NOP | | |
| 00D4 | 00FC | 00 | | 250 | | SR | $H3S | |
| 00D5 | 00FE | 10 | 1 | 251 | | TM | $LBH4 | ;WAIT FOR $H4 HIGH |
| 00D6 | 00FF | AC | 03DF | 252 | | SKRF | $H4S | |
| 00D7 | 00D7 | 0R | 1 | 253 | | T | *+2 | |
| 00D8 | 00D9 | DD | 00D9 | 254 | | T | *-2 | |
| 00D9 | 00C5 | E8 | 00D6 | 255 | | LAT | 15 | |
| 00DA | 00F2 | 7F | 15 | 256 | | OA | | |
| 00DB | 00D8 | 9R | 03DE | 257 | | TM | $LBH3 | ;FLOAT THE LINES |
| 00DC | 00DC | 14 | 1 | 258 | | RR | $H3S | ;PUT $H3 LOW |
| 00DD | 00CE | AC | 03DF | 259 | | TM | $LBH4 | ;WAIT FOR $H4 LOW |
| 00DE | 00E7 | 08 | 1 | 260 | | SKRF | $H4S | |
| 00DF | 00D3 | 0R | 00DE | 261 | | T | *-1 | |
| 00E0 | 00D9 | 4E | | 262 | | XAS | | ;R-LOWER FROM S |
| 00E1 | 00F4 | 61 | 1 | 263 | | AISK | 1 | ;DONE? |
| 00E2 | 00D2 | CR | 00F4 | 264 | | T | *+2 | ;YES |
| 00E3 | 00E9 | EE | 00CC | 265 | | T | S4260 | ;NO |

| BADR | PADR | TXT | ARG | STMT | SOURCE STATEMENT | | | |
|------|------|-----|------|------|---|---|---|---|
| 00F4 | 00F4 | 43 | 03DC | 265 | | TM | SLBH1 | ;PUT $H1 LOW |
| 00F5 | 00F4 | 14 | | 266 | | RR | $H1S | |
| 00F6 | 00FD | B1 | 03DD | 267 | | TM | SLBH2 | |
| 00F7 | 00F6 | 08 | 1 | 268 | | SKRF | $H2S | |
| 00F8 | 00F8 | C9 | 00F7 | 269 | | T | *-1 | ;WAIT FOR $H2 LOW |
| 00F9 | 00FD | 27 | 7 | 270 | | LR | FLAGS | |
| 00FA | 00FE | 00 | | 271 | | NOP | | |
| 00FB | 00F7 | 09 | 2 | 272 | | SKRF | BERFLG | |
| 00FC | 00FB | 3F | 0 | 273 | | TL | ZIO | |
| 00ED | 00CD | FF | 0000 | 273 | | | | |
| 00EF | 00F6 | 3E | 1 | 274 | | TL | COMM | |
| 00FF | 03F3 | FF | 0040 | 274 | | | | |
| | | | | 275 | ;******* STH—-SEND TO THING (MSD OR PC). THIS IS "ROUTINE D" IN NOTES. | | | |
| 00F0 | 00D9 | E7 | 03C3 | 276 | STH | TM | 42INT? | |
| 00F1 | 00FC | 07 | | 277 | | DINO | | ;COCK INTERRUPT FLIP-FLOPS |
| 00F2 | 00D6 | 00 | | 278 | | NOP | | |
| 00F3 | 00FB | 06 | | 279 | | DIN1 | | |
| 00F4 | 00D5 | 00 | | 280 | | NOP | | |
| 00F5 | 00EA | 38 | 4 | 281 | | TL | STH10 | |
| 00F6 | 00F5 | FF | 0100 | 281 | | | | |
| 00F7 | 00FA | 00 | | 0 | | | | |
| 00F8 | 00ED | 00 | | 0 | | | | |
| 00F9 | 00FE | 00 | | 0 | | | | |
| 00FA | 00FF | 00 | | 0 | | | | |
| 00FB | 00DF | 00 | | 0 | | | | |
| 00FC | 00CF | 00 | | 0 | | | | |
| 00FD | 00C7 | 00 | | 0 | | | | |
| 00FE | 00C3 | 00 | | 0 | | | | |
| 00FF | 00C1 | 00 | | 0 | | | | |

| PADR | PADR | TXT | ARG | STMT | | SOURCE | STATEMENT | | |
|---|---|---|---|---|---|---|---|---|---|
| | | | | 282 | | | ORG | M100 | |
| 0100 | 0100 | 81 | 03F9 | 283 | STH10 | | TM | ABF>BX | ;ADDRESS OF BUFF TO B_X |
| 0101 | 0120 | 70 | 0 | 284 | | | LAT | 0 | ;WE'LL SEE IF MESSAGE LENGTH IS TO BE 0 |
| 0102 | 0110 | 2A | 10 | 285 | | | LB | CNT1 | |
| 0103 | 0108 | 47 | | 286 | | | SKMEA | | |
| 0104 | 0104 | F9 | 010A | 287 | | | T | STH20 | ;NO |
| 0105 | 0121 | 28 | 11 | 288 | | | LB | CNT0 | ;MAYBE |
| 0106 | 0121 | 47 | | 289 | | | SKMEA | | |
| 0107 | 0130 | F9 | 010A | 290 | | | T | STH20 | ;NO |
| 0108 | 0118 | 3F | 0 | 291 | | | TL | ZI0 | ;YES, DON'T SEND ANY CHARACTERS |
| 0109 | 010C | FF | 0000 | 291 | | | | | |
| 010A | 0106 | AF | 03C2 | 292 | STH20 | | TM | B_X>B | ;SET UP B-REGISTER |
| 010B | 0123 | 50 | 0 | 293 | | | L | | |
| 010C | 0111 | 4E | | 294 | | | XAS | | |
| 010D | 012A | 96 | 03E3 | 295 | | | TM | SENDC | ;SEND A CHARACTER TO MSD OR PC |
| 010E | 0114 | 05 | | 296 | STH30 | | INT1H | | ;IS $RDY HIGH? |
| 010F | 010A | CD | 0111 | 297 | | | T | STH33 | ;NO, NOT YET |
| 0110 | 0125 | FA | 0118 | 298 | | | T | STH37 | ;YES |
| 0111 | 0132 | 22 | 2 | 299 | STH33 | | LBL | $H2 | |
| 0112 | 0139 | 1F | 3 | 299 | | | | | |
| 0113 | 013C | 00 | | 300 | | | NOP | | |
| 0114 | 011E | 08 | 1 | 301 | | | SKBF | $H25 | ;IS 4/2 INTERRUPTING |
| 0115 | 012F | CA | 0136 | 302 | | | T | STH1P | ;YES |
| 0116 | 0117 | 05 | | 303 | | | INT1H | | ;IS $RDY HIGH YET? |
| 0117 | 010B | EA | 0134 | 304 | | | T | STH90 | ;NO, NOT YET |
| 0118 | 0105 | R7 | 03C3 | 305 | STH37 | | TM | 42INT? | ;$RDY IS HIGH; IS 4/2 INTERRUPTING? |
| 0119 | 0122 | 05 | | 306 | | | INT1H | | ;NO. IS $RDY LOW? |
| 011A | 0171 | E3 | 011C | 307 | | | T | **+2 | ;YES, CONTINUE |
| 011B | 0138 | FA | 011A | 308 | | | T | **-3 | ;NO, NOT YET |
| 011C | 011C | AF | 03C2 | 310 | STH40 | | TM | B_X>B | ;SET UP B-REGISTER |
| 011D | 010E | 4F | | 311 | | | XAS | | ;RECEIVED CHAR TO AC |
| 011E | 0127 | 45 | | 312 | | | COM | | ;COMPLEMENT IT FOR VERIFICATION |
| 011F | 0113 | 47 | | 313 | | | SKMEA | | ;DID WE GET BACK THE COMPL OF WHAT WE SENT |
| 0120 | 0109 | C2 | 013R | 314 | | | T | STHRAD | |
| 0121 | 0124 | AF | 03CC | 315 | | | TM | BUMPB | ;YES, BUMP STORED B |
| 0122 | 0112 | 9C | 03CR | 316 | | | TM | BUMPC | ;BUMP COUNTER |
| 0123 | 0129 | 01 | | 317 | | | SKNC | | ;COUNTER OVERFLOW? |
| 0124 | 0134 | D2 | 0126 | 318 | | | T | **+2 | ;YES, DONE |
| 0125 | 011A | F9 | 010A | 319 | | | T | STH20 | ;NO, GO SEND NEXT CHARACTER |

| BADR | PADR | TXT | ARG | STMT | SOURCE | STATEMENT | | |
|------|------|-----|-----|------|--------|-----------|---|---|
| 0126 | 0120 | 96 | 03E3 | 320 | | TM | SENDC | !PULSE RDY |
| 0127 | 0126 | R7 | 03C3 | 321 | | TM | 42INT? | !IS 4/2 INTERRUPTING US? |
| 0128 | 012A | 04 | | 322 | STH40 | INTOL | | !NO, IS SENDER'S ACK LOW? |
| 0129 | 012D | C9 | 0127 | 323 | | T | STH60 | !NOT YET, MAYBE SOON |
| 012A | 012E | 9F | 03C1 | 324 | | TM | LO>$A | !LOWS TO ALL ATTENTION LINES |
| 012B | 0127 | 7F | 15 | 325 | STH70 | LAT | 15 | !POST-MORTEM MESSAGE INDICATING "GOOD" |
| 012C | 012A | 70 | 0 | 326 | | LAT | 0 | !POST-MORTEM MESSAGE INDICATING "BAD" |
| 012D | 012D | 2F | 15 | 327 | STH80 | LRI | *1F | !POST-MORTEM MESSAGE INDICATING "BAD" |
| 012E | 012E | 1D | 1 | 327 | | | | |
| 012F | 0133 | 00 | | 328 | | NOP | | |
| 0130 | 0119 | 5R | 0 | 329 | | X | | !PUT POST-MORTEM MESSAGE IN BUFFER |
| 0131 | 012C | 7F | 15 | 330 | | LAT | 15 | |
| 0132 | 0116 | 3C | 3 | 331 | | TL | S42x | !GO SEND POST-MORTEM MESSAGE |
| 0133 | 012B | 0F | 00C1 | 331 | | | | |
| 0134 | 0115 | 04 | | 332 | | INTOL | | !THING QUIT EARLY IF $ACK LOW |
| 0135 | 012A | E8 | 010E | 333 | STH90 | T | STH30 | !$ACK NOT LOW! KEEP WAITING FOR $RDY LOW |
| 0136 | 0135 | 3F | 0 | 334 | STHIP | TL | ZIO | !GO RESET I/O'S AND START OVER. |
| 0137 | 013A | FF | 0000 | 334 | | | | |
| 0138 | 013D | 9F | 03C1 | 336 | STHRAD | TM | LO>$A | |
| 0139 | 013E | R7 | 03C3 | 337 | | TM | 42INT? | |
| 013A | 013F | 04 | | 338 | | INTOL | | |
| 013B | 011F | C1 | 0139 | 339 | | T | *-2 | |
| 013C | 010F | E4 | 012C | 340 | | T | STH80 | |
| 013D | 0107 | 00 | | 0 | | | | |
| 013E | 0103 | 00 | | 0 | | | | |
| 013F | 0101 | 00 | | 0 | | | | |

| HADR | PADR | TXT | ARG | STMT | SOURCE | STATEMENT | |
|---|---|---|---|---|---|---|---|
| | | | | 341 | ****** | ORG | #1C0 |
| 01C0 | 01C0 | 20 | 0 | 342 | PWR | CLEAR I/O'S AND RAM | |
| 01C1 | 01E0 | 70 | 0 | 343 | | LR | #00 |
| 01C2 | 01C0 | 59 | 1 | 344 | PWR2 | LAT | 0 |
| 01C3 | 01C8 | 70 | 0 | 345 | | X | 0:1 |
| 01C4 | 01C8 | 5B | 3 | 346 | | LAT | 0 |
| 01C5 | 01C2 | 70 | 0 | 347 | | X | 1:2 |
| 01C6 | 01F1 | 59 | 1 | 348 | | LAT | 0 |
| 01C7 | 01E0 | 00 | | 349 | | X | 2:3 |
| | | | | 350 | | NOP | |
| 01C8 | 01DA | 14 | 1 | 351 | | RR | $ |
| 01C9 | 01CC | 57 | 3 | 352 | | XNSK | 3!0 |
| 01CA | 01C6 | DF | 01C1 | 353 | | T | PWR2 |
| | | | | 354 | ****** | WAIT FOR SH1-SH4 LOW | |
| 01CB | 01F3 | AC | 03DF | 355 | WAITH | TM | $LBH4 |
| 01CC | 01D1 | 08 | 1 | 356 | WAITH2 | SKRF | $ |
| 01CD | 01F8 | EE | 01CC | 357 | | T | *-1 |
| 01CE | 01D4 | 5C | 0 | 358 | | XDSK | |
| 01CF | 01CA | 3F | | 359 | | SKREI | 0 |
| 01D0 | 01F5 | 20 | 0 | 359 | | | |
| 01D1 | 01F2 | EF | 01CC | 360 | | T | WAITH2 |
| 01D2 | 01E9 | 3F | 0 | 361 | | TL | Z10 |
| 01D3 | 01EC | FF | 0000 | 362 | ****** | | |
| 01D4 | 01DE | 14 | 1 | 363 | RR | RR | $ |
| 01D5 | 01FF | 02 | 0 | 364 | | RT | |
| 01D6 | 01D7 | 00 | 0 | 0 | | | |
| 01D7 | 01CB | 00 | 0 | 0 | | | |
| 01D8 | 01C5 | 00 | 0 | 0 | | | |
| 01D9 | 01F2 | 00 | 0 | 0 | | | |
| 01DA | 01F1 | 00 | 0 | 0 | | | |
| 01DB | 01FA | 00 | 0 | 0 | | | |
| 01DC | 01C6 | 00 | 0 | 0 | | | |
| 01DD | 01CE | 00 | 0 | 0 | | | |
| 01DE | 01F7 | 00 | 0 | 0 | | | |
| 01DF | 01D3 | 00 | 0 | 0 | | | |
| 01E0 | 01C9 | 00 | 0 | 0 | | | |
| 01E1 | 01F4 | 00 | 0 | 0 | | | |
| 01E2 | 01D2 | 00 | 0 | 0 | | | |
| 01E3 | 01E9 | 00 | 0 | 0 | | | |

* POWER-ON PAGE *

| ADDR | PADR | TXT | ARG | STMT | SOURCE STATEMENT |
|---|---|---|---|---|---|
| 01E4 | 01F4 | 00 | | 0 | |
| 01F5 | 01CA | 00 | | C | |
| 01F6 | 01FD | 00 | | C | |
| 01F7 | 01F6 | 00 | | C | |
| 01F8 | 01F5 | 00 | | C | |
| 01F9 | 01DD | 00 | | C | |
| 01EA | 01EE | 00 | | C | |
| 01EB | 01F7 | 00 | | C | |
| 01FC | 01D8 | 00 | | C | |
| 01ED | 01CD | 00 | | C | |
| 01FE | 01F8 | 00 | | C | |
| 01FF | 01F3 | 00 | | C | |
| 01F0 | 01D9 | 00 | | C | |
| 01F1 | 01EC | 00 | | C | |
| 01F2 | 01D6 | 00 | | C | |
| 01F3 | 01EB | 00 | | C | |
| 01F4 | 01D5 | 00 | | C | |
| 01F5 | 01FA | 00 | | C | |
| 01F6 | 01F5 | 00 | | C | |
| 01F7 | 01FA | 00 | | C | |
| 01F8 | 01FD | 00 | | C | |
| 01F9 | 01EF | 00 | | C | |
| 01FA | 01FF | 00 | | C | |
| 01FB | 01DF | 00 | | C | |
| 01FC | 01CF | 00 | | C | |
| 01FD | 01C7 | 00 | | 0 | |
| 01FE | 01C3 | 00 | | 0 | |
| 01FF | 01C1 | 00 | | C | |

| HADR | PADR | TXT | APG | STMT | SOURCE STATEMENT | | |
|---|---|---|---|---|---|---|---|
| | | | | | | ORG | #380 !*** SECONDARY SUBROUTINE PAGE *** |
| 0380 | 0380 | 27 | 7 | 365 | ****** | ENTER HERE TO PUT LOWS ON ALL ATTENTION LINES | |
| 0381 | 0381 | 1F | 3 | 366 | LO>A1 | LRL | $ATR |
| 0382 | 0382 | 00 | | 367 | | NOP | |
| | | | | 368 | ****** | ENTER HERE TO PUT LOWS ON ADDRESSED LINE AND THOSE TO RIGHT | |
| 0383 | 0383 | 14 | 1 | 370 | LO>$1 | RR | $ |
| 0384 | 0384 | 54 | 0 | 371 | | XNCK | |
| 0385 | 0385 | F7 | 0383 | 372 | | T | *-2 |
| 0386 | 0386 | 02 | | 373 | | RT | |
| | | | | 374 | ****** | H_x>B--LOAD BU,BL FROM BUX,BLX (S IS PRESERVED, A IS DESTROYED) | |
| 0387 | 0387 | 29 | 9 | 375 | B_XR1 | LR | BLX |
| 0388 | 0388 | 50 | 0 | 376 | | L | ;DESIRED A-LOWER TO AC |
| 0389 | 0389 | 5C | C | 377 | | XDSK | ;DUE TO FUNNY 4/1 TIMING. |
| 038A | 038A | 5A | A | 378 | | X | ; THESE 2 INSTRS JUST CHANGE AL. |
| 038B | 038B | 08 | | 379 | | SKAE | ;A-UPPER 1 OR 2? |
| 038C | 038C | 10 | 1 | 380 | | FOR | 1 |
| 038D | 038D | 1F | 2 | 381 | | EOR | 2 |
| 038E | 038E | 46 | | 382 | | XAR | ;DESIRED B-LOWER TO A-LOWER |
| 038F | 038F | 02 | | 383 | | RT | |
| 0390 | 0390 | 00 | | | | | |
| 0391 | 0391 | 00 | | | | | |
| 0392 | 0392 | 00 | | | | | |
| 0393 | 0393 | 00 | | | | | |
| 0394 | 0394 | 00 | | | | | |
| 0395 | 0395 | 00 | | | | | |
| 0396 | 0396 | 00 | | | | | |
| 0397 | 0397 | 00 | | | | | |
| 0398 | 0398 | 00 | | | | | |
| 0399 | 0399 | 00 | | | | | |
| 039A | 039A | 00 | | | | | |
| 039B | 039B | 00 | | | | | |
| 039C | 039C | 00 | | | | | |
| 039D | 039D | 00 | | | | | |
| 039E | 039E | 00 | | | | | |
| 039F | 039F | 00 | | | | | |
| 03A0 | 03A0 | 00 | | | | | |
| 03A1 | 03A1 | 00 | | | | | |
| 03A2 | 03A2 | 00 | | | | | |
| 03A3 | 03A3 | 00 | | | | | |

| | | |
|---|---|---|
| 0346 | 0384 | 00 |
| 0345 | 0380 | 00 |
| 0346 | 038D | 00 |
| 0347 | 0386 | 00 |
| 0348 | 038B | 00 |
| 0349 | 038D | 00 |
| 034A | 03AE | 00 |
| 034B | 03B7 | 00 |
| 034C | 0338 | 00 |
| 034D | 039D | 00 |
| 034E | 03A5 | 00 |
| 034F | 03B3 | 00 |
| 0360 | 0399 | 00 |
| 0391 | 03AC | 00 |
| 0392 | 03A6 | 00 |
| 03A3 | 03AB | 00 |
| 0394 | 0395 | 00 |
| 03A5 | 03B5 | 00 |
| 03A6 | 036A | 00 |
| 03A8 | 03AD | 00 |
| 03A9 | 03AE | 00 |
| 03AA | 03AF | 00 |
| 03AB | 03AF | 00 |
| 03AC | 03AF | 00 |
| 03AD | 03A7 | 00 |
| 03AE | 03A3 | 00 |
| 03AF | 03A1 | 00 |

| ADDR | BADR | TXT | ADG | STMT | SOURCE | STATEMENT | | |
|---|---|---|---|---|---|---|---|---|
| | | | | | | | | !*** PRIMARY SUBROUTINE PAGE *** |
| 03C0 | 03C0 | F7 | 03A3 | 384 | | ORG | | #3C0 | |
| 03C1 | 03C1 | FF | 03A0 | 385 | LO>B | T | | LO>B1 | |
| 03C2 | 03C2 | FF | 03A0 | 386 | LO>$A | T | | LO>A1 | |
| 03C3 | 03C3 | CF | 0387 | 387 | B X>B | T | | B X81 | |
| | | | | 388 | ******* | 4?INT?-- BACK TO MAIN LOOP IF 4/2 IS INTERRUPTING; ELSE RETURN | | | |
| | | | | 389 | 4?INT? | FOII | | * | |
| 03C3 | 03C3 | 22 | 2 | 390 | | LBL | | $H2 | |
| 03C4 | 03C4 | 1F | 3 | 390 | | | | | |
| 03C2 | 03C2 | 00 | | 391 | | NOP | | | |
| 03E1 | 03E1 | 08 | 1 | 392 | | SKBF | | $H25 | |
| 03F0 | 03F0 | B3 | 03C9 | 393 | | T | | ,*+2 | |
| 03C8 | 03C8 | 02 | | 394 | | RT | | | |
| 03C9 | 03C9 | 3F | 0 | 395 | | TL | | ZIO | !GO DROP ALL LINES & SEE WHAT 4/2 WANTS |
| 03C6 | 03C6 | FF | 0000 | 395 | | | | | |
| | | | | 396 | ******** | BUMP--INCREMENT A TWO-DIGIT NUMBER | | | |
| 03CB | 03CB | 2B | 11 | 397 | BUMPC | LR | | CNTD | |
| 03C1 | 03C1 | 29 | 9 | 398 | BUMPB | LR | | BLX | |
| 03CB | 03CB | 00 | | 399 | BUMP | RC | | | |
| 03CD | 03CD | 71 | 1 | 400 | | LAT | | 1 | |
| 03CA | 03CA | 40 | 0 | 401 | | AC | | | |
| 03CF | 03CF | 5C | 0 | 402 | | XDSK | | | |
| 03D1 | 03D1 | 70 | 0 | 403 | ACXDSK | AC | | | |
| 03D2 | 03D2 | 40 | | 404 | | XDSK | | | |
| 03D3 | 03D3 | 5C | 0 | 405 | | RT | | | |
| 03D4 | 03D4 | 02 | | 406 | | | | | |
| | | | | 407 | ******** | | | | |
| 03D5 | 03D5 | 70 | 0 | 408 | ZERO2 | LAT | | 0 | |
| 03D7 | 03D7 | 5C | 0 | 409 | | XDSK | | | |
| 03D7 | 03D7 | 70 | 0 | 410 | ZERO | LAT | | 0 | |
| 03D5 | 03D5 | 78 | 8 | 411 | EIGHT | LAT | | 8 | |
| 03D9 | 03D9 | 5A | 0 | 412 | | X | | R | |
| 03DA | 03DA | 02 | | 413 | | RT | | | |
| | | | | 414 | ******** | | | | |
| 03DB | 03DB | 27 | 7 | 415 | SLRATR | LR | | #07 | |
| 03DC | 03DC | 21 | 1 | 416 | SLRH1 | LR | | #01 | |
| 03DE | 03DE | 22 | 2 | 417 | SLRH2 | LR | | #02 | |
| 03E7 | 03E7 | 23 | 3 | 418 | SLRH3 | LR | | #03 | |
| 03D3 | 03D3 | 24 | 4 | 419 | SLRH4 | LR | | #04 | |
| 03C9 | 03C9 | 00 | | 420 | | NOP | | | |
| 03E1 | 03E1 | 1F | 3 | 421 | SEOR | EOR | | 3 | |

| ADDR | PADR | TXT | ARG | STMT | SOURCE STATEMENT | | | |
|------|------|-----|-----|------|------|------|------|------|
| 03F2 | 03D2 | 02 | | 422 | | RT | | |
| | | | | 423 | ****** | SENDC--SEND A CHARACTER FROM S TO SERIAL BUS (DOESN'T ALTER AC) | | |
| 03F3 | 03F9 | 20 | 0 | 424 | | SENDC | LRI | $RDY |
| 03F4 | 03FA | 1E | 3 | 424 | | | | |
| 03F5 | 03DA | 00 | | 425 | | | NOP | |
| 03F6 | 03FD | 10 | 1 | 426 | | | SR | $RDYS |
| 03F7 | 03F6 | 4D | | 427 | | | IOS | |
| 03F8 | 03F8 | A2 | 03E9 | 428 | | | T | *+1 |
| 03F9 | 03D0 | 91 | 03FA | 429 | | | T | *+1 |
| 03FA | 03EE | 38 | 7 | 430 | | | IL | RB |
| 03FB | 03F7 | E1 | 01D4 | 430 | | | ;4-BIT DELAY; GO "RESET BIT" AND RT | | |
| | | | | 431 | ****** | AT>BL--CONVERT ATTN ID (IN BUFF) TO B-LOWER VALUE IN AC; BUT IF | | |
| | | | | 432 | ****** | BUFF CONTAINS 15 (PSEUDO ATTN ID), GO SEND KERNEL TO 4/2. | | |
| 03FC | 03DB | 20 | 0 | 433 | | AT>BL | LRI | BUFF |
| 03FD | 03CD | 1D | 1 | 433 | | | | |
| 03FE | 03EC | 50 | 0 | 434 | | | ATSK | 4 |
| 03FF | 03E3 | 64 | 4 | 435 | | | T | *+1 |
| 03F0 | 03D9 | 93 | 03F1 | 436 | | | ;4/2 WANTS A KERNEL (WHAT A DUMMY!) | | |
| 03F1 | 03EC | 27 | 7 | 437 | | | LB | FLAGS |
| 03F2 | 03D6 | 15 | 2 | 438 | | | BR | BERFLG |
| 03F3 | 03FB | 34 | 11 | 439 | | | SKAEI | 11 |
| | | | | 439 | | | ;BERKEL? | |
| 03F4 | 03D5 | 64 | 4 | 440 | | | RT | |
| | | | | 440 | | | ;NO | |
| 03F5 | 03FA | 02 | | 441 | | | SR | BERFLG |
| | | | | 441 | | | ;SET BERKEL FLAG | |
| 03F6 | 03F5 | 11 | 2 | 442 | | | LAI | 1 |
| | | | | 442 | | | ;YES | |
| 03F7 | 03FA | 7A | 8 | 443 | | | RT | |
| 03F8 | 03FD | 02 | | 443 | | AT>BLR | ;MSD--13, PC--12, BERKEL-- R | | |
| | | | | 444 | *****AEF>RX--ADDRESS OF BUFF TO R_X | | | |
| 03F9 | 03EE | 28 | 8 | 445 | | ABF>BX | LB | BUX |
| 03FA | 03FF | 71 | 1 | 446 | | | LAI | 1 |
| 03FB | 03DF | 54 | 0 | 447 | | | XNSK | |
| 03FC | 03CF | 84 | 03D7 | 448 | | | T | ZERO |
| 03FD | 03C7 | 00 | | 0 | | | | |
| 03FE | 03C3 | 00 | | 0 | | | | |
| 03FF | 03C1 | 00 | | 0 | | | | |
| | | | | 449 | | END | | |

SCALE SUBSYSTEM PROCESSOR PROGRAM

```
PAGE  - 27 -

1033  *            ************UPDATE SAMPLECOUNTER & READ NEW SAMPLE
326 320  12   2    1034  *
327 308  4C   C    1035  UPDTCNTR LR   R02
328 309  7C        1036           LAI  0
329 30D  CC  32F   1037           ACSK                CARRY = 1
32A 30E  52        1038           T    WTINPO
32B 30F  C9  327   1039           XDSK 0,-4
32C 310  18        1040           T    M.WEIGH       LAST WEIGHTSAMPLE - DELAYED INPUT
32D 311  24        1041           RA   F.WEIGH
32E 312  2F        1042           RT
32F 313  5C   0    1043  WTINPO   X    0             CARRY :=1
330 314  76        1044           I2C                NOT LAST WEIGHT SAMPLE - INPUT NOW
331 315  17   7    1045           LR   R07           READ WT UNITS
332 316  5C   0    1046           X    0
333 317  79        1047           SOS                RESET NEW WEIGHTSAMPLE
334 318  71        1048           ROS
335 319  2F        1049           RT                 CY :=0

1050  *
1051  *            ************SET UP MESSAGE REGISTER
1052  MESSAGE1 LRL M.MESAGE
336 31C 1ACA 2A    1053           XNSK 0             STORE STATUS
338 31D  54   C    1054           LAI  0
339 31E  40   0    1055           XNSK 0             WEIGHT :=0
33A 31F  54        1056           T    0,-2
33B 31F  C1  339   1057           RT
33C 320  2F        1058
                   1059  *
                   1060  *            SUB - TRANSMISSION
                   1061  *            ****************
                   1062           ORG  #340
340 340 1ACA 2A    1063  TXWIDNV  LRL  M.MESAGE
342 350  40   C    1064           LAI  #C           INDICATE DATA INVALID
343 34A  50   0    1065           X    0
344 34A  C4  368   1066           T    TXW3         GOTO SET "ACKN"
                   1067  *
345 342 35FF 240   1068  TSTOA    TL   TSTO
                   1069  *
                   1070           EJECT
```

```
PAGE 15                                    - 28 -

347 370   30C3 303         INI3AA   TL     INI3A
349 34C     27     4  1073 TPB      RR     F.TXERR  *** CLR TX ERROR WHEN ATTN GOES LOW
34A 345     15     5  1074          LA     S.ACK    ACKN :=0
34B 343     71        1075          ROS
34C 351     2F        1076          RT
                      1077  *
                      1078  *              *****TEST SIGNAL OFF?
34D 348     01        1079 TSTOFF?  SKISL
34E 354     C4  368   1080          T      TXW3     ON  --> STILL IN TESTMODE
34F 34A     24     1  1081          RR     F.TEST   OFF --> RESTART NORMAL WEIGHING
350 345     A9  7FA   1082          TM     TXW1DTNV DATA NOT VALID
351 377   1405  74    1083          LRL    R.NW
353 37C     44     4  1084          LAI    6        STORE ALL 6'S IN R.NW TO CREATE MOTION
354 35F     5A     0  1085          XDSK   P
355 36F     C1  353   1086          T      *-2
356 357   3FFF        1087          TL     BEGN     RESTART NORMAL WEIGHING
                      1088  *
                      1089  *              *********RESET IND ON & DATA NOT VALID
358 345   R2  7ED     1090 TX0      TM     RESETDNV
                      1091  *
                      1092  *              ************:-:-:- TX BEGIN -:-:-:-*****
359 367     1A     8  1093 TX1      LA     M.TXERR  PREVIOUS TX ERROR
354 371     03        1094          INTOH           ATTN = 1?
358 374   F3  343     1095          T      TRR     ATTN =0 CLEAR PREV ERROR
35C 35C     2A     4  1096          SKBF   F.TXERR ATTN = 1 WAS LAST TX IN ERROR?
35D 34E     2F        1097          RT             YES TX NOT ALLOWED UNTIL ATTN =0 AND 1 AGAIN
                      1098  *
                      1099  *              ***RESET OR TEST SIGNALS CHANGED?
35E 357     19     9  1100 TXW0     LA     M.RESET
35F 353     2A     4  1101          SKBF   F.RESET
360 349     C4  369   1102          T      TXW3     NOT CHECKED IF IN RESET MODE
361 364     01        1103          SKISL           RESET SIGNAL ON?
362 352     CF  347   1104          T      INI3AA   YES --> INITIALISE
363 359     1A     8  1105          LA     M.TEST   NO
364 374     28     1  1106          SKBF   F.TEST
365 354     07  340   1107          T      TSTOFF?  SW TEST ON --> CHECK TEST SIGNAL
366 360     01        1108          SKISL           TEST NOW SFT ON?
367 376   FD  345     1109          T      TSTOA    YES --> TESTPROCEDURE
                      1110  *
                      1111          EJECT
```

```
PRW15                                    - 29 -           **********SENDING & RECEIVING **********************

368  36B        15    5   1112 *
369  36C        70    5   1113 TXW3     LR    S.ACK         ***ACK := 1
36A  36E        16    8   1114          SOS
36B  36F        2A    3   1115          LR    M.WEIGH
36C  370        A9 7F2     1116          SKBF  F.WEIGH       BYPASS EXTRA SUB-LEVEL IF NOT WEIGHING
36D  340       1804 23     1117 TXW4    TM    WTINPUT
36E  373        4A    0    1118          LPL   M.FTX
36F  375        5C    0    1119          LAI   FTX
370  376        4A    4    1120          X
371  377        4A    4    1121          LAI   #A           STORE ETX CHARACTER
372  378       31FF 380    1122          TL    TXW2         BEGIN PTR IN MESSAGE
                           1123 *
374  37B        42    2    1125 DIFFA   LAI   2
375  37A        43    3    1126 DIFFB   LAI   3
376  37B        10    9    1127          LR    M.MOTION
377  37A        2A    2    1128          SKBF  F.TWOSTB
378  37D        4F    F    1129          AISK  F
379  37E        1A    4    1130          LR    R04
37A  37F        2F         1131          PJT
                           1132 *
378  35F    3035FF 660    1133 DEADZEVL TLR   DEADZVL
                           1134 *
                           1135          EJECT
```

```
PRW15                              - 30 -

1136            ORG   #3B0  *            ----- DIGIT SEND LOOP -----
                            1137     *
3A0  3B0  75          1138  TXW2    LXA
3A1  3A0  76          1139          LBA
3A2  3B0  50    0     1140          L     0                DATA TO ACCU
3A3  3B8  77          1141          COM                    IOS-INSTR INVERTS!!
3A4  3B4  12    2     1142          LR    S.SEND           SEND MODE
3A5  3B2  70          1143          SOS
3A6  3A1  14    4     1144          LR    S.RDYOUT
3A7  3B0  70          1145          SOS                    READY :=1
3A8  3B8  74          1146          XAS
3A9  3BC  20          1147          IOS                    SEND DATA SERIALLY
3AA  3B6  18    8     1148          LR    M.WEIGH
3AB  3A3  2A    3     1149          SKRF  F.WEIGH          BYPASS EXTRA SUB-LEVEL IF NOT WEIGHING
3AC  3B1  AA   7F4    1150          TM    WTACCU           WT-UNITS ACCUMULATED IF WEIGHING
3AD  3B8  F8   33F    1151          T     *+1
3AE  3B4  F5   39F    1152          T     *+1
3AF  3B4  14    4     1153          LR    S.RDYOUT
3B0  3A5  F8          1154          T     *+1
3B1  3A2  CD   391    1155          ROS
3B2  3A9  71          1156          LR    S.SEND
3B3  3BC  12    2     1157          ROS
3B4  3BC  71          1158          XAX
3B5  3BF  75          1159          LXA
3B6  3A7  67    7     1160          AISK  7                ---- ETX CHARACTER SEND?----
3B7  3AB  BD   399    1161          T     TXRDY=1?  NO
3B8  3A5  CA   346    1162          T     T4T0     YES --- GOTO END OF TX
3B9  3A2  13    3     1163  TXRDY=1? LR   S.RDYIN
3BA  3B1  4F   F      1164          LAI   F
3BB  3BA  01          1165          SKISL
3BC  3BC  F6   3A0    1166          T     TXRDY=0? YES. PROCEED           READY-IN = 1 ?
3BD  3BE  4F   F      1167          AISK  F                NO - CHECK TIMEOUT
3BE  3BF  C7   399    1168          T     *-3
3BF  3B3  F8   3B0    1169          T     TXER             TIMEOUT ON RDY = 1 ?
                            1170     *
                            1171            EJECT
```

```
PRWTS                          - 31 -

340  329  40  0          1172 TXRDY=0?  LAI    0
341  344  13  3          1173          LH     S.RDYIN
342  342  61  1          1174          AISK   1
343  349  F9  3BD        1175          T      TXER       TIMEOUT ON RDY = 0 ?
344  3B4  01             1176          SKISL             READY-IN = 0 ?
345  3A5  FD  3A2        1177          T      *-3
346  3A6  0A  2          1178          EOR    2
347  3B6  79             1179          XAX
348  3A8  76             1180          LXA
349  3B9  74             1181          LRA             ----DATA RXED TO ACCU
34A  3AE  00             1182          XAS
34B  3AB  7F             1183          NOP
34C  3BB  CA  396        1184          SKMFA           ----COMPLEMENT OF DATA SEND?
34D  3AD  18  8          1185          T      TAT0     NO, ERROR
34E  3AE  2A  3          1186          SKRF   M.WEIGH
34F  3AF  49  7F2        1187          F      F.WEIGH  BYPASS EXTRA SUB-LEVEL IF NOT WEIGHING
380  389  0A  2          1188          TM     WTINPUT  INPUT WT-UNITS IF REQD & READY
381  34C             1189          EOR    2
382  394             1190          XAX
383  3AR  61  1          1191          AISK   1        DATA PTR UPDATE
384  395  4A  8          1192          LAI    8        8=M.ETX -- END
385  3AA  FF  3B0        1193          T      TXW2     ----END OF DIGIT SEND LOOP
           3194  *
           3195  *
           3196  *                                     --------END OF TX
386  385  15  5          1197 TAT0     LR     S.ACK
387  3BA  71  1          1198          ROS
388  3BD  4F  F          1199          LAI    F        ACKN = 0 ?
389  3BF  03             1200          T      TAT1
38A  3BF  FE  3AF        1201          AISK   F        ATTN = 0 ?
38B  3BF  6F  F          1202          T      *-3
38C  3BC  C1  3A9        1203          T      TAT1
           1204  *
           1205  *                                     ----TXERROR = ATTENTION LEFT HIGH AT END TX
38D  3A7  1B  B          1206 TXER     LR     M.TXERR
38E  3A3  23  4          1207          SB     F.TXERR  :-:-:-: TX ENDED :-:-:-:-:
38F  3A1  2F             1208          RT                     EXCEPT IF CHANGING "TEST" OR "RESET"
           1209  *
           1210  *
           1211          EJECT
```

```
PRW15                               - 32 -

******************************************
                                                    * MAIN PROGRAM -:- INITIALISE  ***********
                                                    ******************************************
       1212                         ORG    #3C0     *****BEGINADDRESS OF CPU****
       1213                  *
       1214                  *
       1215                  *
       1216                  *
3C0 3C0  05          1217 INIT  RC
3C1 3F0  303A90 559  1218       TMLB   WTRDRST     RESET WT-BOARD
3C4 3C3  1F      F   1219       LB     ROF
3C5 3C2  95  7F5     1220       TM     TSTB        CLR INDICATORS & TEST DIGITS
3C6 3C1  82  7ED     1221       TM     RESETDNV    SET "RESET" FLAG & MESSAGE := DATA NOT VALID
       1222                  *
3C7 3F0  12      2   1223       LR     R02
3C8 3D8  4A      H   1224 WAITST LAI   CNTR := 8RR (HEX)
3C9 3CC  5A      C   1225       XDSK   R
3CA 3C6  F7  3C8     1226       T      0
       1227                  *                     *-2
                                  *
3CB 3E3  8A  7C4     1229 WAITISEC TM  A>R         DELAY 1 SEC
3CC 3F1  AA  7E9     1230          TM  TX
3CD 3FA  06          1231          SC
3CE 3D4  3390 326    1232          TML UPDTCNTR
3CF 3D5  02          1233          SKNC
3D0 3F2  E1  304     1234          T   INI3
3D1 3F2  0C  3CR     1235          T   WAITISEC
       1236                  *
3D3 3FC  8A  7F9     1238 INI3A   TM  TXWIDTNV
3D4 3DE  13      3   1239 INI3    LR  R03
3D5 3FF  28      1   1240         SKBF
3D6 3D7  F4  308     1241         T   **2
3D7 3C8  A2  7ED     1242         TM  RESETDNV    SET "RESET" FLAG & MESSAGE := DATA NOT VALID
3D8 3C9  42  7E9     1243         TM  TX
3D9 3F2  303A90 559  1244         TMLR WTRDRST RESET WT-BCARD
3DC 3DC  04          1245         INTIL       NEW WEIGHTSAMPLE READY?
3DC 3DC  EC  3DF     1246         T   **2         NO
3DE 3E7  A5  7F7     1247         TM  ALARMF      YES -- WEIGHING-ERROR
3DF 3E3  A2  7E9     1248         TM  TX
3E0 3C9  13      3   1249         LR  R03
3E1 3E4  28      1   1250         SKBF
3E2 3D2  FA  3F4     1251         T   INI3AZ
       1252                  *
       1253                         EJECT
```

```
PAW1S                           - 33 -

3F3 3F0                 1254           *
3F4 3F4   0F    7       1255           EOR    7         TEST & CLR REGS 7 -> 0
3F5 3F4   95  7F5       1256           TM     TSTB
3F6 3F6   0E    6       1257           EOR    6
3F7 3F6   95  7F5       1258           TM     TSTB
3F8 3F8   0D    5       1259           EOR    5
3F9 3FA   95  7F5       1260           TM     TSTB
3FA 3FA   0C    4       1261           EOR    4
3FB 3FC   95  7F5       1262           TM     TSTB
3FC 3FC   0B    3       1263           EOR    3
3FD 3FE   95  7F5       1264           TM     TSTB
3FE 3FE   0A    2       1265           EOR    2
3FF 3F0   95  7F5       1266           TM     TSTB
3F0 3F0   09    1       1267           EOR    1
3F1 3F2   95  7F5       1268           TM     TSTB
3F2 3FC                 1269           TM     TSTB
                        1270           *
3F2 3F6   04            1271           INTIL
3F3 3F8   85  7F7       1272           TM     IN13AZVL    ALARMF NO --> WEIGHING ERROR
3F4 3F5 3034F5 6CF      1273  IN13AZ   TLR                ***** NEW WEIGHTSAMPLE READY?
                        1274           *
                        1275           *
                        1276           *                  XXXXX--> MACHINE DEAD ::: ONLY TRANSMISSION <--XXXXX
3F7 3FA   A6  7F0       1277  M.C.KILL TM    MESSAGE      STORE ERROR CODE
3F8 3FD 103DAF 430      1278  M.C.ZEVL TMLR  DISPLAY
3F9 3FF   A2  7E9       1279  M.C.DEAD TM    TX           TX WHEN REQUESTED
3FA 3FF   13    3       1280           LB    R03
3FB 3C7   20    1       1281           SR    1
3FC 3C7   CF  3C7       1282           T     WAITST       SEND ERROR CODE AND HAVE ANOTHER TRY
                        1283           *
                        1284           EJECT
```

POSTAGE PRINTER SUBSYSTEM PROCESSOR PROGRAM

| JDR | PADR | TXT | ARG | STMT | SOURCE | STATEMENT | | |
|---|---|---|---|---|---|---|---|---|
| 180 | 0180 | 18 | | 478 | | ORG | W180 | |
| 181 | 01A0 | 71 | 8 | 479 | CM26 | LB | ACKN | ;POINT TO ACKNOWLEDGE LINE |
| 182 | 0190 | 03 | | 480 | | ROS | | ;LOWER ACKNOWLEDGE LINE |
| 183 | 0188 | FD | 0185 | 481 | | INTOH | | ;ATTENTION LOW ? |
| 184 | 0184 | EF | 0182 | 482 | | T | *+2 | ;YES |
| 185 | 0182 | 19 | | 483 | | T | *-2 | ;NO |
| 186 | 01A1 | 59 | 9 | 484 | COMM1 | LB | STAT | ;POINT TO STATUS WORD |
| 187 | 01B0 | 18 | 0 | 485 | | L | | ;LOAD STATUS |
| 188 | 0198 | 5C | 8 | 486 | | LB | TEMP | ;POINT TO COMMAND WORD |
| 189 | 018C | 50 | 0 | 487 | | X | | ;SAVE STATUS |
| 18A | 0186 | 74 | 0 | 488 | | L | | ;LOAD STATUS |
| 18B | 01A3 | 71 | | 489 | | XAS | | ;STATUS TO S REGISTER |
| 18C | 0191 | 1B | 11 | 490 | | ROS | | ;LOWER ACKNOWLEDGE LINE |
| 18D | 01A8 | 40 | 0 | 491 | | LB | CMFLG | |
| 18E | 0194 | 66 | | 492 | CM1 | LAI | 0 | ;PREPARE FOR CHANNEL 1 INPUT |
| 18F | 018A | 00 | | 493 | | TISK | | ;GET RESET SIGNAL |
| 190 | 01A5 | 56 | 0 | 494 | | NOP | | ;UNCONDITIONAL SKIP |
| 191 | 01B2 | 29 | 2 | 495 | | X | | ;SAVE RESET SIGNAL |
| 192 | 0189 | 6A | 01B4 | 496 | | SKBF | 2 | ;RESET METER 1 ? |
| 193 | 016C | 2A | 3 | 497 | | T | CM23 | ;YES |
| 194 | 019E | C5 | 01B7 | 498 | | SKBF | 3 | ;NO, RESET METER 2 ? |
| 195 | 01AF | 5C | 0 | 499 | | T | CM24 | ;YES |
| 196 | 0197 | 03 | | 500 | | X | | ;NO, RESTORE CMLFG |
| 197 | 018B | D7 | 01BD | 501 | | INTOH | | ;S/P WANT TO TALK ? |
| 198 | 0185 | 18 | 8 | 502 | | T | CM1 | ;NO |
| 199 | 01AC | 70 | | 503 | | LB | ACKN | ;YES; POINT TO ACKNOWLEDGE LINE |
| 19A | 0181 | 19 | 9 | 504 | | SOS | | ;RAISE ACKNOWLEDGE LINE |
| 19B | 01B5 | 47 | 7 | 505 | | LB | STAT | ;POINT TO STATUS WORD |
| 19C | 019C | 5C | 0 | 506 | | LAI | 7 | ;ASSUME STATUS IS GOOD |
| 19D | 0188 | BF | 07C0 | 507 | | X | | ;SAVE GOOD STATUS |
| 19E | 01A7 | 77 | | 508 | | TM | XMT | ;SEND A WORD TO THE SYSTEM PROCESSOR |
| 19F | 0193 | 7F | | 509 | | COM | | ;RESTORE COMPLEMENTED STATUS |
| 1A0 | 0186 | FF | 0180 | 510 | | SKMEA | | ;STATUS DATA CORRECT ? |
| 1A1 | 01A4 | BF | 07C0 | 511 | | T | CM26 | ;NO |
| 1A2 | 0192 | 5C | 0 | 512 | | TM | XMT | ;SEND A WORD TO THE SYSTEM PROCESSOR |
| 1A3 | 01A9 | 50 | 0 | 513 | | X | | ;SAVE COMMAND |
| 1A4 | 0184 | 77 | | 514 | | L | | |
| 1A5 | 0194 | 74 | | 515 | | COM | | ;COMPLEMENT TO SEND TO S/P |
| 1A6 | 01AB | BF | 07C0 | 516 | | XAS | | ;COMPLEMENT TO S REGISTER |
| | | | | 517 | | TM | XMT | ;SEND A WORD TO THE SYSTEM PROCESSOR |

| BADR | PADR | TXT | ARG | STMT | SOURCE | STATEMENT | | |
|------|------|-----|-----|------|--------|-----------|---|---|
| 01A7 | 01B6 | 28 | 4 | 518 | | SKBF | 4 | ;POWER ON OR SET COMMAND ? |
| 01A8 | 01B8 | CC | 01AF | 519 | | T | CM27 | ;YES |
| 01A9 | 01BD | 71 | | 520 | | ROS | | ;NO, LOWER ACKNOWLEDGE LINE |
| 01AA | 01A5 | 24 | 3 | 521 | | SKBF | 3 | ;PRINT COMMAND ? |
| 01AB | 01B7 | 38 | 7 | 522 | | TL | CM7 | ;YES |
| 01AC | 01B8 | FF | 01C0 | 522 | | | | |
| 01AD | 01BD | 35 | 10 | 523 | | TL | CM34 | ;NO, THEREFORE SELECT COMMAND |
| 01AE | 01A6 | F9 | 028F | 523 | | | | |
| 01AF | 01B3 | 2A | 3 | 524 | CM27 | SKBF | 3 | ;WHICH ONE ? |
| 01B0 | 01B9 | 30 | 15 | 525 | | TL | PW2 | ;POWER ON |
| 01B1 | 01AC | C3 | 03D3 | 525 | | | | |
| 01B2 | 01B6 | 36 | 9 | 526 | | TL | CM4 | ;SET COMMAND: |
| 01B3 | 01AB | FF | 0240 | 526 | CM23 | | | |
| 01B4 | 01B5 | 5C | 0 | 527 | | X | | ;RESTORE CMFLG |
| 01B5 | 01AA | 27 | 4 | 528 | | RB | 4 | ;RESET FOR METER 1 |
| 01B6 | 01B5 | CF | 01B9 | 529 | CM24 | T | CM25 | ;GO SHARE CODE |
| 01B7 | 01BA | 5C | 0 | 530 | | X | | ;RESTORE CMFLG |
| 01B8 | 01BB | 23 | 4 | 531 | | S8 | 4 | ;SET FOR METER 2 |
| 01B9 | 01B6 | 1A | 10 | 532 | CM25 | LB | FLAG | ;POINT TO RESET/SET-UP FLAG |
| 01BA | 01BF | 20 | 1 | 533 | | S8 | 1 | ;SET RESET FLAG |
| 01BB | 01BF | 30 | 15 | 534 | | TL | PW1 | ;GO SHARE POWER ON CODE |
| 01BC | 01BF | F4 | 03D7 | 534 | | | | |
| 01BD | 0187 | 00 | | 0 | | | | |
| 01BE | 0103 | 00 | | 0 | | | | |
| 01BF | 0181 | 00 | | 0 | | | | |

| BADR | PADR | TXT | ARG | STMT | SOURCE | STATEMENT | | |
|------|------|-----|-----|------|--------|-----------|---|---|
| 01C0 | 07C0 | 19 | 9 | 29 | XMT | ORG | #7C0 | |
| 01C1 | 07E0 | 70 | | 30 | | LB | RDYO | !POINT TO READY OUT LINE |
| 01C2 | 07D0 | 2D | | 31 | | SOS | | !SET IT HIGH FOR DATA ENVELOPE |
| 01C3 | 07C8 | 42 | 2 | 32 | | IOS | | !SHIFT OUT S REGISTER |
| 01C4 | 07C4 | 6F | 15 | 33 | | LAI | 2 | !DELAY |
| 01C5 | 07C2 | BB | 07C4 | 34 | | AISK | 15 | !WHILE |
| 01C6 | 07E1 | 71 | | 35 | | T | *-1 | !SENDING |
| 01C7 | 07F0 | 03 | | 36 | | ROS | | !CLOSE DATA ENVELOPE |
| 01C8 | 07D8 | 97 | | 37 | | INTOH | | !DOES S/P WANT TO TALK ? |
| 01C9 | 07CC | 04 | 07CD | 38 | | T | RC1 | |
| 01CA | 07C6 | AE | 07CC | 39 | | INTIL | | !IS READY HIGH ? |
| 01CB | 07E3 | BF | 07C7 | 40 | | T | *+2 | !YES |
| 01CC | 07D1 | 03 | | 41 | | T | *-4 | |
| 01CD | 07E8 | 39 | 6 | 42 | | INTOH | | |
| 01CE | 07D4 | FD | 0185 | 43 | RC1 | TL | COMM1 | !DOES S/P WANT TO TALK ? |
| 01CF | 07CA | 04 | | 43 | | | | !NO, GO START COMMUNICATIONS AGAIN |
| 01D0 | 07E5 | AE | 07CC | 44 | | INTIL | | !IS READY HIGH ? |
| 01D1 | 07F2 | 74 | | 45 | | T | *-4 | !YES |
| 01D2 | 07F9 | 18 | 8 | 46 | | XAS | | !NO, DATA TO ACCUMULATOR |
| 01D3 | 07FC | 2F | | 47 | | LB | TEMP | !POINT TO TEMPORARY RAM |
| 01D4 | 07DE | 1F | 15 | 48 | | RT | | |
| 01D5 | 07EF | 4A | 0 | 49 | TIM30 | LB | 15 | !DELAY 30 MILLISECONDS |
| 01D6 | 07D7 | 58 | 0 | 50 | | LAI | 0 | |
| 01D7 | 07CB | 48 | 10 | 51 | | XDSK | | |
| 01D8 | 07C5 | 58 | 0 | 52 | | LAI | 10 | |
| 01D9 | 07E2 | 40 | 0 | 53 | | XDSK | | |
| 01DA | 07F1 | 58 | 0 | 54 | TM2 | LAI | 0 | |
| 01DB | 07F8 | 05 | | 55 | | X | | |
| 01DC | 07DC | 4F | 15 | 56 | TM1 | RC | | |
| 01DD | 07CE | 7C | | 57 | | LAI | 15 | |
| 01DE | 07E7 | 54 | 0 | 58 | | AC | | |
| 01DF | 07D3 | A3 | 07DC | 59 | | XNSK | | |
| 01E0 | 07C9 | 1D | 13 | 60 | | T | *-3 | |
| 01E1 | 07E4 | 02 | | 61 | | LB | 13 | |
| 01E2 | 07D2 | 8F | 07DB | 62 | | SKNC | | |
| 01E3 | 07E9 | 2F | | 63 | | T | TM1 | |
| 01E4 | 07F4 | 1F | 15 | 64 | | RT | | |
| 01E5 | 07DA | 44 | 4 | 65 | TIM200 | LB | 15 | !DELAY 200 MILLISECONDS |
| 01E6 | 07E0 | 58 | 0 | 66 | | LAI | 4 | |
| | | | | 67 | | XDSK | | |

PERIPHERAL SUBSYSTEM PROCESSOR PROGRAM

```
NAME    MM77           CAP477/11, PPS-4/1 MM77/MM78 cross-assembler version 1.9

FL BADR PADR CD ARG   ST NO           STATEMENT 0040 0040 9D 07D9     00177           ORG   $040
0041 0060 18 0078     00178   BUSRQ4  TM    PACZR           !!!!!
0042 0950 0F          00179           LBL   PFBR            BUS REQUEST
0043 0048 20 0001     00180           SB    1
0044 0044 37 0234     00181   BUSRQ1  EQU   *
0045 0042 EA          00182           TL    PERPOL 0046 0061 19 0069     00183   IDLPR   EQU   *
0047 0070 0E          00184           LBL   PCS1

0048 0053 50 0000     00185           L
0049 004C 61 0001     00186           AISK  1               IS IT 'F' ?
004A 0046 C6 0052     00187           T     IDL7            YES
004B 0063 18 0078     00188           LBL   PFBR            NO
004C 0051 0F          00189           SB    3
004D 0068 22 0003     00190           LBL   PCS1            SET ERROR FLAG
004E 0054 19 0069
004F 004A 0E          00191   IDL2    LBL   PCS2            STATUS WORD TO ACC 0050 0065 18 0068     00192           L     0
0051 0072 0E          00193   IDL7    XAS   RDYOUT          ]RAISE RDY
0052 0079 50 0000     00194           LB                    SHIFT OUT STATUS WORD
0053 007C 74          00195           SOS
0054 005E 19 0009     00196           IOS
0055 006F 70          00197           TM    TORT
0056 0057 2D          00198           TM    TORT
0057 004B 8D 07D1     00199           ROS
0058 0045 8D 07D1     00200           TM    RDYCK           ]LOWER RDY
0059 0062 71          00201           RT
005A 0071 B4 07D7     00202           XAS                   YES. GET DATA
005B 0078 2F          00203           SKIC
005C 005C 74          00204           LB    $08
005D 004E 02          00205           LB    $09
005E 0067 18 0008     00206           NOP
005F 0058 19 0009     00207           EOB
0060 0049 00          00208           COM
0061 0064 0E 0006     00209           SKMEA                 ]COMPARE STATUS AND STATUS BAR
0062 0052 77          00210           T     IDL41           XMISSION NO GOOD
0063 0069 7F          00211           SKNC
0064 0074 CA 0076     00212           T     IDL9            2ND WORD SENT
0065 005A 02          00213           SC
0066 006D E2 0069     00214           T     IDL2            GO BACK FOR 2ND WORD.
0067 0076 06
0068 007B DA 0050
```

NAME: MM77    CAP477/11, PPS-4/1 MM77/MM78 cross-assembler version 1.9

| FL | BADR | PADR | CD | ARG | ST NO | | STATEMENT | | |
|---|---|---|---|---|---|---|---|---|---|
| 0069 | 005B | 19 | 0009 | | 00215 | *** | STATUS WORDS SENT TO S. P. PULSE RDY. | | |
| 006A | 006E | 70 | | | 00216 | IDL9 | ID | RDYOUT | PULSE RDY |
| 006B | 0077 | 8D | 07D1 | | 00217 | | SOS | TORT | |
| 006C | 0058 | 8D | 07D1 | | 00218 | | TM | TORT | |
| 006D | 004D | 71 | | | 00219 | | TM | ROS | |
| 006E | 0066 | 18 | 0078 | | 00220 | | ROS | LBL | PFBR |
| 006F | 0073 | 0P | | | 00221 | | LBL | | |
| 0070 | 0059 | 2A | 0003 | | 00222 | | SKBF | 3 | |
| 0071 | 006C | 34 | 02DF | | 00223 | POLCL | TL | POLG | |
| 0072 | 0036 | EC | | 73 | 00224 | IDL91 | EQU | * | ERROR ? |
| 0073 | 006B | 9D | 07D9 | | 00225 | | TM | PACZR | |
| 0074 | 0055 | 19 | 0909 | | 00226 | | LB | LOADS | NO |
| 0075 | 006A | 2A | 0003 | | 00227 | | SKBF | 3 | |
| 0076 | 0075 | 34 | 02F9 | | 00228 | IDL41 | TL | IDL4 | INPUT BUFFER LOADED ? |
| 0077 | 007A | C1 | | | 00229 | *** | READY TO RECEIVE SERIAL DAT FORM S. P. | | |
| 0078 | 007D | B4 | 07D7 | | 00230 | SER1 | TM | RDYCK | |
| 0079 | 007E | 9B | 07E1 | | 00231 | | TM | TOIDLE | |
| 007A | 007F | 18 | 0058 | | 00232 | | LBL | PAC2 | CHECK COUNTER |
| 007B | 005F | 0D | | | | | | | |
| 007C | 004F | 40 | 0000 | | 00233 | | LAI | 0 | |
| 007D | 0047 | 50 | 04C0 | | 00234 | | TLB | SER4 | |
| 007E | 0048 | 8C | | | | | | | |
| 007F | 0044 | FF | | | 00235 | | | | |

NAME    MM77            CAP477/11, PPS-4/1 MM77/MM78 cross-assembler version 1.9

| FL | BADR | PADR | CD | ARG | ST NO | STATEMENT | | |
|---|---|---|---|---|---|---|---|---|
|  | 04C0 | 04C0 | 7F |  | 00236 |  | ORG | #4C0 |
|  | 04C1 | 04E0 | 3C |  | 00237 |  |  | *** RDY HAS DROPPED. SERIAL DATA IS IN S REG. |
|  | 04C2 | 04D0 | FF |  | 00238 | SER4 | EQU | * |
|  | 04C3 | 04C8 | 54 | 4C0 | 00239 |  | SKMEA |  |
|  | 04C4 | 04C4 | 05 |  | 00240 |  | TL | SER5 ] |
|  | 04C5 | 04C2 | 50 | 00C0 | 00241 |  | XNSK | 0    PAC2 AND ACC. EACH HAVE A "0" SO I KAN DO IT |
|  | 04C6 | 04E1 | 7D | 0000 | 00242 |  | RC |  |
|  | 04C7 | 04F0 | E3 | 0000 | 00243 |  | L |  |
|  | 04C8 | 04D8 | 2C | 04DC | 00244 |  | ACSK |  |
|  | 04C9 | 04CC | 00 |  | 00245 |  | T | SBST |
|  | 04CA | 04C6 | 00 |  | 00246 |  | TAB |  |
|  | 04CB | 04E3 | 1E | 005E | 00247 |  | NOP |  |
|  | 04CC | 04D1 | 0D |  | 00248 |  | NOP |  |
|  | 04CD | 04E3 | 1F | 005F | 00249 |  | LBL | S8 |
|  | 04CE | 04D4 | 0D |  | 00250 |  | LBL | S9 |
|  | 04CF | 04CA | 18 | 0018 | 00251 |  | LBL | S10 |
|  | 04D0 | 04E5 | 09 |  | 00252 |  | LBL | S11 |
|  | 04D1 | 04F2 | 19 | 0019 | 00253 |  | LBL | S12 |
|  | 04D2 | 04F9 | 09 |  | 00254 |  | LBL | S13 |
|  | 04D3 | 04FC | 1A | 001A | 00255 |  | LBL | S14 |
|  | 04D4 | 04DE | 09 |  | 00256 |  | LBL | S15 |
|  | 04D5 | 04EF | 1B | 001B | 00257 | SBST | T | SBST1 |
|  | 04D6 | 04D7 | 09 |  | 00258 |  | TAB |  |
|  | 04D7 | 04CB | 1C | 001C | 00259 |  | NOP |  |
|  | 04D8 | 04C5 | 09 |  | 00260 |  | NOP |  |
|  | 04D9 | 04E2 | 1C | 005C | 00261 |  | LBL | S0 |
|  | 04DA | 04F1 | 0D |  | 00262 |  | LBL | S1 |
|  | 04DB | 04F8 | CC | 04EF | 00263 |  | LBL | S2A |
|  | 04DC | 04DC | 2C |  | 00264 |  | LBL | S3A |
|  | 04DD | 04CE | 00 |  | 00265 |  | LBL | S4 |
|  | 04DE | 04E7 | 00 | 0038 |  |  |  |  |
|  | 04DF | 04D3 | 18 |  |  |  |  |  |
|  | 04E0 | 04C9 | 0B |  |  |  |  |  |
|  | 04E1 | 04E4 | 19 | 0039 |  |  |  |  |
|  | 04E2 | 04D2 | 0B |  |  |  |  |  |
|  | 04E3 | 04E9 | 1A | 003A |  |  |  |  |
|  | 04E4 | 04F4 | 0B |  |  |  |  |  |
|  | 04E5 | 04DA | 1B | 003B |  |  |  |  |
|  | 04E6 | 04ED | 0B |  |  |  |  |  |
|  | 04E7 | 04F6 | 14 | 0004 |  |  |  |  |
|  | 04E8 | 04FB | 08 |  |  |  |  |  |

NAME  MM77                CAP477/11, PPS-4/1 MM77/MM78 cross-assembler version 1.9

| FL | BADR | PADR | CD | ARG  | ST NO | STATEMENT |     |
|----|------|------|----|------|-------|-----------|-----|
|    | 04E9 | 04DD | 15 | 0005 | 00266 | LBL       | S5  |
|    | 04EA | 04EE | 08 |      |       |           |     |
|    | 04EB | 04F7 | 16 | 0006 | 00267 | LBL       | S6  |
|    | 04EC | 04DB | 08 |      |       |           |     |
|    | 04ED | 04CD | 17 | 0007 | 00268 | LBL       | S7  |
|    | 04EE | 04E6 | 08 |      |       |           |     |
|    | 04EF | 04F3 | 74 |      | 00269 | SBST1 XAS |     |
|    | 04F0 | 04D9 | 5C |      | 00270 | X         |     |
|    | 04F1 | 04EC | 50 | 0000 | 00271 | L         |     |
|    | 04F2 | 04D6 | 77 | 0000 | 00272 | COM       |     |
|    | 04F3 | 04EB | 74 |      | 00273 | XAS       |     |
|    | 04F4 | 04D5 | 19 | 0009 | 00274 | LB        | #99 |
|    | 04F5 | 04EA | 70 |      | 00275 | SOS       |     |
|    | 04F6 | 04F5 | 8D |      | 00276 | IOS       |     |
|    | 04F7 | 04FA | 8D | 07D1 | 00277 | TM        | TORT |
|    | 04F8 | 04FD | 8D | 07D1 | 00278 | TM        | TORT |
|    | 04F9 | 04FE | 71 |      | 00279 | ROS       |     |
|    | 04FA | 04FF | 05 |      | 00280 | EOB       | 5   |
|    | 04FB | 04FF | 0D | 0005 | 00281 | TML       | PACAD1 |
|    | 04FC | 04CF | 85 | 02B4 | 00282 |           |     |
|    | 04FD | 04C7 | AA |      |       |           |     |
|    | 04FE | 04C3 | 0E | 0078 | 00283 | TL        | SER1 |
|    | 04FF | 04C1 | C2 |      |       |           |     |
|    |      |      |    |      | 00284 |           |     |

NAME MM77                CAP477/11, PPS-4/1 MM77/MM78 cross-assembler version 1.9

| FL BADR | PADR | CD | ARG | ST NO | STATEMENT | | | |
|---|---|---|---|---|---|---|---|---|
| 00C0 | 0000 | 19 | 0059 | 00285 | | ORG | #0C0 | |
| 00C1 | 00E0 | 0D | | 00286 | SER5 | LBL | PAC1 | |
| 00C2 | 0000 | 50 | 0000 | 00287 | | L | | |
| 00C3 | 00C8 | 2C | | 00288 | | TAB | | |
| 00C4 | 00C4 | 00 | | 00289 | | NOP | | |
| 00C5 | 00C2 | 00 | | 00290 | | NOP | | |
| 00C6 | 00E1 | D7 | 00CD | 00291 | | T | ZIP1 | |
| 00C7 | 00F0 | F5 | 00CF | 00292 | | T | ZIP2 | |
| 00C8 | 00D8 | CD | 00D1 | 00293 | | T | ZIP3 | |
| 00C9 | 00CC | C3 | 00D3 | 00294 | | T | ZIP4 | |
| 00CA | 00C6 | 30 | 0680 | 00295 | | TLB | SER6 | |
| 00CB | 00E3 | 35 | | | | | | |
| 00CC | 00D1 | FF | | | | | | |
| 00CD | 00E8 | 1D | 005D | 00296 | ZIP1 | LBL | S16 | |
| 00CE | 00D4 | 0D | | | | | | |
| 00CF | 00CA | 1D | 001D | 00297 | ZIP2 | LBL | S17 | |
| 00D0 | 00E5 | 09 | | | | | | |
| 00D1 | 00F2 | 1E | 001E | 00298 | ZIP3 | LBL | S18 | |
| 00D2 | 00F9 | 09 | | | | | | |
| 00D3 | 00FC | 1F | 001F | 00299 | ZIP4 | LBL | S19 | |
| 00D4 | 00DE | 09 | | | | | | |
| 00D5 | 00EF | 30 | | 00300 | | TLB | SBST1 | |
| 00D6 | 00D7 | 3C | | | | | | |
| 00D7 | 00CB | CC | | | | | | |
| 00D8 | 00C5 | 1A | 000A | 00301 | PINCEL | EQU | * | |
| 00D9 | 00E2 | 5C | 0000 | 00302 | | LB | MASK | |
| 00DA | 00F1 | 19 | 0079 | 00303 | | X | 0 | ] LOAD STROBE SELECTION |
| 00DB | 00F8 | 0F | | 00304 | | LBL | SECTR | |
| 00DC | 00CE | 40 | 0000 | 00305 | | LAI | 0 | |
| 00DD | 00CE | 5C | 0000 | 00306 | | X | | |
| 00DE | 00E7 | 13 | 0003 | 00307 | | LB | TEREE | |
| 00DF | 00D3 | 70 | | 00308 | | SOS | | |
| 00E0 | 0009 | 16 | 0006 | 00309 | PIN4 | EQU | * | |
| 00E1 | 00E4 | 71 | | 00310 | | LB | #06 | RELEASE STROBES |
| 00E2 | 00D2 | 4F | 000F | 00311 | | ROS | | |
| 00E3 | 00E9 | 75 | | 00312 | | LAI | 15 | |
| 00E4 | 00F4 | 73 | | 00313 | | LXA | | |
| 00E5 | 00DA | 7B | | 00314 | | OX | | FLOAT I/O LINES |
| 00E6 | 00ED | 70 | | 00315 | | IOA | | STOP STROBES |
| 00E7 | 00F6 | 06 | | 00316 | | SOS | | |
| 00E8 | 00FB | 19 | 0079 | 00317 | | SC | | |
| | | | | 00318 | | LBL | SECTR | |

NAME    MM77            CAP477/11, PPS-4/1 MM77/MM78 cross-assembler version 1.9

| FL | BADR | PADR | CD | ARG | ST NO | | STATEMENT | | |
|---|---|---|---|---|---|---|---|---|---|
| | 00E9 | 0000 | 0F | | 00319 | | LAI | 0 | |
| | 00EA | 00EE | 40 | 0000 | 00320 | | ACSK | | |
| | 00EB | 00F7 | 7D | | 00321 | | T | PIN3 | ;TIME OUT FOR STROBE SEARCH |
| | 00EC | 00DB | CC | 00EF | 00322 | | TL | PIN6 | |
| | 00ED | 00CD | 33 | 0000 | | | | | |
| | 00EE | 00E6 | FF | | | | | | |
| | 00EF | 00F3 | 5C | 0000 | 00323 | PIN3 | X | 0 | LOAD NEW COUNT |
| | 00F0 | 00D9 | 1A | 000A | 00324 | | LB | MASK | |
| | 00F1 | 00EC | 7B | | 00325 | | ICA | | |
| | 00F2 | 00B6 | 72 | | 00326 | | IX | | BRING IN STROBE 8 DIGIT |
| | 00F3 | 00EB | 7F | | 00327 | | SKMEA | | IS IT THE SELECTED STROBE ? |
| | 0240 | 0240 | 19 | 240 0079 | 00653 | | ORG | #240 | |
| | 0241 | 0260 | 01 | | 00654 | | LBL | SECTR | |
| | 0242 | 0250 | 40 | 0000 | 00655 | SECZRL | LAI | 0 | |
| | 0243 | 0248 | 34 | 0000 | 00656 | | XNSK | | |
| | 0244 | 0244 | 80 | 000C | 00657 | | SKBEI | 12 | |
| | 0245 | 0242 | 4C | | | | | | |
| | 0246 | 0261 | EF | 0242 | 00658 | | T | SECZRL+2 | |
| | 0247 | 0270 | 2F | | 00659 | | RT | | |
| | 0248 | 0258 | 1C | 007C | 00660 | JMCZRL | LBL | #7C | |
| | 0249 | 024C | 0F | | | | | | |
| | 024A | 0246 | 40 | 0000 | 00661 | JAM6 | LAI | 0 | |
| | 024B | 0268 | 7F | | 00662 | | SKMEA | | |
| | 024C | 0251 | 2F | | 00663 | | RT | | |
| | 024D | 0268 | 3C | 0000 | 00664 | | INC3 | | |
| | 024E | 0254 | 54 | | | | | | |
| | 024F | 024A | F9 | 024A | 00665 | | T | JAM6 | |
| | 0250 | 0265 | 2E | | 00666 | | RTSK | | |
| | 0251 | 0272 | 13 | 0013 | 00667 | ZROPB | LBL | PB11 | ZERO OUTPUT BUFFER |
| | 0252 | 0279 | 09 | | | | | | |
| | 0253 | 027C | 96 | 07E3 | 00668 | | TM | ZEROB | |
| | 0254 | 025E | 13 | 0023 | 00669 | | LBL | PB15 | |
| | 0255 | 026F | 0A | | | | | | |
| | 0256 | 0257 | 96 | 07E3 | 00670 | | TM | ZEROB | |
| | 0257 | 024B | 13 | 0043 | 00671 | | LBL | PB27 | |
| | 0258 | 0245 | 0C | | | | | | |
| | 0259 | 0262 | 96 | 07E8 | 00672 | | TM | ZEROB | |
| | 025A | 0271 | 13 | 0038 | 00673 | | LBL | PB19 | |
| | 025B | 0273 | 0B | | | | | | |
| | 025C | 025C | 96 | 07E3 | 00674 | | TM | ZEROB | |
| | 025D | 024E | 13 | 0053 | 00675 | | LBL | PB35 | |
| | 025E | 0267 | 0D | | | | | | |
| | 025F | 0253 | 96 | 07E3 | 00676 | | TM | ZEROB | |

NAME NM77                CAP477/11, PPS-4/1 NM77/NM78 cross-assembler version 1.9

| PL | BADR | PADR | CD | ARG |  | ST NO |  | STATEMENT |  |  |
|---|---|---|---|---|---|---|---|---|---|---|
|  | 0260 | 0249 | 13 | 0063 |  | 00677 |  | LBL | PB39 |  |
|  | 0261 | 0264 | 0E |  |  |  |  |  |  |  |
|  | 0262 | 0252 | 96 | 07E3 |  | 00678 |  | TM | ZEROB |  |
|  | 0263 | 0269 | 13 | 0073 |  | 00679 |  | LBL | PB7 |  |
|  | 0264 | 0274 | CF |  |  |  |  |  |  |  |
|  | 0265 | 025A | 40 | 0000 |  | 00680 | ZEROBL | LAI | 0 |  |
|  | 0266 | 0269 | 58 | 0000 |  | 00681 |  | XDSK | ZEROBL |  |
|  | 0267 | 0276 | E5 | 0265 |  | 00682 |  | T | ZEROBL |  |
|  | 0268 | 027B | 2F |  |  | 00683 |  | RT |  |  |
|  | 0269 | 025D | 1B | 00B |  | 00684 | RDYCKL | LB | #0B | ;IS RDY HI ? |
|  | 026A | 026E | 04 |  |  | 00685 |  | INT1L |  |  |
|  | 026B | 0277 | E6 | 0270 |  | 00686 |  | T | RDHI | YES |
|  | 026C | 025B | 03 |  |  | 00687 |  | INTOH |  | ;NO. IS ATT3 HI ? |
|  | 026D | 024D | 30 | 03E2 |  | 00688 |  | TL | RDYRT |  |
|  | 026E | 0266 | ED |  |  |  |  |  |  |  |
|  | 026F | 0273 | E2 | 0269 |  | 00689 | ATT3LO | T | RDYCKL | ATT3 HI |
|  | 0270 | 0259 | 04 |  |  | 00690 | RDRI | INT1L |  | ;IS RDY LOW ? |
|  | 0271 | 026C | D4 | 0273 |  | 00691 |  | T | CHATT3 | NO. CHECK ATT3 |
|  | 0272 | 0256 | 2E |  |  | 00692 |  | RTSK |  |  |
|  | 0273 | 026B | 03 |  |  | 00693 | CHATT3 | INTOH |  | ;RDY HI. IS ATT3 HI ? |
|  | 0274 | 0255 | F2 | 026D |  | 00694 |  | T | ATT3LO | NO |
|  | 0275 | 026A | E6 | 0270 |  | 00695 |  | T | RDHI | YES |
|  |  |  |  | 680 |  | 01520 |  | ORG | * |  |
|  | 0680 |  |  | 680 |  | 01521 | SERO | EQU | * |  |
|  | 0680 | 06A9 | 18 | 0008 |  | 01522 |  | LB | ACK |  |
|  | 0681 | 06A9 | 71 |  |  | 01523 |  | ROS |  |  |
|  | 0682 | 0690 | 03 |  |  | 01524 |  | INTOII |  |  |
|  | 0683 | 0688 | FD | 0685 |  | 01525 |  | T | *+2 |  |
|  | 0684 | 0684 | EF | 0682 |  | 01526 |  | T | *-2 | ; WAIT FOR ATTS TO DROP |
|  | 0685 | 0682 | 19 | 0009 |  | 01527 |  | LB | LOADS |  |
|  | 0686 | 06A1 | 28 | 0001 |  | 01528 |  | SKBF | 1 |  |
|  | 0687 | 06B0 | 2F |  |  | 01529 |  | RT |  | POWER ON ? |
|  | 0688 | 0698 | 9D | 07D9 |  | 01530 |  | TM | PACZR | YES |
|  | 0689 | 068C | 0E | 0006 |  | 01531 |  | EOB | 6 |  |
|  | 068A | 0686 | 00 |  |  | 01532 |  | NOP |  | LBL S1 |
|  | 068B | 06A3 | 3B | 0100 |  | 01533 |  | TL | SMEND |  |
|  | 068C | 0691 | FF |  |  |  |  |  |  |  |
|  |  |  |  | 68D |  | 01534 | SENDPL | EQU | * |  |
|  |  |  |  |  |  | 01535 | *** STUFF OVERSIZE BIT INTO PB50 *** |  |  |  |
|  | 068D | 06A8 | 1E | 006E |  | 01536 |  | LBL | PB44 |  |
|  | 068E | 0694 | 0E |  |  |  |  |  |  |  |
|  | 068F | 068A | 2B | 0004 |  | 01537 |  | SKBF | 4 | IS IT OVERSIZED ? |
|  | 0690 | 06A5 | 48 | 0008 |  | 01538 |  | LAI | 8 |  |
|  | 0691 | 06B2 | 40 | 0000 |  | 01539 |  | LAI | 0 |  |
|  | 0692 | 06B9 | 1A | 007A |  | 01540 |  | LBL | PB50 |  |
|  | 0693 | 06BC | 0F |  |  |  |  |  |  |  |
|  | 0694 | 059B | 5C | 0000 |  | 01541 |  | X | 0 | SET UP NEW OVSIZE BIT |
|  | 0695 | 06AF | 1B | 00B |  | 01542 |  | LB | JAMR |  |
|  | 0696 | 0697 | 2A | 0008 |  | 01543 |  | SKBF | 3 |  |
|  | 0697 | 068B | DD | 0699 |  | 01544 |  | T | SOMWH | JAM OVERFLOW ? |
|  | 0698 | 0685 | F1 | 069D |  | 01545 |  | T | SEND2L |  |
|  | 0699 | 06A2 | 26 | 0003 |  | 01546 | SOMWH | RB | 3 |  |
|  | 069A | 06B1 | 1A | 007A |  | 01547 |  | LBL | PB50 |  |

NAME MM77                CAP477/11, PPS-4/1 MM77/MM78 cross-assembler version 1.9

| PL BADR | PADR | CD | ARG | ST NO | | STATEMENT | | |
|---|---|---|---|---|---|---|---|---|
| 069B | 06B8 | 0F | | | | | | |
| 069C | 069C | 22 | 0003 | 01548 | | SB | 3 | |
| 069D | 068E | 30 | 0680 | 01549 | SEND2L | TLB | SEND2 | |
| 069E | 06A7 | 34 | | | | | | |
| 069F | 0693 | FF | | | | | | |
| 06A0 | 0689 | 18 | 6A0 0058 | 01550 | DELAYL | EQU | * | |
| 06A1 | 06A4 | 0D | | 01551 | | LBL | PAC2 | |
| 06A2 | 0692 | 40 | 0000 | 01552 | | L | 0 | |
| 06A3 | 06A9 | 5C | 0000 | 01553 | | AISK | | |
| | | | 6A4 | 01554 | DELAY2 | TLB | PAC2 | |
| 06A4 | 06B4 | 18 | 0058 | 01555 | | | | |
| 06A5 | 060A | 0D | | 01556 | | L | * | |
| 06A6 | 06AD | 50 | 0000 | 01557 | | AISK | 1 | |
| 06A7 | 06B6 | 61 | 0001 | 01558 | | TB | DELAYEH | |
| 06A8 | 06BB | 80 | 0700 | | | | | |
| 06A9 | 069D | 88 | | | | | | |
| 06AA | 06AE | FF | | 01559 | | X | | |
| 06AB | 06B7 | 5C | 0680 | 01560 | | TM | TIME | |
| 06AC | 069B | 08 | 07F1 | 01561 | | T | DELAY2 | |
| 06AD | 068D | CB | 06A4 | 01562 | TIMEB | TM | SECZRO | ZERO TRPCMPLT DEBOUNCE COUNTER |
| 06AE | 06A6 | 83 | 07D3 | 01563 | TIM | RS | | |
| 06AF | 06B3 | 05 | | 01564 | TIMN | LBL | SECTR | |
| 06B0 | 0699 | 19 | 0079 | | | | | |

What is claimed is:

1. For controlling the transfer of data between processors in a multiprocessor system, a bus control system including:
- a system processor operating under the control of a stored program to initiate any data transfer by addressing another processor in the system for a data exchange;
- a serial data bus common to all of the processors in the system for carrying data to be exchanged between the communicating processors; and
- attention lines connecting said system processor to each of the other processors in the system, each said attention line connecting said system processor to only one of the other processors in the system, whereby said one of the other processors is conditioned to accept data from said system processor.

2. A bus control system as defined in claim 1 further including acknowledgment lines connecting each of said other processors to said system processor for permitting an addressed processor to acknowledge receipt of a signal over its attention line from the system processor, said acknowledgment lines being electrically connected to provide a single acknowledgment input signal to said system processor.

3. A bus control system as recited in claim 2 wherein each of said processors further includes means for generating a ready-to-transmit signal having a first predetermined binary value while data is being shifted onto the serial data bus from the generating processor and a second predetermined value at all other times.

4. For controlling the transfer of data between processors in a multiprocessor system wherein one of the processors is a system processor, a data control system comprising:
- attention lines connecting the system processor to each of the remaining processors in the system for enabling the system processor to initiate communications with a selected one of the processors;
- acknowledgment lines connecting each of the remaining processors to the system processor to enable a selected processor to acknowledge receipt of an attention signal from the system processor;
- ready lines connecting each of the remaining processors to the system processor for conditioning a selected processor to accept data being transmitted by another selected processor; and
- a serial data bus common to all of the processors in the system for carrying data between communicating processors.

5. A data control system as defined in claim 4 wherein said acknowledgment lines have a common connection to said system processor.

6. For controlling the transfer of data in a multiprocessor postage metering system including a system processor for a scale subsystem processor for providing scale weight and status data and a postage printing subsystem processor for accepting postage printer setting data and for providing printer status data, wherein each of said processors is capable of being a data transmitting processor or a data receiving processor at a given time, a data control system comprising:
- attention lines connecting the system processor to the scale subsystem processor and the postage printer subsystem processor for enabling the system processor to initiate communications with a selected one of the subsystem processors by transmission of an attention signal to the selected processor;
- acknowledgment lines connecting the scale subsystem processor and the postage printer subsystem processor to the system processor to enable a selected one of the subsystem processors to acknowledge receipt of an attention signal from said system processor;
- ready lines connecting the scale subsystem processor, and the postage printer subsystem processor to the system processor for conditioning a selected processor to accept data transmitted from another selected processor;
- a serial data bus common to all of the processors in the system for carrying data between communicating processors, said data being segregated into multi-bit words of fixed length; and
- means for verifying the correct transmission of each data word prior to the transmission of the following data word.

7. A data control system as defined in claim 6 wherein data is exchanged by serially transmitting data segregated into multi-bit words of fixed length.

8. A data control system as defined in claim 7 wherein each of said system and subsystem processors further comprise means for verifying the correct transmission of each data word prior to transmission of the following data word, whereby said attention lines and said acknowledgment lines are both disabled to indicate a cessation of data transmission when an error in data transmission occurs.

9. A data control system as defined in claim 8 wherein said data verifying means comprises means in the data receiving processor for complementing the received data word and for transmitting the complemented data word over the serial data bus to the data transmitting processor and means in the data transmitting processor for comparing the originally transmitted data word with the complemented data word received from the data receiving processor.

10. A data control system as defined in claim 9 wherein said transmitting processor responds to an error-indicating mismatch between the originally transmitted data word and the returned, complemented data word by terminating its acknowledgment signal when said data receiving processor detects an error in said data transmission.

11. A data control system as defined in claim 6 further comprising:
- a peripheral subsystem processor connected to said serial data bus;
- a plurality of peripheral devices; and
- a parallel data bus connected between said plurality of peripheral devices and said peripheral subsystem processor such that said peripheral subsystem processor can control in parallel said plurality of peripheral devices.

12. A data control system as defined in claim 11 wherein one of said plurality of peripheral devices is a document printer.

13. A data control system as defined in claim 9 wherein said transmitting processor responds to an error-indicating mismatch between the originally transmitted data word and the returned, complemented data word by terminating its attention signal when said data transmitting processor detects an error in said data transmission.

14. A data control system as defined in claim 8 wherein each of said processors further comprises means for repetitively transmitting a data word when an error in data transmission occurs and wherein said means for verifying the correct transmission of each data word further comprises means for repetitive data word verification.

* * * * *